United States Patent [19]
Klein et al.

[11] Patent Number: 4,486,840
[45] Date of Patent: Dec. 4, 1984

[54] COMPUTER NUMERIC CONTROL FOR METAL FORMING

[75] Inventors: Dean A. Klein; Steven C. Davis, both of Lake City; Jerome J. Wroblewski, Red Wing; Otto Baade, Minneapolis; Earl L. Hinrichs, St. Paul, all of Minn.

[73] Assignee: Houdaille Industries, Inc., Fort Lauderdale, Fla.

[21] Appl. No.: 311,427

[22] Filed: Oct. 14, 1981

[51] Int. Cl.³ .................... G06F 15/46; B21D 5/02
[52] U.S. Cl. .................................. 364/474; 72/21; 72/36; 364/476
[58] Field of Search ............. 364/142, 146, 171, 474, 364/475, 476; 72/7, 8, 21, 36, 389, 461

[56] References Cited

U.S. PATENT DOCUMENTS

| | | |
|---|---|---|
| 2,897,638 | 8/1959 | Maker . |
| 3,123,657 | 3/1964 | Clark, Jr. et al. . |
| 3,163,065 | 12/1964 | Kolodgy et al. . |
| 3,196,647 | 7/1965 | Schneider . |
| 3,199,391 | 8/1965 | Haner et al. . |
| 3,244,863 | 4/1966 | Paterson . |
| 3,274,390 | 9/1966 | Umbel . |
| 3,372,321 | 3/1968 | Inaba et al. . |
| 3,427,518 | 2/1969 | Cloup . |
| 3,576,976 | 5/1971 | Russo et al. . |
| 3,600,993 | 8/1971 | Williams et al. . |
| 3,610,299 | 10/1971 | Jurek et al. . |
| 3,618,349 | 11/1971 | Roch ............................ 72/36 X |
| 3,654,613 | 4/1972 | Dunne et al. . |
| 3,694,636 | 9/1972 | Smith, Jr. . |
| 3,701,945 | 10/1972 | Gallant et al. . |
| 3,746,845 | 7/1973 | Henegar et al. |
| 3,761,765 | 9/1973 | Machin et al. |
| 3,774,016 | 11/1973 | Sterns et al. |
| 3,790,876 | 2/1974 | Vail ............................ 318/603 |
| 3,820,894 | 6/1974 | Hyatt |
| 3,824,822 | 7/1974 | Richardson .................. 72/461 X |
| 3,826,119 | 7/1974 | Marotto ........................ 72/461 X |
| 3,829,750 | 8/1974 | Centner et al. |
| 3,835,683 | 9/1974 | Bradick ........................ 72/36 |
| 3,843,875 | 10/1974 | Goodstal et al. |
| 3,854,353 | 12/1974 | Cutler |
| 3,857,025 | 12/1974 | English et al. |
| 3,873,816 | 3/1975 | Takeyama et al. |
| 3,874,205 | 4/1975 | Roch et al. .................. 364/142 X |
| 3,876,873 | 4/1975 | Slawson |
| 3,878,445 | 4/1975 | Kirkham et al. |
| 3,882,304 | 5/1975 | Walters |
| 3,882,305 | 5/1975 | Johnstone |
| 3,903,770 | 9/1975 | Fowler et al. |
| 3,905,793 | 9/1975 | Croughwell ................. 65/163 |
| 3,906,764 | 9/1975 | Mueller ........................ 72/8 |
| 3,908,723 | 9/1975 | Hill . |
| 3,909,600 | 9/1975 | Hohn . |
| 3,910,142 | 10/1975 | Jureit et al. . |
| 3,920,972 | 11/1975 | Corwin, Jr., et al. . |
| 3,931,501 | 1/1976 | Barr et al. . |
| 3,932,859 | 1/1976 | Kyriakides et al. . |
| 3,939,329 | 2/1976 | Doran . |
| 3,967,242 | 6/1976 | Isoo et al. . |
| 3,970,830 | 7/1976 | White et al. . |
| 3,986,087 | 10/1976 | Zankl et al. . |
| 3,989,933 | 11/1976 | Inghilleri . |
| 4,011,437 | 3/1977 | Hohn . |
| 4,015,493 | 4/1977 | Woolston . |
| 4,016,540 | 4/1977 | Hyatt . |
| 4,017,976 | 4/1977 | Barr et al. . |
| 4,020,406 | 4/1977 | Tokuno et al. . |
| 4,028,599 | 6/1977 | Zankl et al. . |
| 4,031,368 | 6/1977 | Colding et al. . |
| 4,038,890 | 8/1977 | Winget . |
| 4,041,466 | 8/1977 | Stuart .......................... 364/900 |
| 4,068,297 | 1/1978 | Komiya . |
| 4,074,350 | 2/1978 | Roch et al. .................. 364/474 X |
| 4,084,424 | 4/1978 | Roch et al. .................. 72/461 X |
| 4,096,563 | 6/1978 | Slawson ...................... 364/107 |
| 4,112,493 | 9/1978 | Roch et al. .................. 364/476 |
| 4,115,859 | 9/1978 | Brisk et al. .................. 364/142 X |
| 4,120,583 | 10/1978 | Hyatt . |
| 4,123,750 | 10/1978 | Leney et al. ................ 340/347 P |
| 4,148,203 | 4/1979 | Farazandeh et al. .......... 72/21 |
| 4,150,427 | 4/1979 | Slawson . |
| 4,199,814 | 4/1980 | Rapp et al. .................. 364/171 X |

Primary Examiner—Joseph F. Ruggiero
Attorney, Agent, or Firm—Hill, Van Santen, Steadman Simpson

[57] ABSTRACT

A computer numeric control for metal forming which allows the automatic selecting of gauge position and ram position allowing both variables to act to produce bends in forming materials with different flange lengths and angles. The system also offers programming and calibration features comprising significant improvements over prior art apparatus and methods. The system integrates the press control circuitry and all precise control of flange length which can be programmed and offers precise control of the bend angle which can be programmed. Multiple programs can be stored and later retrieved. The apparatus can be calibrated in either English or metric units. Magnetic cassettes and printers can be utilized for permanent storage of programs and to produce permanent records on paper.

5 Claims, 18 Drawing Figures

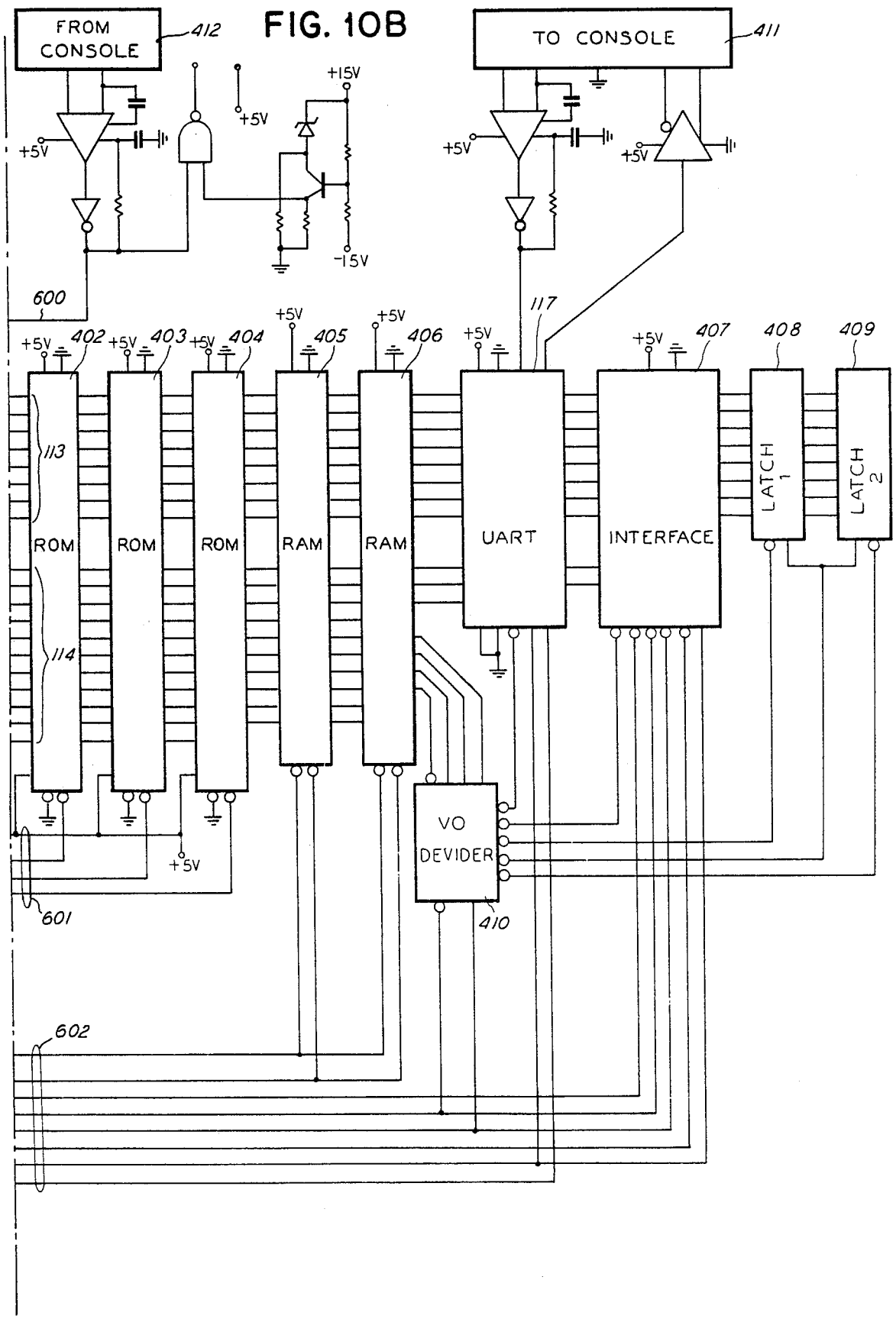

| FIG.12A | FIG.12B | FIG.12C | FIG.12D |

COMPUTER NUMERIC CONTROL FOR METAL FORMING

BACKGROUND OF THE INVENTION

1. Field of the Invention

This invention relates in general to press brakes and in particular to a hydra-mechanical press brake which is computer controlled for metal forming.

2. Description of the Prior Art

U.S. Pat. No. 3,324,653 discloses a power driven tool as, for example, a press brake.

U.S. Pat. No. 2,875,733 discloses power driven tools including a hydra-mechanical driven machine.

U.S. Pat No. 3,082,605 also discloses a hydra-mechanical power driven tool.

U.S. Pat. No. 4,148,203 discloses a computer controlled press brake. Other patents relating to press brake apparatus are U.S. Pat. Nos. 3,812,695, entitled "Back Gauge For Press Brake", 3,618,349 relating to gauging system for presses, 3,874,205 relating to digitally controlled multiple depth stop and return stroke limit control for press brakes, 4,074,350 relating to soft-wired machine tool control, 4,084,424 relating to twin motor and servo drive for workpiece positioning stops and for press ram drive, and 3,826,119. The prior art such as listed generally requires manual adjustment, manual measurement or both and some of it provides automatic gauging only or automatic ram positioning only.

SUMMARY OF THE INVENTION

The present invention provides a programmable control for automatically selecting gauge position and ram position and allows both variables to act together to produce bends in formable materials to produce various flange lengths and angles. The system also allows programming and calibration features which comprise significant improvements over apparatus and the methods of the prior art.

The invention comprises a hydra-mechanical press brake which:
(A) integrates the press control circuitry,
(B) allows precise control of the flange length which can be programmed,
(C) allows precise control of the bend angle which can be programmed and can be easily set,
(D) allows multiple programs to be stored and retrieved,
(E) the system can operate in either metric or English units,
(F) magnetic cassette option can be utilized to obtain permanent storage of programs,
(G) the printer can be used to obtain permanent records which will be printed on paper.

The system consists of six main components including: (1) a main controller or control box, (2) an operator station Pendant box, (3) a back gauge, (4) a ram position transducer, (5) the press control circuitry, and (6) a press hydraulic system.

The main controller provides the following functions:
1. Controls the gauge position,
2. Monitors and controls the ram position,
3. Controls the programming format,
4. Provides for storage of programs with battery backup,
5. Controls the sequence of operations,
6. Allows calibration computation and procedure control with operator aid messages, and
7. Provides for diagnostics for assistance in trouble shooting.

The operator station:
(1) functions to interface the main controller functions to the operator and communicates operator instructions to the main controller and displays messages from the main controller,
(2) provides means for program entry and has a keyboard and a micro-cassette,
(3) the operator station displays program, includes alphanumeric and numeric displays and indicator lights and includes a printer,
(4) links to diagnostic functions,
(5) supplies data and controls the cassette unit, and
(6) provides data and controls the printer.

The back gauge includes a servo motor driven back gauge device which includes:
(A) rigid frame having the following features:
   1. machine mounts for guide rods mounted in horizontal plane,
   2. integral mounting plate for lead screw servo motor and rotary encoder,
   3. adjustable servo motor mount,
   4. a rotary encoder mount,
   5. lead screw mounts,
   6. adjustable leveling screws for attaching to the press brake bed, and
   7. adjustable reference and overtravel switches and mounting bracket.
(B) the carriage of the back gauge has the following features:
   1. mounts integral with the guide rod bushings,
   2. has adjustable tie-on to lead screw,
   3. has twin vertical guide rods and single adjustment screw for vertical adjustment of the gauge bar,
   4. has locking clamps for vertical adjustment,
   5. has horizontal adjusting gauge bar supports with locks,
   6. has gauge bar of various lengths to accomodate various sizes of press brakes,
   7. has a tilting gauge bar, and
   8. has micro-adjustable flip up fingers.

The ram position transducer consists of a floating bracket which assures that the ram position is always measured with respect to the bed and independent of tonnage.

The ram position has a rotary encoder coupled to it.

The ram position has a spool and a cable and a spring loaded tensioner and an adjustable cable bracket attached to the ram.

The press control circuitry includes functions which:
(A) inhibits stroking of the press while the gauge is in motion,
(B) slows the stroke as the ram nears the bottom of the bend, and
(C) reverses the direction of the ram at the bottom of the bend.

The press hydraulic circuitry controls the power driven tool and is an integral part of the invention.

Other features, objects and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIGS. 10A through 10B comprise an electrical schematic of the invention;

DESCRIPTION OF THE PREFERRED EMBODIMENTS

Figure 1:
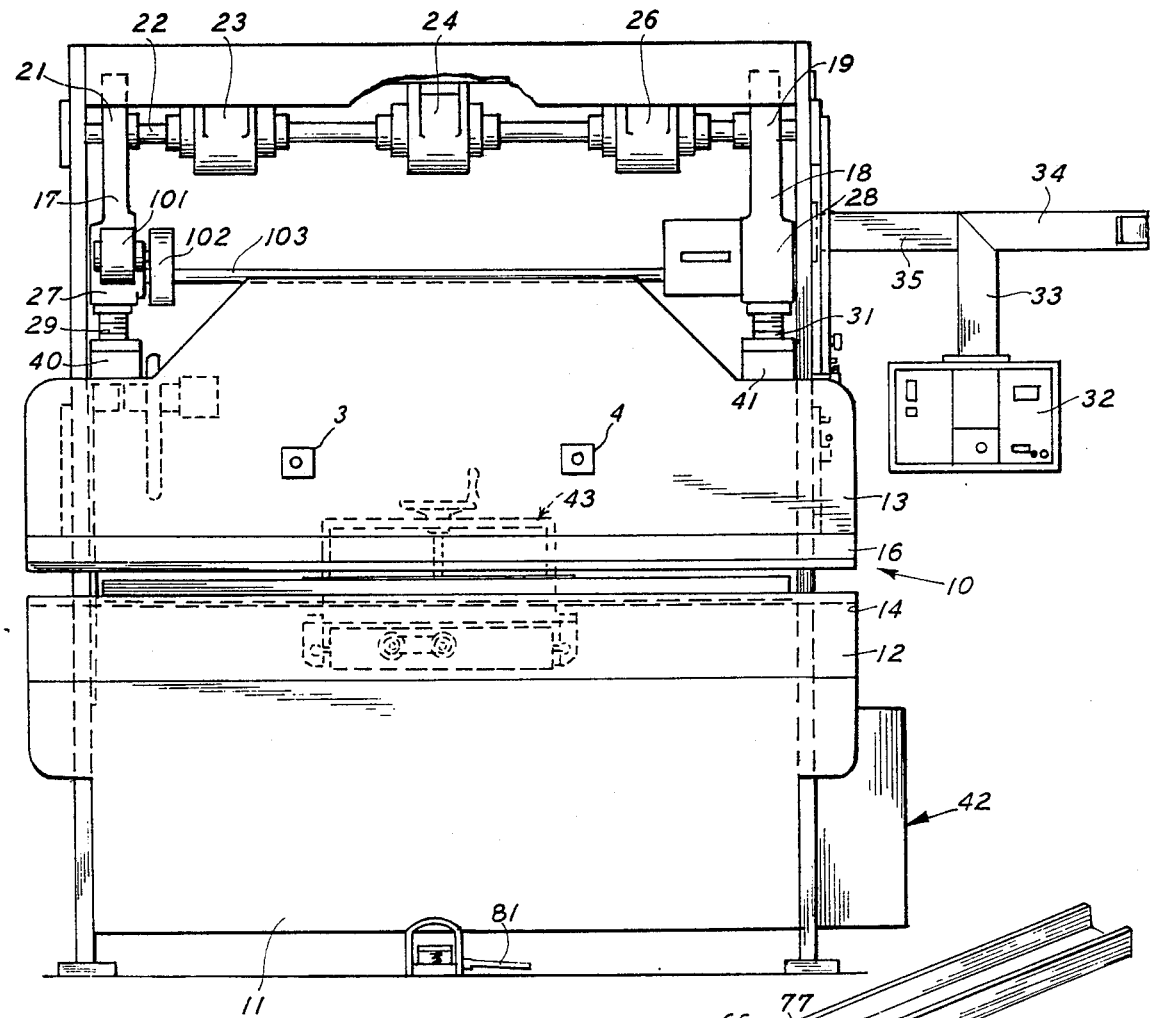
FIG. 1 is a front plan view of the press brake with the invention installed thereon.
Figure 2:
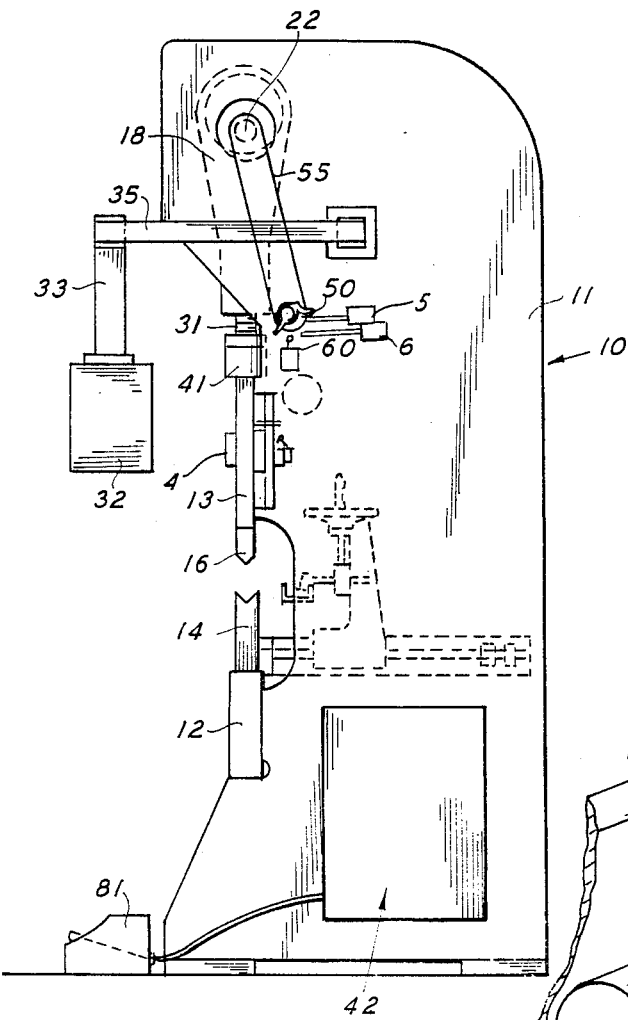
FIG. 2 is a side plan view of the press brake with the invention.

FIG. 1 and FIG. 2 illustrate a press brake 10 which includes a frame 11 which has a lower die holding member 12 in which a die 14 is mounted and an upper movable ram 13 which holds a male die 16 which mates with the female die 14. A pair of rams 17 and 18 are connected to the upper die holding member 13 and have their upper ends connected to driving mechanisms 19 and 21 which are eccentrics for driving the upper die relative to the lower die and are well known devices. A driving shaft 22 is connected to the ram driving means 19 and 21 and is driven by hydraulic actuators 23, 24 and 26. Ram adjusting means 27 and 28 are respectively connected to the ram driving means 17 and 18 and lead screws 29 and 31 are mounted between the members 17 and 18 and the upper die support 13 such that by adjusting the lead screws 29 and 31 the distance between the shaft 22 and the die 16 can be adjusted. An adjusting motor 101 is coupled with gearing 102 to shaft 103 which adjusts the lead screws 29 and 31 relative to the upper ram members 17 and 18.

An operator station box 32 is connected by a vertical arm 33 and a horizontal arm 34 which is pivotally connected to a second horizontal arm 35 having its opposite end connected to the frame 11 of the press brake. A main controller 42 is connected to the frame 11 as illustrated in FIGS. 1 and 2.

An upper stop limit 50 is coupled by suitable power transmission means 55 to the shaft 22 and the upper limit means 50 can be set to actuate upper switch 60 to establish the upper limit of the ram 16.

Figure 3:
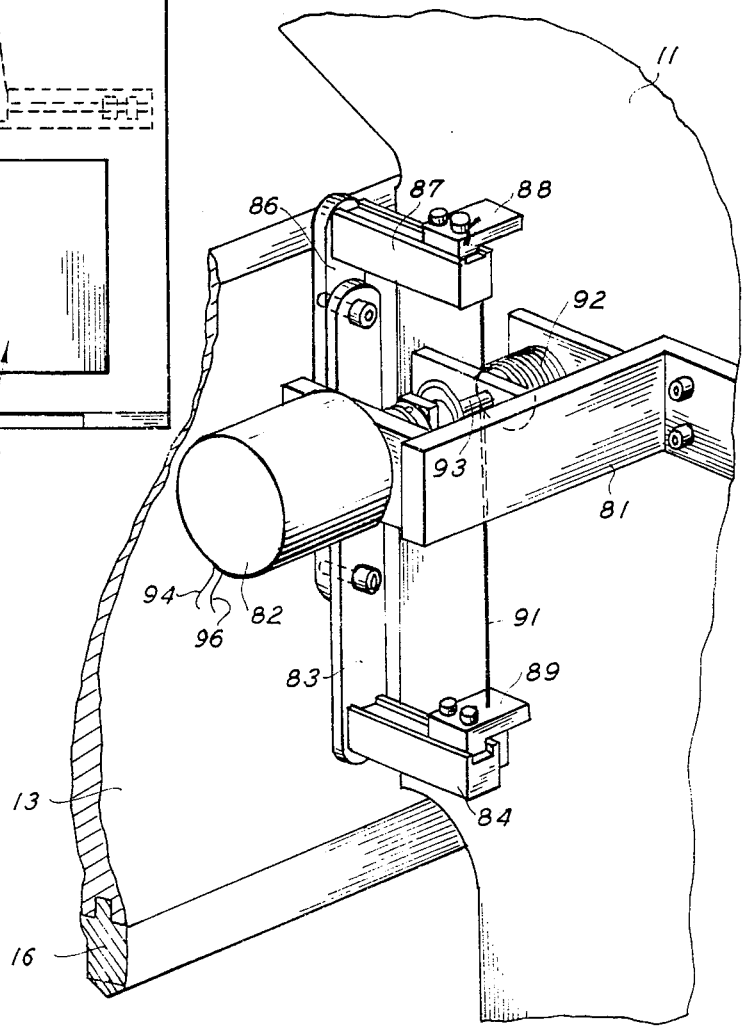
FIG. 3 is a perspective cut-away view of the ram indexing means.

As shown in FIG. 3, an encoder 82 has output leads 94 and 96 and is mounted on a frame member 81 connected to the frame 11 and has an input shaft 93 upon which a reel 92 is rotatably mounted. A flexible cable 91 passes around the reel 92 and has one end connected to a upper support 88 connected to a frame member 87 and the cable has a lower end connected to a support means 89 connected to a frame member 84. Links 83 and 86 are connected together and extend between the supporting members 84 and 87. The links 83 and 86 are connected by suitable bolts or other fastening means to the ram 13 so that they move therewith. As the ram 13 moves upwardly and downwardly relative to the lower die 14 and the frame 11, the cable 91 rotates the pulley 92 so that the encoder is driven thus producing output electrical signals on the leads 94 and 96 indicating the position of the ram 13.

Figure 5:
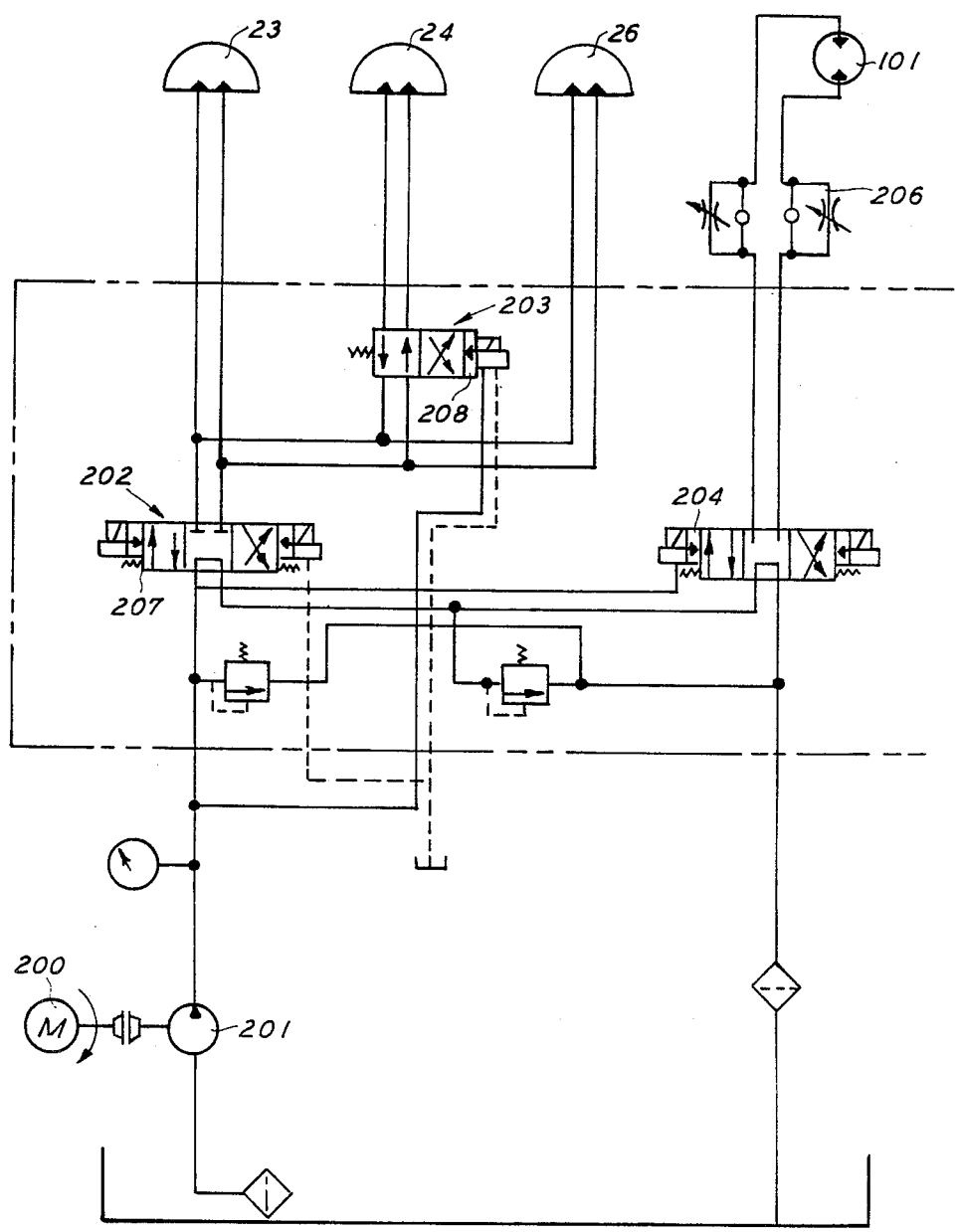
FIG. 5 illustrates the hydraulic control system of the invention.

FIG. 5 illustrates the hydraulic control system in which a motor 200 drives a pump 201 which is connected to solenoid valves 202, 203 and 204. The solenoid valves 202 and 203 are connected to the activating rotary actuators 23, 24 and 26 which drive the shaft 22 of the press brake. The adjustment motor 101 is connected to solenoid 204 through a connector 206. A relief valve 207 is connected to valve 202 and provides control of the direction of rotation of the actuators 23, 24 and 26. A valve 208 allows fast speed by reversing the fluid flow to one of the actuators 24 thereby allowing its fluid to aid rotation of the other actuators. A valve 204 connected to solenoid valve 204 controls activation and rotation direction of the motor 101.

The sequence of operation is as follows:
1. The cycle start with the motor 200 running, solenoid valve 202 is energizeed, activating rotary actuators 23, 24 and 26. Fast speed is obtained by energizing solenoid 203.
2. For the work portion of the cycle, the solenoid valve 203 is de-energizing providing fluid flow to rotary actuators 23, 24 and 26 and slow speed results.

At the completion of the work portion of the cycle, the valve 203 is re-energized which returns the ram to the top of the stroke at fast speed. For ram adjustment, the solenoid 204 is energized to actuate the hydraulic ram adjustment motor 101 for a proper ram height.

Figure 6:
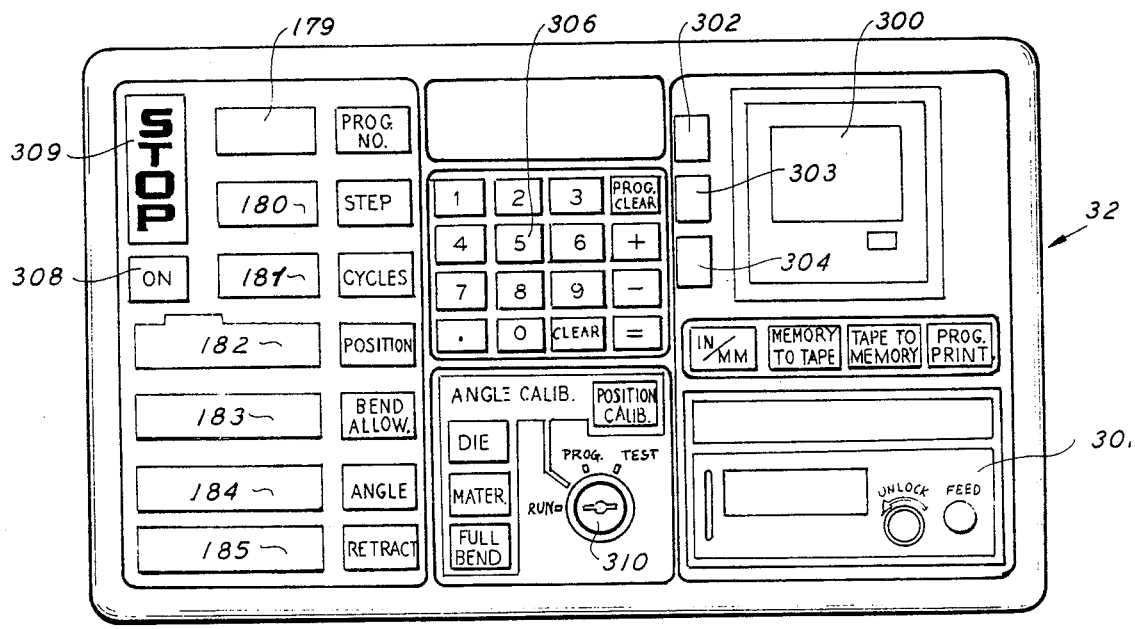
FIG. 6 illustrates the operator control of the invention.
Figure 10A:
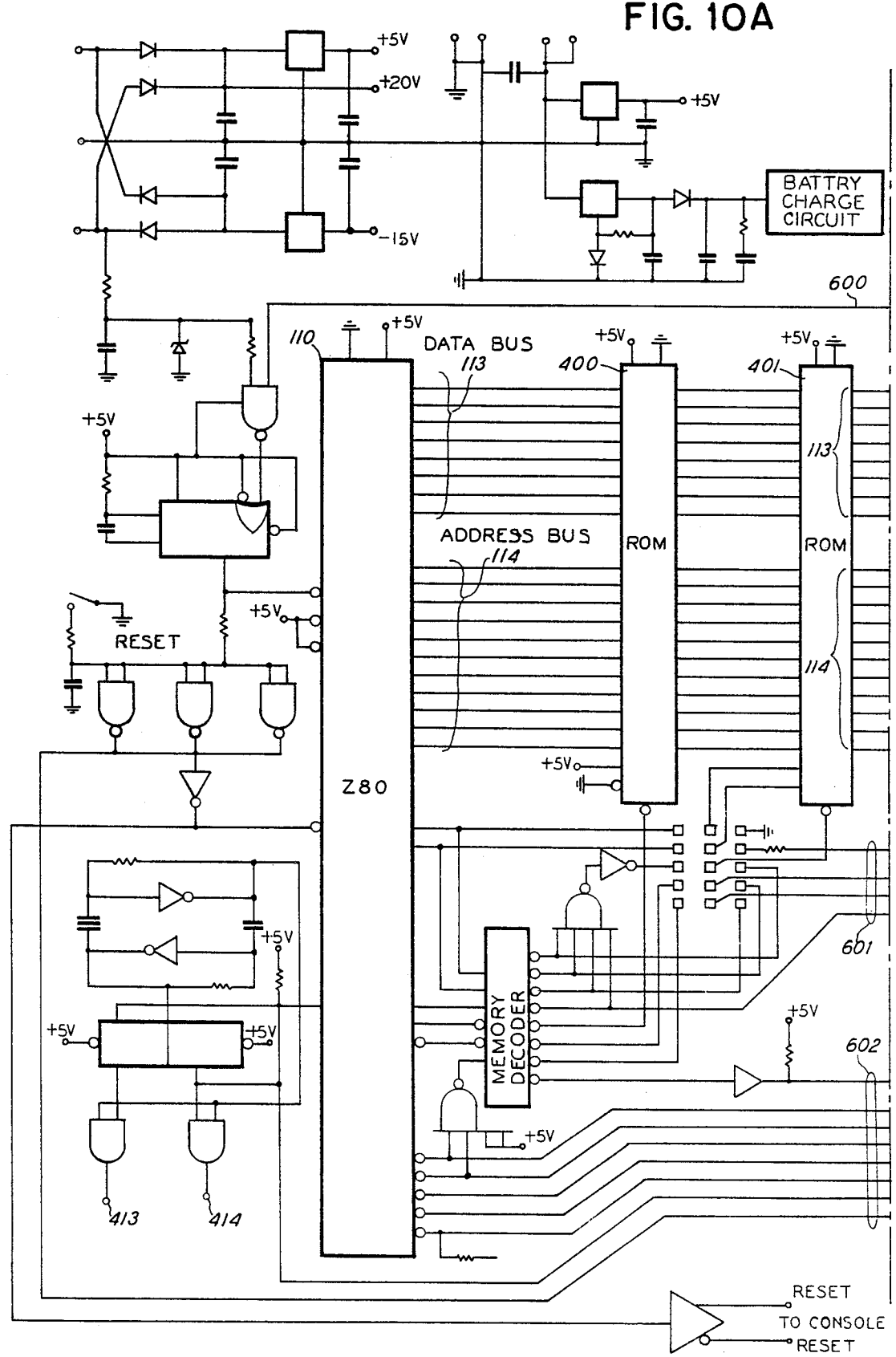
Figure 11A:
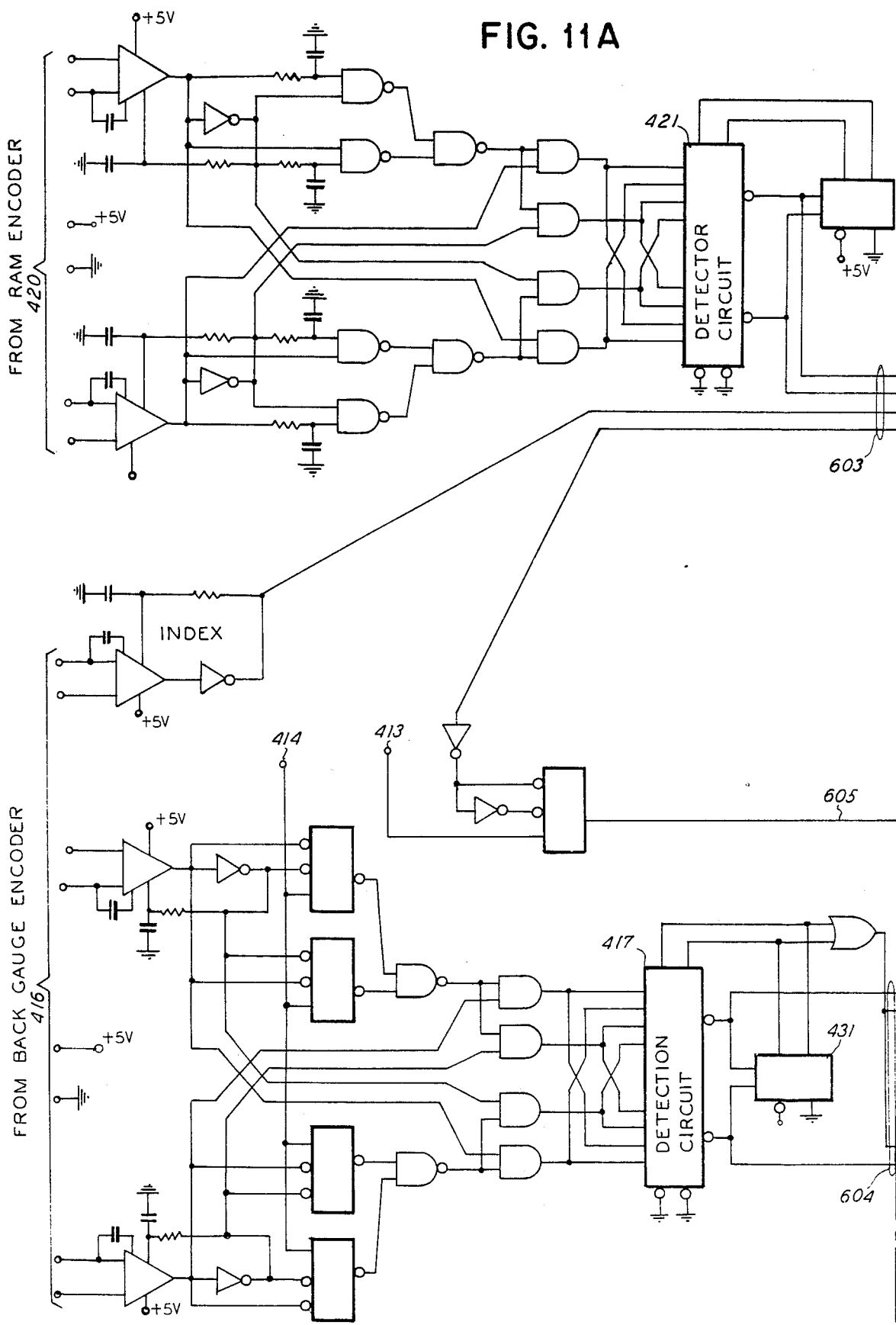
FIGS. 11A and 11B illustrate electrical schematic for the second microprocessor.
Figure 11B:
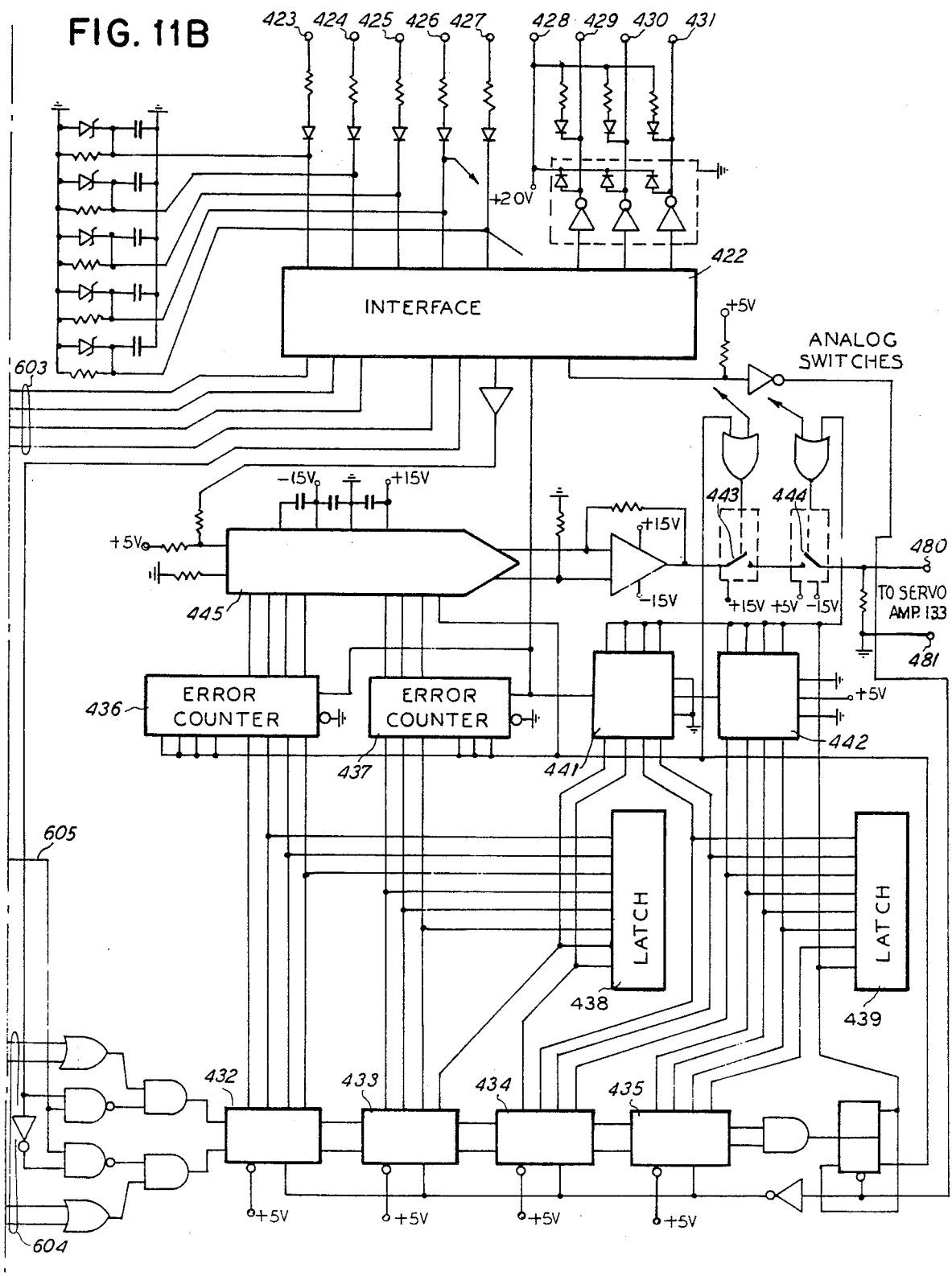

FIG. 6 illustrates the operator station control 32 and comprises the operator station control 32 includes a tape cassette unit 300, a printing unit 301, three test switches 302, 303 and 304, a membrane keyboard with input keys 306 which can be used to enter control command and other inputs. A program number region 179, a step region 180, a cycles region 181, a position region 182, a bend allowance 183, an angle region 184 and a retract region 185 are provided. An ON indicia 308 is also provided and a stop switch 309. A knob 310 can be set to run, calibrate, program and test position.

Figure 7:
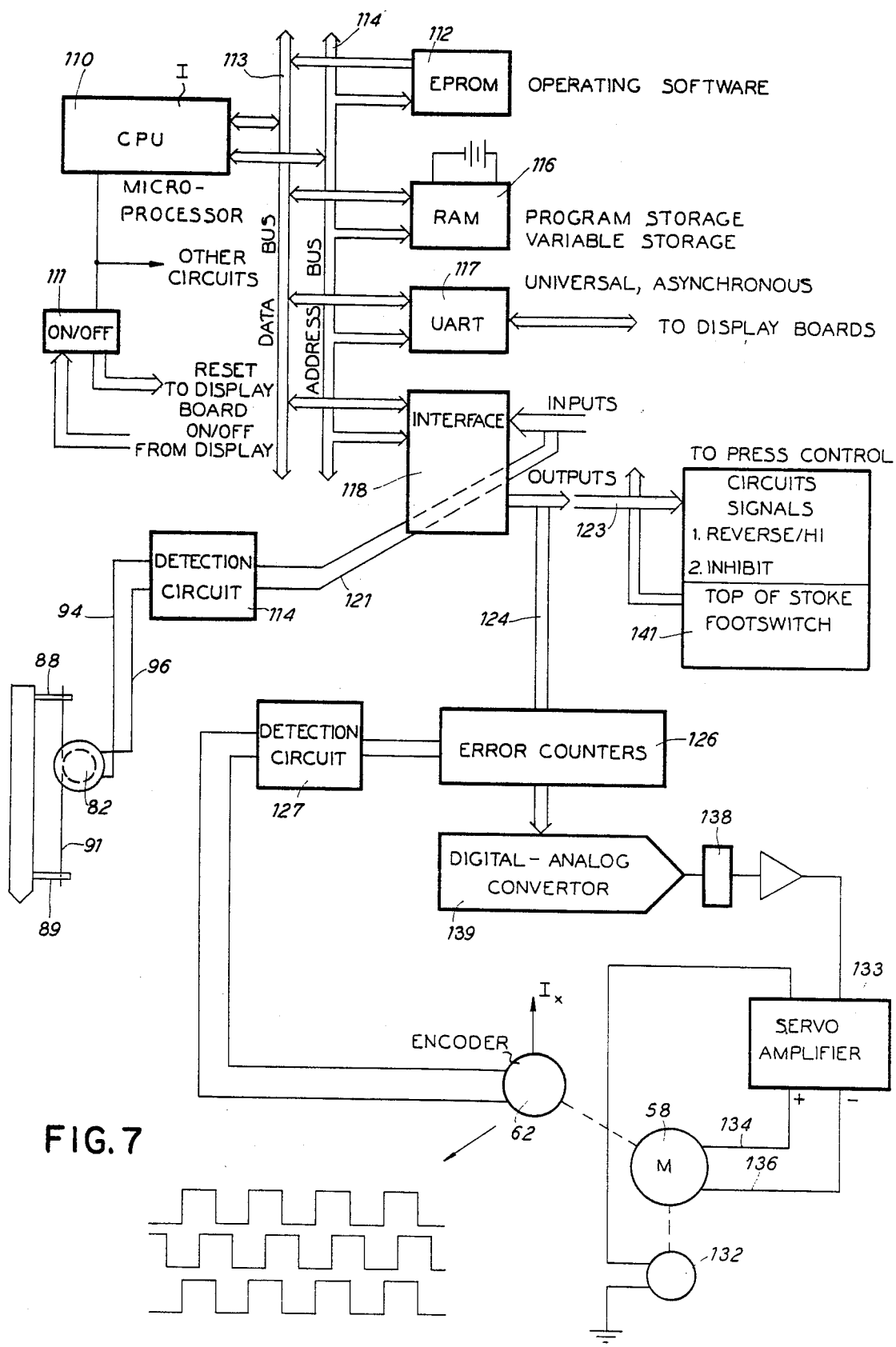
FIG. 7 illustrates the first microprocessor of the invention.

FIG. 7 illustrates a first CPU 110 which might be a model Z-80 Zilog microprocessor which is connected to data bus 113 an address bus 114 and to an on-off circuit 111. A EPROM 112 is connected to the data and addresse busses 113 and 114. A random access memory 116 with battery backup is also connected to the data and address busses 113 and 114. A universal asynchronous receiver-transmitter 117 is also connected to the data and address busses 113 and 114. An interface unit 118 is also connected to the data and address busses 113 and 114.

The encoder 82 produces outputs on leads 94 and 96 which are supplied to a detection circuit 114 which is connected by a bus 121 to the interface 118. A backgauge 43 illustrated in detail in FIG. 4 has an encoder 62 which produces A and B phase signals which are out of phase with each other at a rate of 800 pulses per revolution and produces an indexing signal Ix of one pulse per revolution. The encoder 62 is driven by the backgauge drive motor 58 which also drives a tachometer 131 and a servo amplifier 133 receives an output of the tachometer 132 and is connected to the leads 134 and 136. A detection circuit 127 is connected to the encoder 62 and to error counters 126 which receive move pulses and indication of direction on bus 124 from the interface 118. A digital to analog converter 139 receives the output of the error counter 136 and is connected to switch means 138 which may comprise a pair of magnetic switches which sense the position of magnets 90 and 100 on the forward and rear limits of the backgauge and supply an output to the servo amplifier 133. Control signals on bus 123 are supplied from the interface 118 to the press control circuit 141. Pad switches 3 and 4 for both hands are mounted on the machine for safety purposes. The speed control switches 5 and 6 control the speed changes of the machine to low speed for metal bending and high speed return of the upper die.

Figure 4:
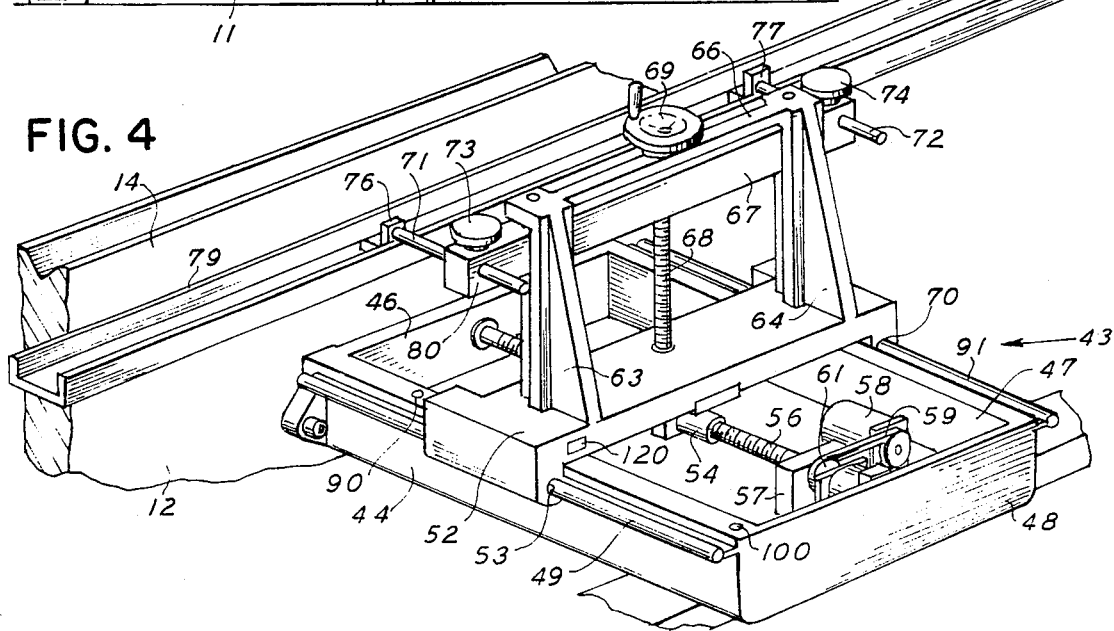
FIG. 4 is a perspective of the back gauge.

FIG. 4 illustrates the backgauge which has frame members 48, 46, 44 and 47 which form a rectangle which is connected to the frame 11 or the lower die support 12. A pair of rail guides 49 and 51 extend horizontally on opposite sides of the members 44 and 47 and a carriage 52 is slidably received in ways 53 and 70 on the guides 49 and 51 so that the carriage 52 can be moved backward and forward. A pair of uprights 63 and 64 are mounted on the carriage and a cross-member 66 is connected between the tops of such members. A transverse bar 80 is threadedly engaged with a lead screw 68 which has a handle 69.

When the handle 69 is rotated to drive the lead screw 68 the member 80 moves upwardly and downwardly. A pair of guides 71 and 72 are carried on opposite ends of the bar 80 and can be locked relative to the bar by set screws 73 and 74. Pivoted backgauge members 76 and 77 are attached to the ends of the guides 71 and 72 and a channel member 78 with a front gauging surfaces 79 is connected to the pivoted support members 76 and 77. A lead screw 56 is threadedly received in a portion 54 of the carriage 52 and motor 58 is coupled by a belt to a pulley 61 on the lead screw 56 to drive the lead screw in either direction so as to move the carriage 52 backwards and forward relative to the dies 14 and 16. An encoder 62 is mounted on the shaft to the lead screw 56 so as to produce electrical signals indicative of the position of the carriage 52. Front and rear limits are indicated by magnetic switch 120 which detects the presence of magnets 90 and 100 mounted on the frame member 44.

The operating software for CPU 110 follows.

```
( CREATE A CONSTANT WHICH POINTS TO NEXT AVAILABLE SPACE IN ROM )
: ROMWORD
        TDP @ 5 + CONSTANT ;

( PUT STRING INTO ROM )
: ROMSTRING
        22 DELIMITER ' WORD
        DF 0 DUP DUP B@ 1+ + SWAP
        DO I B@ B, LOOP ;

( PUT STRING INTO ROM AND CREATE A CONSTANT WHICH POINTS TO THE STRING )
: ROMTEXT
        ROMWORD ROMSTRING ;

( PUT STRING IN ROM AND POINTER TO STING ON STACK )
: PRINTERSTRING
        TDP @ ROMSTRING ;

0 VARIABLE '$ROMARRAY
0 VARIABLE '$ROMARRAY
0 VARIABLE '$ERROR ( CREATE DICTIONARY ENTRY WITH ONLY ONE BYTE, OCD-'CALL' PUT IN ROM )

: DUMBHEADER TDP @ DUP CONSTANT 1+ TDP ! ;

( CREATE AN ARRAY OF BYTES IN ROM.  DATA IS EXPECTED ON STACK WITH )
( ARRAY SIZE AT TOS.  n (NAME) WILL PUT THE n'th ARRAY ELEMENT ON THE )
( STACK.  ARRAY ADDRESSING BEGINS WITH 0 )

: ROMARRAY DUMBHEADER '$ROMARRAY @  0 DO B, LOOP ;

( CREATE AN ARRAY OF WORDS )
```

: 2ROMARRAY DUMBHEADER '$2ROMARRAY @ . 0 DO , LOOP ;

( CREATE A WORD THAT WILL SEND AN ERROR MESSAGE TO THE ALPHA DISPLAY )

: ERRORMESSAGE DUMBHEADER '$ERROR @ , ROMSTRING ;

( SEND A MESSAGE TO THE ALPHA DISPLAY.  TYPE" MAY BE USED WITHIN )
( COLON DEFINITIONS )

0 VARIABLE '$TYPE

: TYPE"
        '$TYPE @  ROMSTRING ;

IMF TYPE"

( SYN (name1) (name2) WILL CREATE A DICITONARY ENTRY FOR (name1) )
( WITH THE SAME EXECUTION ADDRESS AS (name2)  NO ROM SPACE IS USED )

( 0 'S 'B B)
( : SYN  B WORD LINK TCO=TCU TSYMPTR @ 3 + ! ;
(
( 80  S 'B B)
( ( I/O MASKS USED ONLY IN CODE DEFINITIONS )

1 CONSTANT TXRDY
2 CONSTANT RXRDY
8 CONSTANT TOPMASK
10 CONSTANT SIDEMASK
20 CONSTANT FOOTMASK
8 CONSTANT DISABLEMASK
10 CONSTANT RETURNMASK
DISABLEMASK COM RETURNMASK COM & CONSTANT ONMASK ( I/O PORTS USED IN CODE DEFINITIONS )

14 CONSTANT INPUTPORT
16 CONSTANT MOVEPORT
30 CONSTANT RDDATA
31 CONSTANT STATUS
34 CONSTANT WRDATA

14      CONSTANT    PIOAD
    15      CONSTANT    PIOAC
    16      CONSTANT    PIOBD
    17      CONSTANT    PIOBC
    36      CONSTANT    WRMODE
    37      CONSTANT    WRCOM ( I/O CONSTANTS )

| | | |
|---|---|---|
| OFF | CONSTANT | IOREGA |
| 40 | CONSTANT | IOREGB |
| 97 | CONSTANT | INTCONTROL |
| 3F | CONSTANT | INTMASK |
| 3 | CONSTANT | INTOFF |
| 0CF | CONSTANT | BITMODE |
| 04 | CONSTANT | TRACK |
| 06 | CONSTANT | RZERO |
| 08 | CONSTANT | ENDBEND |
| 0A | CONSTANT | RBEND |
| 18 | CONSTANT | OVERRAM |
| 40 | CONSTANT | STEP |

( STACK SIZES )

| | | |
|---|---|---|
| 30 | CONSTANT | SSIZE |
| 28 | CONSTANT | RSIZE |

( SOME KEYS ONLY USED IN CASE STATEMENTS )
( KEYS)

| | | |
|---|---|---|
| 2C | CONSTANT | =KEY |
| 2B | CONSTANT | +KEY |
| 2D | CONSTANT | -KEY |
| 40 | CONSTANT | MEM-TAPEKEY |
| 41 | CONSTANT | TAPE-MEMKEY |
| 42 | CONSTANT | PROGPRINTKEY |
| 43 | CONSTANT | INMMKEY |
| 49 | CONSTANT | STEPKEY |
| 4A | CONSTANT | CYCLEKEY |
| 4B | CONSTANT | POSITIONKEY |
| 4C | CONSTANT | BENDALLWKEY |
| 4D | CONSTANT | ANGLEKEY |
| 4E | CONSTANT | RETRACTKEY |
| 4F | CONSTANT | DIEKEY |
| 50 | CONSTANT | MATLKEY |
| 51 | CONSTANT | FULLBENDKEY |
| 59 | CONSTANT | HKEY1 |
| 5A | CONSTANT | HKEY2 |
| 5B | CONSTANT | HKEY3 |
| 60 | CONSTANT | POSCALKEY |
| 61 | CONSTANT | ANGLECALKEY |
| 68 | CONSTANT | PROGRAMKEY |
| 69 | CONSTANT | CALIBRATEKEY |
| 6A | CONSTANT | RUNKEY |
| 6B | CONSTANT | TESTKEY |

( ROUTINES TO USE LABELS IN CODE DEFINITIONS )

( LABELS ARE DENOTED 0,1,2,3,4, LABEL: DEFINES A LABEL, RELJUMP )
( COMPUTES THE OFFSET FOR A RELATIVE JUMP )

```
5 ARRAY LBL

: LABEL: LBL TDP @ SWAP ! ;
: RELJUMP LBL @ TDP @ 2 + - ;

( WORDS FOR MODIFIED CASE STATMENTS )
            ( CONDITION MUST LEAVE EXACTLY ONE WORD ON STACK )
            ( ONLY THE LOW ORDER BYTE IS USED FOR COMPARISON )
            ( ACTION MUST BE ONE EXECUTABLE WORD )
0 VARIABLE 'SCASE
0 VARIABLE '#CASES

: CASE  'SCASE @ ,  TDP @ #CASES !   0 B    3Y    0 0 STATE  ;

: =:  B,   1 STATE  ;
: ;;  1+   0 STATE  ;
: NOCASE 1- SWAP NOT SWAP TDP @ 1- TDP ! CRUFF 1- B@ ;
: CASEND SWAP DUP IF , ELSE DROP ENDIF
         '#CASES @ TDP @ ROT ROT TDP ! B, TDP ! 1 STATE ! ;

IMP CASE   IMP ;;    IMP CASEND

A00 TSYMSP !
ROMGEN 0 3FFF RAWDIA.COM BIG.DIA

[END-OF-FILE]
        ( Copyright 1980 The Stackworks. All rights reserved )

( Z80 VERSION 1.2 - CP/M )
                    ( 3/25/80 )

CODE $ZPUSH   0 HL LD   NZ IF,  HL INC  ENDIF,   EDOC

CODE $$PUSH   HL PUSH   EXX  (HL) C LD  HL INC  (HL) B LD
              HL INC  BC PUSH  EXX  RET    EDOC

CODE $CONSTANT   HL POP   (HL) E LD    HL INC    (HL) D LD
                 DE PUSH    $NEXT JP     EDOC

CODE $BARRAY   HL POP   (HL) E LD   HL INC   (HL) D LD   HL POP
               DE HL ADD   $PUSH JP    EDOC

CODE $ARRAY    HL POP   (HL) E LD   HL INC   (HL) D LD   HL POP
               HL HL ADD   DE HL ADD   $PUSH JP    EDOC
```

( ================================================== )

( CONDITIONAL COMPILATION CONSTANTS )

1 XCONSTANT ?WANIO    ( COMPILE USER I/O SECTION )
( ================================================== )

( VARIABLES & CONSTANTS )

0 VARIABLE DF              0 VARIABLE CURRENT
CODE SHUTOFF
      0 A LD   14 OUT   HALT   EDOC ( SOME OFTEN USED CONSTANTS )

```
CODE 1,0   1 HL LD   HL PUSH   EDOC    ( PUT TWO NUMBERS ON THE STACK )
CODE 0     0 HL LD   $PUSH JP  EDOC
CODE 0,1   0 HL LD   HL PUSH   EDOC    ( PUT TWO NUMBERS ON THE STACK )
CODE 1     1 HL LD   $PUSH JP  EDOC
 2      CONSTANT      2
 3      CONSTANT      3
 4      CONSTANT      4
 5      CONSTANT      5
 6      CONSTANT      6
 7      CONSTANT      7
 8      CONSTANT      8
 9      CONSTANT      9
 0A     CONSTANT      0A
 0B     CONSTANT      0B
 20     CONSTANT      "BLANK"
 30     CONSTANT      "0"
 100    CONSTANT      100H
```

( I/O ROUTINES )

( KEYREADY? --) b  )
      ( RETURNS 1 IF DATA IS READY TO BE READ, 0 OTHERWISE )
CODE KEYREADY?
      STATUS IN   RXRDY AND   'B $ZPUSH JP   EDOC ( RCVBYTE1 --) )
      ( BYTE IS READ FROM UART AND PUT IN ACC. )
CODE RCVBYTE1
      BEGIN,  STATUS IN   RXRDY AND   NZ END;
      RDDATA IN   RET   EDOC ( RCVBYTE --) b )
      ( A BYTE, b, IS READ FROM UART )
CODE RCVBYTE
      'B RCVBYTE1 CALL   EDOC ( $APUSH --) a )
      ( CONTENTS OF A IS PUT ON THE STACK )
CODE $APUSH
      0 H LD   A L LD   $PUSH JP   EDOC

```
( XMTBYTE1 -- ) )
        ( ACC. IS SENT TO UART )
CODE XMTBYTE1
        AF PUSH  BEGIN,  STATUS IN  TXRDY AND  NZ END
        AF POP  WRDATA OUT  RET  EDOC ( b XMTBYTE -- ) )
        ( BYTE b, ON STACK, IS SENT TO UART )
CODE XMTBYTE
        HL POP  L A LD  'B XMTBYTE1 CALL  $NEXT JP  EDOC ( FOOTSWITCH? -- ) 1 IF CLOSED )
        ( -- ) 0 IF OPEN   )
CODE FOOTSWITCH?
        INPUTPORT IN  FOOTMASK AND  'B $ZPUSH JP  EDOC ( RAMTOP? -- ) 1 IF AT TOP )
        ( -- ) 0 IF NOT    )
CODE RAMTOP?
        INPUTPORT IN  TOPMASK AND  'B $ZPUSH JP  EDOC ( WRONGSIDE? -- ) 1 IF WRONGSIDE )
        ( -- ) 0 IF NOT    )
CODE WRONGSIDE?
        INPUTPORT IN  SIDEMASK AND  'B $ZPUSH JP  EDOC ( POSIN -- ) p )
        ( RETURN CURRENT POSITION COUNT )
CODE POSIN
        50 IN  60 IN  A L LD  70 IN  A H LD  $PUSH JP  EDOC

CODE RAMON
        MOVEPORT IN  ONMASK AND  MOVEPORT OUT  $NEXT JP  EDOC

CODE RAMOFF
        MOVEPORT IN  DISABLEMASK OR  MOVEPORT OUT  $NEXT JP  EDOC

CODE LIT EXX (HL) C LD HL INC (HL) B LD HL INC BC PUSH
        $NEXTHL JP  EDOC

CODE $SET  HL POP  (HL) E LD  HL INC  (HL) D LD  HL INC
           (HL) A LD  A (DE) LD  HL INC  DE INC
           (HL) A LD  A (DE) LD  $NEXT JP  EDOC

CODE $FMAKE  $NEXT JP  EDOC

CODE $: EXX HL DE EX  HL DEC  D (HL) LD  HL DEC  E (HL) LD
        HL DE EX  HL POP  $NEXTHL JP  EDOC

CODE $; EXX HL DE EX (HL) E LD  HL INC  (HL) D LD  HL INC
        HL DE EX  $NEXTHL JP  EDOC ( ARITHMETIC OPERATIONS )

CODE + BC POP HL POP BC HL ADD $PUSH JP  EDOC
```

```
CODE -    BC POP  HL POP  A AND  BC HL SBC  $PUSH JP    EDOC

CODE !    BC POP  HL POP  C A LD  L OR  A L LD  B A LD  H OR
          A H LD  $PUSH JP    EDOC

CODE &    BC POP  HL POP  C A LD  L AND  A L LD  B A LD  H AND
          A H LD  $PUSH JP    EDOC

CODE X!   BC POP  HL POP  C A LD  L XOR  A L LD  B A LD  H XOR
          A H LD  $PUSH JP    EDOC

CODE 1+   HL POP  HL INC  $PUSH JP    EDOC

CODE 1-   HL POP  HL DEC  $PUSH JP    EDOC

CODE MINUS  DE POP  0 HL LD  A AND  DE HL SBC  $PUSH JP  EDOC ( MEMORY OPERATIONS )

CODE !    HL POP  BC POP  C (HL) LD  HL INC  B (HL) LD  $NEXT JP    EDOC

CODE @    HL POP  (HL) E LD  HL INC  (HL) D LD  HL DE EX  $PUSH JP    EDOC

CODE R@   HL POP  (HL) L LD  0 H LD  $PUSH JP    EDOC

CODE R    HL POP  BC POP  C (HL) LD  $NEXT JP    EDOC

CODE +!   HL POP  BC POP  (HL) E LD  HL INC  (HL) D LD  HL DE EX
          BC HL ADD  HL DE EX  D (HL) LD  HL DEC  E (HL) LD
          $NEXT JP    EDOC

CODE 1+!  HL POP  (HL) C LD  HL INC  (HL) B LD  BC INC
          B (HL) LD  HL DEC  C (HL) LD  $NEXT JP    EDOC

CODE 1-!  HL POP  (HL) C LD  HL INC  (HL) B LD  BC DEC
          B (HL) LD  HL DEC  C (HL) LD  $NEXT JP    EDOC ( STACK MANIPULATIONS )

CODE DROP  HL POP  $NEXT JP    EDOC

CODE DUP   HL POP  HL PUSH  $PUSH JP    EDOC

CODE OVER  BC POP  HL POP  HL PUSH  BC PUSH  $PUSH JP  EDOC

CODE R)    EXX  HL DE EX  (HL) C LD  HL INC  (HL) B LD  HL INC
           BC PUSH  HL DE EX  $NEXTHL JP    EDOC
CODE )R    EXX  BC POP  HL DE EX  HL DEC  B (HL) LD  HL DEC
           C (HL) LD  HL DE EX  $NEXTHL JP    EDOC

CODE SWAP  HL POP  HL (SP) EX  $PUSH JP    EDOC
```

```
CODE ROT    BC POP  DE POP  HL POP  DE PUSH  BC PUSH  $PUSH JP    EDOC

CODE 2DROP  HL POP  BC POP  $NEXT JP    EDOC

CODE 2DUP   HL POP  BC POP  BC PUSH  HL PUSH  BC PUSH  $PUSH JP   EDOC

CODE 2SWAP  BC POP  DE POP  HL POP  IX POP  DE PUSH  BC PUSH
            IX PUSH  $PUSH JP   EDOC

CODE ROLL   BC POP  C A LD   0 HL LD   SP HL ADD   HL INC
            DE POP  A DEC   NZ IF,
                BEGIN,
                    HL INC   (HL) C LD    E (HL) LD
                    HL INC   (HL) B LD    D (HL) LD
                    B D LD   C E LD   A DEC
                Z END,
            ENDIF,  DE PUSH   $NEXT JP   EDOC

CODE -ROLL  HL POP   0 H LD   L A LD   HL HL ADD   SP HL ADD
            HL DEC   DE POP   A DEC   NZ IF,
                BEGIN,
                    (HL) B LD   D (HL) LD   HL DEC
                    (HL) C LD   E (HL) LD   HL DEC
                    B D LD   C E LD   A DEC
                Z END,
            ENDIF,  DE PUSH   $NEXT JP   EDOC

CODE PICK   HL POP   HL DEC   HL HL ADD   SP HL ADD
            (HL) C LD   HL INC   (HL) B LD   BC PUSH
            $NEXT JP   EDOC ( MISC. WORDS )

CODE ->1    BC POP   HL POP   C A LD   A OR   NZ IF,
                BEGIN,
                    H SRL   L RR   C DEC
                Z END,
            ENDIF,  $PUSH JP   EDOC

CODE (-1    BC POP   HL POP   C A LD   A OR   NZ IF,
                BEGIN,
                    L SLA   H RL   C DEC
                Z END,
            ENDIF,  $PUSH JP   EDOC

CODE $BMOVE   BC POP   DE POP   HL POP   LDIR  $NEXT JP   EDOC

CODE $RMOVE   BC POP   DE POP   HL POP   LDDR  $NEXT JP   EDOC ( HIGH LEVEL CONDITION SETTINGS )

CODE 0=   BC POP   C A LD   B OR   0 HL LD   Z IF,  HL INC  ENDIF,
```

```
                    $PUSH JP   EDOC

CODE 0<   BC POP  B 7 BIT  0 HL LD  NZ IF,  HL INC  ENDIF,
          $PUSH JP   EDOC

CODE 0>   BC POP  B 7 BIT  0 HL LD  Z IF,  C A LD  B OR  NZ IF,
          HL INC  ENDIF,  ENDIF,  $PUSH JP   EDOC

: NOT 0= ;

: = - 0= ;     : <> - 0= 0= ;     : < - 0< ;     : > - 0> ;
: <= - 0> 0= ;     : >= - 0< 0= ;

CODE U<   BC POP  HL POP  A AND  BC HL SBC  0 HL LD  C IF,
          HL INC  ENDIF,  $PUSH JP   EDOC

: U> SWAP U< ;        : U>= U< 0= ;         : U<= U> 0= ;

( CONDITIONAL BASICS )

CODE $IF  BC POP  C A LD  B OR  EXX  Z IF,  (HL) C LD  HL INC
          (HL) H LD  C L LD  $NEXTHL JP  ENDIF,  HL INC
          HL INC $NEXTHL JP   EDOC

CODE $ELSE  EXX  (HL) C LD  HL INC  (HL) H LD  C L LD  $NEXTHL JP   EDOC ( DO LOOPS - $DO; $+LOOP; EXIT; I, J, K )

CODE $DO  EXX  BC POP  HL (SP) EX  HL DE EX  HL DEC
          D (HL) LD  HL DEC  E (HL) LD  HL DEC  B (HL) LD
          HL DEC  C (HL) LD  DE POP  HL DE EX  $NEXTHL JP   EDOC

CODE $+LOOP  EXX  BC POP  HL PUSH  DE PUSH  0 HL LD  SP HL ADD
             HL DE EX  HL SP LD  HL POP  BC HL ADD  BC POP
             BC PUSH  HL PUSH  A AND  BC HL SBC  HL DE EX
             HL SP LD  DE POP  HL POP  C IF,
             (HL) A LD  HL INC  (HL) H LD  A L LD  $NEXTHL JP
             ENDIF,  DE INC  DE INC  DE INC  DE INC  HL INC
             HL INC $NEXTHL JP   EDOC

CODE EXIT  EXX  HL DE EX  HL INC  HL INC  (HL) C LD  HL INC
           (HL) B LD  HL DEC  HL DEC  B (HL) LD  HL DEC
           C (HL) LD  HL DE EX  $NEXTHL JP   EDOC

CODE I   EXX  0 BC LD  HERE  HL DE EX  HL PUSH
         BC HL ADD  (HL) C LD  HL INC  (HL) B LD  HL POP
         BC PUSH  HL DE EX  $NEXTHL JP  EDOC

CODE J   EXX  4 BC LD  DUP JP    EDOC

CODE K   EXX  8 BC LD  JP    EDOC ( MORE ARITHMETIC OPERATIONS )

: ABS DUP 0< IF
     MINUS
  ENDIF ;
: COM FFFF X! ;
: -- SWAP - ;
```

```
           HL LD   DE POP  BEGIN  H SRL  C RR    IF
        DE HL ADD  ENDIF,  HL DE EX  HL HL ADD  HL DE EX
        C A LD  B OR  Z END,  $PUSH JP EDOC

CODE U/MOD  HL POP  DE POP  0 BC LD  BC PUSH  L A LD  H OR
            Z IF,  D/OAD ^ HL LD  (HL) JP  ENDIF,  SCF
       BEGIN,  C RL  B RL  HL HL ADD  C END,  H RR
            L RR  BEGIN,  E A LD  D OR  NZ IF,  HL PUSH
       SCF DE HL SBC  HL POP  C IF,  HL (SP) EX
       BC HL ADD  HL (SP) EX
       HL DE EX  A AND  DE HL SBC  HL DE EX  ENDIF,
       H SRL  L RR  B SRL  C RR  ELSE,  SCF  ENDIF,
       C END,  HL POP  DE PUSH  $PUSH JP EDOC

: /MOD   OVER 0<  OVER 0<  OVER X:  2SWAP
    SWAP ABS SWAP ABS   U/MOD   ROT IF
        MINUS
    ENDIF  ROT IF
        SWAP MINUS SWAP
    ENDIF ;

: / /MOD SWAP DROP ;

: MOD /MOD DROP ;

( ZIN, ZOUT - Z80 VERSION ONLY )

CODE ZIN   BC POP   (C) L IN    0 H LD   $PUSH JP   EDOC
CODE ZOUT  BC POP   HL POP    L (C) OUT  $NEXT JP   EDOC ( BASIC CASE WORDS )

CODE $$CASE
        HL POP   DE POP   E A LD   (HL) B LD   HL INC
0 LABEL: (HL) CP   HL INC
         NZ IF,  HL INC  HL INC   0 RELJUMP DJNZ
         ENDIF,
         (HL) E LD   HL INC   (HL) D LD   DE PUSH   RET
EDOC

TDF 8 '$CASE '
: $CASE R> DUP DUP B@ 1+ 3 + + >R $$CASE ;

( BMOVE, RMOVE FILL )

: BMOVE DUP IF $BMOVE ELSE DROP 2DROP ENDIF ;

: RMOVE DUP IF SWAP OVER 1- + SWAP ROT OVER 1- + ROT ROT $RMOVE
        ELSE DROP 2DROP ENDIF ;

: FILL 3 PICK IF
        OVER B! DUP 1+ ROT 1- BMOVE
    ELSE 2DROP DROP
    ENDIF ;

: BLANK "BLANK" FILL ;
```

```
( ================================================================ )
(                          OMNIO SECTION                           )
( ================================================================ )
                          ?OMNIO IFTRUE

CODE IOINIT
        BITMODE A LD    PIOAC OUT
        IOREGA A LD     PIOAC OUT
        INTCONTROL A LD PIOAC OUT
        INTMASK A LD    PIOAC OUT
        4 A LD          PIOAC OUT
        BITMODE A LD    PIOBC OUT
        IOREGB A LD     PIOBC OUT
        INTOFF A LD     PIOBC OUT
        OCE A LD        WRMODE OUT
        3F A LD         WRMODE OUT
        5 A LD          WRCOM OUT
        PIOBD IN  4 OR  PIOBD OUT  OFB AND  PIOBD OUT
        $NEXT JP  EDOC

IFEND
( ================================================================ )
(                       END OMNIO SECTION                          )
( ================================================================ )

[END-OF-FILE]

( ROM ARRAYS)

TDP @ '$ROMARRAY ! : $ROMARRAY + @ ;
TDP @ '$2ROMARRAY ! : '$2ROMARRAY SWAP DUP + + @ ;

DECIMAL
21 21 0 0 16 10 21 21 21 0 21 16 10 7 4 0 10 17 ROMARRAY DISPHIGH
25 25 0 0 20 15 25 25 25 0 25 20 15 9 6 3 15 17 ROMARRAY DISPLOW
1 1 0 0 1 1 1 3 3 0 1 2 3 0 0 0 0 17 ROMARRAY DECPTPOS
8 7 0 0 5 4 6 8 7 0 6 5 4 3 2 1 4 17 ROMARRAY DISPLAMP
10 10 0 0 10 10 10 1000 1000 0 10 1000 1000 1 1 1 0 17
        2ROMARRAY BMARRAY
1270 1270 0 0 1270 6350 1801 5000 5000 0 1801 5000 25000 100 100 1000 0
        17 2ROMARRAY MUARRAY

HEX ( ROM TEXT)

ROMTEXT CLEARTEXT "PRESS CLEAR"
ROMTEXT OKTEXT "OK"
ROMTEXT BADMEMTEXT "BAD MEMORY"
ROMTEXT NOANGTEXT "NO ANGLE"
ROMTEXT TESTANGTEXT "TEST ANGLE"
ROMTEXT FULLTEXT "BEND FULL DEPTH THEN ENTER ANGLE"
```

[END-OF-FILE]

( DEFINITIONS)

( PROGRAM MEMORY)

```
280     CONSTANT        MEMSIZE
MEMSIZE 4 + BARRAY PROGMEMORY
0 PROGMEMORY 6 +
DUP     CONSTANT        FIRSTOP
1+      CONSTANT        FIRSTVAL
```

( STACKS & BUFFERS )

```
SSIZE BARRAY STACK      RSIZE BARRAY RSTACK
```

( KEYS)

```
2E      CONSTANT        .KEY
2F      CONSTANT        CLEARKEY
44      CONSTANT        PROGCLEARKEY
48      CONSTANT        PROG#KEY
4I      CONSTANT        RETRACTKEY
4F      CONSTANT        NEWMODE
```

( TOKEN )
```
1       CONSTANT        JOBTOKEN
2       CONSTANT        STEPTOKEN
3       CONSTANT        CYCLETOKEN
4       CONSTANT        POSITIONTOKEN
5       CONSTANT        BENDALLWTOKEN
6       CONSTANT        ANGLETOKEN
7       CONSTANT        RETRACTTOKEN
8       CONSTANT        DIETOKEN
9       CONSTANT        MATLTOKEN
0A      CONSTANT        FULLBENDTOKEN
0B      CONSTANT        ADEPTHTOKEN
```

( COMMUNICATION CODES)
```
8A      CONSTANT        ENDCODE
77      CONSTANT        REWINDCODE
73      CONSTANT        SAVECODE
4F      CONSTANT        MODESETCODE
6C      CONSTANT        LOADCODE
68      CONSTANT        HARDERRCODE
62      CONSTANT        BITCODE
4E      CONSTANT        NUMCODE
45      CONSTANT        LAMPCODE
( 44    CONSTANT        MMCODE )
43      CONSTANT        INCHCODE
42      CONSTANT        PRINTCODE
41      CONSTANT        ALPHACODE
3A      CONSTANT        HEARME
6       CONSTANT        ACK
```

( OTHER CONSTANTS )

```
DECIMAL
25000      CONSTANT      REFERENCEPOS
4000       CONSTANT      CALIBRATEPOS
HEX
40         CONSTANT      BLKSIZE ( VARIABLES)
0          VARIABLE      PROGSTATE
0          VARIABLE      FLAGS
160        VARIABLE      LAMPS
0          VARIABLE      LAST?
0          VARIABLE      USEDMEMORY
0          VARIABLE      JOBPOINTER
0          VARIABLE      STEPPOINTER
0          VARIABLE      OPPOINTER
0          VARIABLE      TESTLOC
0          VARIABLE      CURRENTVALUE
0          VARIABLE      MULTIPLIER
0          VARIABLE      GROUP
0          VARIABLE      BASEVALUE
0          VARIABLE      MAXVALUE
0          VARIABLE      BASEMULT
0          VARIABLE      CYCLES
0          VARIABLE      RENDALLH
0          VARIABLE      POSITION
5AC3       CONSTANT      TESTVAL ( DOUBLE PERCISION ACCUMULATOR, KEEP THESE TOGETHER )
0          VARIABLE      DPAH
0          VARIABLE      DPAL

0          VARIABLE      R0       ( REGISTERS)
0          VARIABLE      R1

1A         BARRAY        DISPBUF

14         CONSTANT      PIOAD
200        CONSTANT      MAXOFFSET ( FLAGS)
1          CONSTANT      NOKEY?
2          CONSTANT      NOENTRY?
4          CONSTANT      DECPT?
8          CONSTANT      OFFSET?
10         CONSTANT      +?
20         CONSTANT      CLEAR?
40         CONSTANT      NEWENTRY?
80         CONSTANT      REVBEND?

( FLAG ROUTINES)

: SET FLAGS @ : FLAGS ! ;
: RESET COM FLAGS @ & FLAGS ! ;
: TEST FLAGS @ & NOT NOT ;

[END-OF-FILE]

( RAM VERSION ONLY ) 4 BARRAY DPA 0 DPA CONSTANT DPAL 2 DPA CONSTANT DPAH
```

( DOUBLE PERCISION MACHINE)

```
: ROL RO B@ ;   ( TAKE REGISTERS APART)
: ROH RO 1- B@ ;
: R1L R1 B@ ;
: R1H R1 1+ B@ ;

( DMUL --) )
        ( DPA (-- RO R1 * )
: DMUL
        0 DPAH !
        R1L ROL * DPAL
        R1L ROH * ROL R1H * + DPAL 1+ +!
        R1H ROH * DPAH +! ;

( DPA(-L --) )
        ( SHIFT DPA LEFT ONE BIT)
: DPA(-L
        DPAL @ DUP O< SWAP 1 (-L DPAL !
        DPAH @ 1 (-L + DPAH ! ;

( DDIV --) )
        ( RO (-- DPA RO / )
        ( R1 (-- DPA RO MOD )
: DDIV
        RO @ DUP DPAH @ - O<
        NOT IF 0 SWAP 10 0
                DO DPA(-L DUP DPAH @ SWAP - DUP O<
                   IF DROP SWAP 1 (-L SWAP
                   ELSE DPAH ! SWAP 1 (-L 1+ SWAP
                   ENDIF
                LOOP
                DROP RO ! DPAH @ R1 !
        ENDIF ;
[END-OF-FILE]
        ( COMMUNICATIONS )

( INITRCV --) )
        ( SETS UP RECPTION OF DATA )
: INITRCV
        BEGIN
           RCVBYTE HEARME =
                IF ACK XMTBYTE 1
                ELSE 0
                ENDIF
        END ;

( INITXMT --) )
        ( SETS UP TRANSMISSION OF DATA )
: INITXMT
        BEGIN HEARME XMTBYTE RCVBYTE ACK = END ;

( CLOSEXMT --) )
        ( CLOSES TRANSMISSION BY SENDINGS ENDCODE )
: CLOSEXMT
        ENDCODE XMTBYTE ;

( CLOSERCV --) )
        ( EXPECT ENDCODE, WAIT FOR RESET IF NOT. )
: CLOSERCV
        RCVBYTE ENDCODE = NOT IF BEGIN 0 END ENDIF ;
```

```
( GETKEY --> k )
        ( GETS KEY, K, FROM UART. ONLY ONE CHARACTER IS EXPECTED )
        ( GO INTO AN INFINITE LOOP IF MORE ARE RECIEVED )
: GETKEY
        INITRCV RCVBYTE
        RCVBYTE ENDCODE = NOT
                IF BEGIN 0 END ENDIF ;

( b SENDHEADER -- ) )
: SENDHEADER
        INITXMT XMTBYTE ;

( b SENDBYTE -- ) )
        ( SENDS BYTE n TO UART, FOLLOWED BY ENDCODE )
: SENDBYTE
        SENDHEADER CLOSEXMT ;

( s SENDSTRING -- ) )
        ( STRING AT s IS SENT. HEADER AND ENDCODE ARE NOT SENT)
: SENDSTRING
        DUP DUP B@ + 1+ SWAP 1+
        DO I B@ XMTBYTE LOOP ;

( LAMPDISP -- ) )
: LAMPDISP
        LAMPCODE SENDHEADER
        LAMPS @ XMTBYTE CLOSEXMT ;

( MODESETTING --> m )
        ( RETURNS CURRENT SETTING, m, OF MODE KEY )
: MODESETTING
        MODESETCODE SENDHEADER CLOSEXMT GETKEY ;

( KEYIN --> k 1 IF KEY IS PRESSED )
    ( -- ) n 1 IF NEW MODE IS SELECTED )
    ( -- ) 0  IF FOOTSWITCH IS PRESSED )

( WAIT FOR OPERATOR ROUTINE. HE CAN EITHER )
        ( 1: PRESS A KEY, K, THEN K 1 IS RETURNED )
        ( 2: PRESS FOOTSWITCH. THEN 0 IS RETURNED )
        ( 3: CHANGE MODESETTING, THEN NEWMODE 1 IS RETURNED )

: KEYIN
        BEGIN KEYREADY?
           IF GETKEY 1 1
           ELSE FOOTSWITCH?
              IF 0,1
              ELSE 0
              ENDIF
           ENDIF
        END ;

( PKEYIN --> k )
        ( KEYIN ROUTINE FOR PROGRAMMODE. FOOTSWITCH IS IGNORED )

: PKEYIN
        BEGIN KEYIN END ;
```

```
( g DSIZE -- n )
        ( RETURNS THE SIZE, n, OF DISPLAY GROUP g )
: DSIZE
        DUP DISPLOW SWAP DISPHIGH - 1+ ;

( g GOUT -- )
        ( SENDS GROUP g TO DISPLAY )
: GOUT
        DUP DISPLAMP 47 + SENDHEADER
        DUP DISPHIGH DISPBUF SWAP DSIZE
        0 DO DUP R@ XMTBYTE 1+ LOOP
        DROP ENDCODE XMTBYTE ;

0 VARIABLE OVERTRAVEL
0 VARIABLE RAMTARGET
0 VARIABLE RAMPOSITION

CODE RAMTRACK
        HL PUSH   AF PUSH
        RAMPOSITION ^ HL LD
        PIOAD IN   40 AND
          Z IF,   HL DEC         ( RAM moving down )
          ELSE    HL INC          ( RAM moving up )
          ENDIF,
        HL RAMPOSITION ^ LD
        AF POP   HL POP   EI  RETI
EDOC ( 'B RAMTRACK TRACK T! )

CODE RAMZERO
        HL PUSH   AF PUSH
        PIOAD IN   40 AND
          NZ IF,   OVERTRAVEL HL LD  (HL) DEC  ( RAM moving up )
            Z IF,  TRACK A LD   PIOAC OUT    Switch to RAMTRACK
            OVERRAM A LD    RAMPOSITION HL LD
            A (HL) LD   HL INC   C (HL) LD
            PIOBD IN   10 OR   PIOBD OUT
            ENDIF,
          ELSE,  OVERRAM A LD    A OVERTRAVEL ^ LD
          ENDIF,
AF POP  HL POP  EI  RETI
EDOC ( 'B RAMZERO RZERO T! )

CODE REDDEN
        HL PUSH   AF PUSH   PIOAD IN  40 AND
          Z IF,  RAMPOSITION ^ HL LD   HL DEC   HL RAMPOSITION ^ LD
          OVERRAM A LD    A OVERTRAVEL ^ LD
          ELSE,  RAMPOSITION ^ HL LD   HL INC   HL RAMPOSITION ^ LD
          OVERTRAVEL HL LD   (HL) DEC
            Z IF,  TRACK A LD   PIOAC OUT
            MOVEPORT IN   0F? AND   MOVEPORT OUT
```

```
                   ENDIF,
                ENDIF;
        AF POP    HL POP    EI   RETI
EDOC ( 'R BENDEND ENDBEND T! )

CODE RAMBEND
        HL PUSH    DE PUSH    AF PUSH    PIOAD IN    40 AND
        Z IF,  RAMPOSITION ^ HL LD   HL DEC    HL RAMPOSITION ^ LD
               RAMTARGET ^ DE LD    A OR    DE HL SBC
               OVERRAM A LD    A OVERTRAVEL ^ LD
               H A LD    L OR
                 Z IF,  ENDBEND A LD    PIOAC OUT
                        PIOBD IN    18 OR    PIOBD OUT
                 ENDIF,
        ELSE,  RAMPOSITION ^ HL LD    HL INC    HL RAMPOSITION ^ LD
               OVERTRAVEL HL LD    (HL) DEC
                 Z IF,  TRACK A LD    PIOAC OUT
                        PIOBD IN    18 OR    PIOBD OUT
                 ENDIF,
        ENDIF,
        AF POP    DE POP    HL POP    EI    RETI
EDOC ( 'R RAMBEND RBEND T! )

DECIMAL 1 2 3 5 7 9 14 23 51 0 10 ROMARRAY PULSEPERIOD

HEX

CODE DIRECTION
        PIOBD IN    HL POP    H 7 BIT
        NZ IF,  2 OR    4 E LD
          ELSE,  OFD AND    2 E LD
        ENDIF
        PIOBD OUT    DE PUSH    $PUSH JP    EDOC

: PROFILE
        0  0A 0 DO
                SWAP OVER -
                I PulsePERIOD SWAP
                4 ROLL SWAP
                4 PICK 14 +     ( BASICSTEP = 14H )
                OVER 1 ( IF EXIT ENDIF
                LOOP
DROP 4 ROLL + ROT ROT ; ( TOS: limit mask, then up to 10 pairs )
                        (       of period count and length )
                        (       last pair is zeros )
```

```
CODE LLRUN       PIOBD IN  80 OR  PIOBD OUT     ( go into high gear )
        DE POP                                  ( get limit mask )
        BEGIN,
            BC POP                              ( get period count )
            B A LD  C OR  Z IF,  HL POP  $NEXT JP  ( exit if count = 0 )
            ENDIF,
            HL POP  HL HL ADD                   ( length )
                C B LD                          ( save period count )
                BEGIN,
                    B C LD                      ( get and save period )
                    PIOAD IN  E AND             ( test limit switch )
                       Z IF,
                           BEGIN,               ( at limit )
                               HL POP  H A LD  L OR  ( clear stack )
                           Z END,
                           HL POP  $NEXT JP
                       ENDIF,
                       BEGIN,
                           C DEC                ( period count )
                       Z END,
                       STEP OUT  HL DEC  H A LD  L OR  ( 1 step pulse )
                Z END,
        REPEAT,
EDOC                           ( 1 flag indicates limit )
CODE RUNEND ,
        PIOBD IN  7F AND  HL POP  L DEC
        Z IF,  4 OR  PIOBD OUT  OFB AND  ENDIF,
        PIOBD OUT  $PUSH JP  EDOC ( p RUNWAIT -- ) ATLIMIT? )
        ( WAITS UNTIL LIMIT SWITCH IS HIT OR POSITION IS )
        ( WITHIN MAXOFFSET OF p  )
: RUNWAIT
        BEGIN  PIOAD ZIN  COM 6 &
            IF DROP 1 1
            ELSE DUP POSIN - ABS MAXOFFSET (
               IF DROP 0,1
               ELSE 0
               ENDIF
            ENDIF
        END ;

: MOVE
        POSIN SWAP DUP
            IF DIRECTION ABS PROFILE LLRUN RUNWAIT RUNEND
            ELSE SWAP DROP NOT
            ENDIF ;

: DELAY  500 0 DO LOOP ;

CODE ONESTEP
        STEP OUT  20 HL LD  C C LD
           BEGIN,
                PIOAD IN  C OR  A C LD  HL DEC  H - LD  L OR
           Z END,
        C A LD
        RET
EDOC
```

```
CODE OFFLIMIT
      PIOBD IN 2 OR PIOBD OUT
        BEGIN,
           'R ONESTEP 3 - CALL
          2 AND NZ IF,
                    $NEXT JP
                 ENDIF,
        REPEAT,
EDOC

CODE TOINDEX
      BEGIN,
         'R ONESTEP CALL
         1 AND NZ IF,
                   $NEXT JP
              ENDIF,
         REPEAT,
EDOC

DECIMAL

: REFERENCE
       27000 MOVE DROP DELAY OFFLIMIT TOINDEX REFERENCEPOS POSITION ! ;
HEX ( p MOVEBACKGAUGE --> NOTATLIMIT? )
       ( MOVES BACKGAUGE TO POSITION p, RETURNS 0
         IF LIMIT SWITCH IS HIT, 1 OTHERWISE )
: MOVEBACKGAUGE
       POSITION 2DUP @ 2SWAP ! - MOVE ;

( NOREVBEND -- )
        ( SETUP FOR FULL CYCLE BEND )
CODE NOREVBEND
       TRACK A LD    EDOC

CODE BENDSET
       PIOAC OUT  OVERRAM A LD   A OVERTRAVEL ^ LD   $NEXT JP   EDOC ( LOCZEROBEND -- )
        ( SETUP FOR BEND TO FIND BOTTOM )
CODE LOCZEROBEND
       RZERO A LD   'R BENDSET JP   EDOC ( p REVBEND -- )
        ( SETUP FOR BEND WITH RAM REVERSE AT p )
CODE REVBEND
       HL POP    HL RAMTARGET ^ LD    RBEND A LD   'R BENDSET JP   EDOC ( s ADISPLAY -- )
        ( SENDS STRING AT s, HEADER AND ENDCODE ARE ALSO SENT )
: ADISPLAY
       ALPHACODE SENDHEADER
       SENDSTRING
       CLOSEXMT ;

: $TYPE
```

```
            R> DUP DUP B@ 1+ + >R ADISPLAY ;
'B $TYPE   '$TYPE !

( BLANKADISPLAY -- )
        ( BLANKS ALPHA DIAPLAY )
: BLANKADISPLAY
        TYPE" " ;

TDP @ '$ERROR !
( s $ERRORMESSAGE -- )
        ( MESSAGE AT s IS SENT. PROGRAM WAITS UNTIL THE
        ( CLEARKEY IS PRESSED)
: $ERRORMESSAGE
        ALPHACODE SENDHEADER
        SENDSTRING
        CLEARTEXT SENDSTRING
        CLOSEXMT
        BEGIN PKEYIN CLEARKEY = END
        BLANKADISPLAY ;

( COMMON MESSAGES)

ERRORMESSAGE OUTOFMEMERR OUT OF MEMORY. "
ERRORMESSAGE RANGEERR ENTRY OUT OF RANGE. "
ERRORMESSAGE JOBEXISTSERR JOB ALREADY EXISTS "
ERRORMESSAGE BADJOBERR NO JOB "
ERRORMESSAGE NOSTEPERR NO STEP "

: RETRACTMESSAGE TYPE" RETRACT" ;

( NEWDIMENSION -- )
        ( CHANGES DIMENSION FOR LENGTHS. TURN ON CORRESPONDING LAMP )
: NEWDIMENSION
        LAMPS @ 300 X! DUP LAMPS !
        200 )= INCHCODE + SENDBYTE ;

( a1 a2 ... an n $PRINTLINE -- )
        ( SEND A LINE OF CHARACTERS TO THE PRINTER  NUMBER OF )
        ( CHARACTERS, n, IS EXPECTED AT TOS )
: $PRINTLINE
        PRINTCODE SENDHEADER
        0 DO XMTBYTE LOOP
        CLOSEXMT ;

: PRINTLINE
        OFF 15 $PRINTLINE ;

: BLANKLINE
        "BLANK" OFF 2 $PRINTLINE ;

( b BITOUT -- )
        ( BYTE b IS DISPLAYED IN BINARY ON ALPHDISPLAY )
: BITOUT
        BITCODE SENDHEADER XMTBYTE CLOSEXMT ;

( CASSETTE ROUTINES )

( a s BLOCKWRITE -- )
```

```
( WRITE s BYTES TO TAPE STARTING AT a. THEN WRITE CHECKSUM )
CODE BLOCKWRITE
        DE POP   HL POP   0 C LD
        BEGIN,
           30 A LD   RLD   'B XMTBYTE1 CALL   RLD   'B XMTBYTE1 CALL
           RLD   (HL) A LD   C XOR   A C LD   E DEC   HL INC
        Z END,
        C A LD   'B XMTBYTE1 CALL   $NEXT JP   ENDC ( a s BLOCKREAD --) )
        ( READ s BYTES INTO LOCATIONS STARTING AT a. CHECK CHECKSUM )
CODE BLOCKREAD
        DE POP   HL POP   0 C LD
        BEGIN,
           'B RCVBYTE1 CALL   RLD   'B RCVBYTE1 CALL   RLD
           (HL) A LD   C XOR   A C LD   E DEC   HL INC
        Z END,
        'B RCVBYTE1 CALL   C XOR   'B $ZPUSH JP   ENDC ( a s n WRITEBLOCKN --) )
        ( WRITE s BYTES STARTING AT a TO TAPE IN A BLOCK IDENTIFIED )
        ( AS n )
: WRITEBLOCKN
        XMTBYTE 2DUP + USEDMEMORY @ PROGMEMORY )
        DUP LAST? ! XMTBYTE BLOCKWRITE CLOSEXMT ;

( a s n READBLOCKN --) GOOD? )
        ( IF NEXT BLOCK IS n THEN READ s BYTE INTO MEMORY STARTING )
        ( AT a AND CHECK CHECKSUM, ELSE IGNORE BLOCK )
: READBLOCKN
        RCVBYTE = RCVBYTE LAST? !
           IF BLOCKREAD NOT
           ELSE DUP + 2 + 0 DO RCVBYTE DROP LOOP NOT
           ENDIF ;

[END-OF-FILE]

HEX
( I/O ROUTINES)

( KEY ROUTINES)
( k KEYTYPE --) k t )
        ( RETURNS TYPE t, OF KEY k )
CODE KEYTYPE
        HL POP   HL PUSH   L A LD   -1 HL LD   40 SUB
          NC IF,   HL INC   9 SUB
            NC IF,   HL INC
              NZ IF,   HL INC   6 SUB
                NC IF   HL INC
                ENDIF,
              ENDIF,
            ENDIF,
          ENDIF,
        $PUSH JP   ENDC ( NOTE: THE FOLLOWING EXPECT A KEY, k, AT TOS. k IS LEFT AT TOS-1)

: DIGITKEY? KEYTYPE 1+ 0= ;
```

: PROGKEY KEYTYPE 3 UK ;

( SIMPLE OUTPUT ROUTINES)

( LAMP ROUTINES)

( n LAMPMASK--) 2^(n-1) )
: LAMPMASK
    DUP 1 = NOT
        IF 1 SWAP 1- (-L ENDIF ;

( n NEWLAMP--)
: NEWLAMP
    LAMPS @ 300 & SWAP
    LAMPMASK ! LAMPS ! LAMPDISP ;

: MM?
    LAMPS @ 100H & NOT ;

DECIMAL ( n f FRACTION --) n' )
    ( COMPUTES n'=n*f/1000 )
: FRACTION
    R1 ! R0 ! DMUL 1000 R0 ! DDIV R0 @ ;

( n INCHTOMM--) n' )
: INCHTOMM
    254 FRACTION R1 @ IF 1+ ENDIF ;

( n MMTOINCH--) n' )
: MMTOINCH
    R0 ! 1000 R1 ! DMUL 254 R0 ! DDIV R0 @ ;
HEY

[END-OF-FILE]

( PROGRAM MODE )

( LOW LEVEL ROUTINES)

: INVALID 0 TESTLOC ! ;          ( MARK MEMORY INVALID )
: VALID TESTVAL TESTLOC ! ;      ( MARK MEMORY VALID )
: THISOP OPPOINTER @ @ ;
: THISVALUE OPPOINTER @ 1+ @ ;
: THISSTEP STEPPOINTER @ 1+ @ ;
: THISJOB JOBPOINTER @ 1+ @ ;
: STEP=OP OPPOINTER @ STEPPOINTER ! ;
: OP=STEP STEPPOINTER @ OPPOINTER ! ;
: JOB=OP OPPOINTER @ JOBPOINTER ! ;
: OP=JOB JOBPOINTER @ OPPOINTER ! ;
: STEPZERO JOBPOINTER @ 3 + STEPPOINTER ! OP=STEP ;
: JOBZERO 0 PROGMEMORY JOBPOINTER ! STEPZERO ;
: NEXTOP 3 OPPOINTER +! ;
( n NSTORE)
: NSTORE OPPOINTER @ 1+ ! ;

```
( t TSTORE )
: TSTORE OPPOINTER @ B! ;
: EMPTYJOB? STEPZERO NEXTOP THISOP 2 ( ;

( MID-LEVEL ROUTINES)

: LOCATEEND
        JOBZERO BEGIN NEXTOP THISOP 0= END
        OPPOINTER @ 0 PROGMEMORY - USEDMEMORY !
        OP=STEP ;

: NEWMEMORY
        100H LAMPS   VALID
        MEMSIZE 0 PROGMEMORY 0 FILL
        0 PROGMEMORY DUP 3 +
        STEPTOKEN SWAP B! JOBTOKEN SWAP B!      ( JOBZERO)
        LOCATEEND ;

( OPEN -- )ENOUGHROOM?)
        ( OPENS 3 BYTES AT OPPOINTER)
: OPEN
        MEMSIZE USEDMEMORY @ - 6 (
            IF OUTOFMEMERR 0
            ELSE OPPOINTER @ DUP DUP 3 + ROT
                USEDMEMORY @ DUP 3 + USEDMEMORY !
                PROGMEMORY SWAP - RMOVE 1
            ENDIF ;

( CLOSE -- )
        ( DELETES 3 BYTES AT OPPOINTER)
: CLOSE
        OPPOINTER @ DUP DUP 3 + SWAP ROT
        USEDMEMORY @ 3 - DUP USEDMEMORY !
        PROGMEMORY SWAP - RMOVE
        3 USEDMEMORY @ PROGMEMORY 0 FILL ;

( t SEARCH -- )FOUND?)
        ( POSITIONS OPPOINTER TO WHERE TOKEN t SHOULD BE IN
        ( CURRENT STEP)
: SEARCH
        OP=STEP
        BEGIN NEXTOP THISOP 2DUP =
            IF 2DROP 1 1
            ELSE 3 (
                IF DROP 0,1
                ELSE 0
                ENDIF
            ENDIF
        END ;

( NUMBCYCLES -- ) 1 IF NO CYCLE TOKEN )
        ( -- ) n OTHERWISE )
        ( RETURNS THE NUMBER OF CYCLES IF CYCLES HAVE BEEN ENTERED )
        ( OR 1 OTHERWISE, )
: NUMBCYCLES
        CYCLETOKEN SEARCH
            IF THISVALUE
            ELSE 1
            ENDIF ;

( t GETVAL -- ) v )
        ( RETURNS VALUE v ASSOCIATED WITH TOKEN t, IT IS ASSUMED )
```

```
                ( THAT TOKEN t IS IN STEP )
: GETVAL
        SEARCH DROP THISVALUE ;
( n NEWSTEP--)ENOUGHROOM?)
        ( CREATES STEP n AT OPPOINTER,  GOES TO STEPZERO
        ( IF NOT ENOUGHROOM)
: NEWSTEP
        OPEN
          IF NSTORE STEPTOKEN TSTORE STEP=OP 1
          ELSE STEPZERO 0
          ENDIF ;
( n NEWJOB--)ENOUGHROOM?)
        ( CREATES JOB n AT OPPOINTER)
        ( GOES TO JOBZERO IF NOT ENOUGHROOM)
: NEWJOB
        OPEN
          IF NSTORE JOBTOKEN TSTORE JOB=OP NEXTOP 0 NEWSTEP
               IF 1
               ELSE OP=JOB CLOSE JOBZERO 0
               ENDIF
          ELSE JOBZERO 0
          ENDIF ;
( n t TNSTORE--) )
        ( STORES DATA n WITH TOKEN t IN CURRENT STEP
        ( OLD DATA, IF ANY, IS OVERWRITTEN)
: TNSTORE
        DUP SEARCH
        IF DROP NSTORE
        ELSE OPEN
               IF TSTORE NSTORE
               ELSE 2DROP
               ENDIF
        ENDIF ;
( NEXTSTEP--)FOUND?)
        ( SETS OPPOINTER TO WHERE NEXTSTEP SHOULD BE)
: NEXTSTEP STEPTOKEN SEARCH ;
( NEXTJOB--)FOUND?)
        ( SETS OPPOINTER TO WHERE NEXTJOB SHOULD BE)
: NEXTJOB
        STEPZERO
           BEGIN NEXTSTEP
               IF STEP=OP 0
               ELSE THISOP JOBTOKEN = 1
               ENDIF
           END ;
( n FINDSTEP--)FOUND?)
        ( SETS OPPOINTER TO WHERE STEP n SHOULD BE
: FINDSTEP
        STEPZERO
          BEGIN DUP THISVALUE STEP=OP 2DUP =
               IF 2DROP 1 1
               ELSE (
                  IF 0 1
                  ELSE NEXTSTEP
                      IF 0
                      ELSE 0 1
                      ENDIF
                  ENDIF
```

```
                ENDIF
            END
        SWAP DROP ;
( n FINDJOB -- )FOUND?)
    ( SETS OPPOINTER TO WHERE JOB n SHOULD BE)
: FINDJOB
    JOBZERO
        BEGIN DUP THISVALUE 2DUP =
            IF 2DROP 1 1 STEPZERO
            ELSE (
                IF 0,1
                ELSE NEXTJOB JOB=OP
                    IF 0
                    ELSE 0,1
                    ENDIF
                ENDIF
            ENDIF
        END
    SWAP DROP ;
( JOBERASE -- )
    ( REMOVES EVERYTHING FROM OPPOINTER TO NEXTJOB )
: JOBERASE
    BEGIN THISOP 2 ( DUP NOT
        IF CLOSE ENDIF
    END ;
( CLEARJOB -- )
    ( REMOVE ALL STEPS FROM CURRENT JOB EXCEPT STEPZERO)
: CLEARJOB
    STEPZERO NEXTSTEP DROP
    JOBERASE STEPZERO ;
( DELETEJOB -- )
    ( REMOVES CURRENT JOB)
: DELETEJOB
    OP=JOB CLOSE
    JOBERASE ;
( DELEMPTYSTEP -- )EMPTY?)
: DELEMPTYSTEP
    THISSTEP
      IF
        OP=STEP NEXTOP THISOP 3 ( DUP
            IF OP=STEP CLOSE ENDIF
      ELSE 0
      ENDIF ;
( DELEMPTYJOB -- )EMPTY?)
: DELEMPTYJOB
    THISJOB
      IF
        STEPZERO NEXTSTEP NOT DUP
            IF DELETEJOB ENDIF
      ELSE 0
      ENDIF ;
+NEXTSTEP -- )ENOUGHROOM?)
    ( DELETES CURRENT STEP, IF EMPTY
    ( FINDS NEXTSTEP, CREATES NEW STEP
    ( IF LAST STEP, NOT EMPTY, ROLLS
    ( AROUND TO STEP ZERO IF LASTSTEP, EMPTY)
```

```
: +NEXTSTEP
    DELEMPTYSTEP
        IF 1 THISOP 2 <
            IF STEPZERO ENDIF
        ELSE 1 NEXTSTEP NOT
            IF THISSTEP + DUP 63 >  IF DROP STEPZERO 1
                                    ELSE NEWSTEP
                                    ENDIF
            ELSE STEP=OP
            ENDIF
        ENDIF
    ENDIF ;

( +NEXTJOB-- )
    ( DELETES CURRENT JOB, IF EMPTY
    ( GOES TO NEXTJOB. ROLLS AROUND TO
    ( JOBZERO IF LASTJOB)
: +NEXTJOB
    DELEMPTYJOB
        IF THISOP 1 <
            IF JOBZERO ENDIF
        ELSE NEXTJOB NOT
            IF JOBZERO
            ELSE JOB=OP
            ENDIF
        ENDIF
    STEPZERO ;

( n +FINDSTEP-- )ENOUGHROOM?
    ( DELETES CURRENT STEP, IF EMPTY
    ( FINDS OR CREATES STEP n)
: +FINDSTEP
    DELEMPTYSTEP DROP DUP FINDSTEP
        IF DROP 1
        ELSE NEWSTEP
        ENDIF ;

( n +FINDJOB-- )ENOUGHROOM?
    ( DELETES CURRENT JOB, IF EMPTY
    ( FINDS OR CREATES JOB n)
: +FINDJOB
    DELEMPTYJOB DROP DUP FINDJOB
        IF DROP 1
        ELSE NEWJOB
        ENDIF ;

( HIGH LEVEL I/O)

( HIGH LEVEL OUTPUT)

( g DBLANK-- )
    ( BLANKS DISPLAY GROUP g )
: DBLANK
    DUP DUP DSIZE SWAP DISPHIGH DISPBUF "BLANK" FILL COUT ;

( g DROLL-- )
    ( ROLLS DISPLAY GROUP g )
: DROLL
    DUP DISPHIGH DISPBUF 1+ DUP 1-
    ROT DSIZE 1- BMOVE ;

( b g +DROLL-- )ENOUGHROOM?)
```

```
( ROLLS DISPLAY GROUP IN VARIABLE GROUP,
( CHECKS IF THERE IS ENOUGH ROOM, THAT IS
( ONLY BLANKS CAN BE DROPPED. THE CHARACTER
( LOST DEPENDS ON THE SETTING OF THE DECPT?
( FLAG. )
: +DROLL
      GROUP B@ DUP DISPHIGH DISPBUF
      DECPT? TEST NOT + B@ "BLANK" =
            IF DUP DROLL DISPLOW DISPBUF B! 1
                GROUP B@ GOUT
            ELSE 2DROP 0
            ENDIF ;

( n BTOD --) d1 d2 d3 d4 d5 )
      ( CONVERTS n TO ASCII-DECIMAL, RESULT ON STACK)
: BTOD
      5 0 DO 0A U/MOD SWAP "0" + SWAP LOOP DROP ;

( p .PUT --)... 2E ... ( PUTS '.' AT TOS-p) )
: .PUT
      .KEY SWAP 6 SWAP - DUP
            IF -ROLL ELSE DROP ENDIF ;

( d1 d2 d3 d4 d5 d6 g STACKTODISPBUF --)
      ( MOVES ASCII DATA d1...d6 TO GROUP g OF DISPBUF)
: STACKTODISPBUF
      DUP 6 SWAP DSIZE -
         DUP IF 0 DO SWAP DROP LOOP ELSE DROP ENDIF
      DUP DISPHIGH DISPBUF SWAP DSIZE
         0 DO DUP ROT SWAP B! 1+ LOOP
      DROP ;

( d1 d2 d3 d4 d5 d6 FORMAT--) d1' d2' d3' d4' d5' d6' )
      ( FORMATS 6 ASCII DIGITS ON STACK FOR OUTPUT)
      ( A DECIMAL POINT AT THE END IS DELETED. LEADING
      ( ZEROS ARE TURNED INTO BLANKS. A DIGIT
      ( ALWAYS PRECEEDS A '.' . )
: FORMAT
      6 PICK .KEY =
            IF 6 ROLL DROP "0" ENDIF
      5 BEGIN
         SWAP DUP "0" =
            IF DROP "BLANK" 7 -ROLL 1- DUP
            ELSE DUP .KEY =
                   IF 7 ROLL DROP "0" 7 ROLL ENDIF
               SWAP 0
            ENDIF
         0= END
      1+ BEGIN SWAP 7 -ROLL 1- DUP 0= END
      DROP ;

( g n NDISP--) )
      ( CONVERTS AND FORMATS n, THEN PUTS IT INTO
      ( DISPLAY BUFFER AT GROUP g )
: NDISP
      SWAP DUP ROT
      BTOD 6 PICK DECPTPOS .PUT FORMAT 7 ROLL STACKTODISPBUF
      GOUT ;

( n t MMGROUP--) g n )
      ( CHECKS MM FLAG. IF SET THEN MM CONVERSION IS
      ( MADE IF NECCESSARY. )
```

```
: MMGROUP?
    MM?
        IF DUP DECPTPOS 3 =
            IF 7 = SWAP INCHTOMM SWAP ENDIF
        ENDIF
    SWAP ;

( t VALUEDISPLAY -- )
    ( DISPLAYS VALUE ASSOCIATED WITH TOKEN t IN CURRENT
    ( STEP, BLANKS DISPLAY IF THERE IS NO TOKEN
    ( t IN CURRENT STEP )
: VALUEDISPLAY
    DUP SEARCH
        IF THISVALUE SWAP MMGROUP? NGDISP
        ELSE DBLANK
        ENDIF ;

: RETRACTDISPLAY
    RETRACTTOKEN SEARCH
        IF RETRACTMESSAGE
        ELSE BLANKADISPLAY
        ENDIF ;

( CHANGERETRACT -- )
    ( IF NOT STEPZERO THEN RETRACT IS CHANGED )
    ( ON TO OFF AND OFF TO ON )
: CHANGERETRACT
    THISSTEP
        IF RETRACTTOKEN SEARCH
            IF CLOSE
            ELSE 0 RETRACTTOKEN INSTORE
            ENDIF
        ENDIF ;

( STEPDISPLAY -- )
: STEPDISPLAY
    JOBTOKEN THISJOB NGDISP
    STEPTOKEN THISSTEP NGDISP
    CYCLETOKEN NUMBCYCLES NGDISP
    7 4 DO I VALUEDISPLAY LOOP
    RETRACTDISPLAY ;

( HIGH LEVEL INPUT )

( CLEAR0 -- )
    ( RESETS ENTRY PARAMETERS FOR NEW ENTRY )
: CLEAR0
    0 CURRENTVALUE !
    BASEMULT @ MULTIPLIER ! NEWENTRY? SET
    DECPT? RESET OFFSET? RESET CLEAR? SET
    NOENTRY? RESET ;

: CLEAR
    GROUP B@ DBLANK CLEAR0 ;

( g ENTRYPARAMS -- )
    ( SETS UP ENTRYPARAMETERS FOR GROUP g )
: ENTRYPARAMS
    DUP DISPLAMP NEWLAMP
    DUP GROUP  DUP BMARRAY BASEMULT !
    MUARRAY MAXVALUE ! CLEAR0 CLEAR? RESET ;

( n t ENTRYSETUP -- )
    ( SET UP FOR TOKEN t WITH BASEVALUE n )
: ENTRYSETUP
```

```
*'GROUP BASEVALUE ! ENTRYPARAMS ;

( t PENTRYSETUP--)
        ( SPECIAL SETUP FOR PROGRAMMODE)
: PENTRYSETUP
        DUP SEARCH
                IF THISVALUE
                ELSE 0
                ENDIF
        SWAP ENTRYSETUP ;

( d NEWENTRY--) d )
        ( SPECIAL ACTION FOR FIRST DIGIT)
: NEWENTRY
        GROUP B@ DBLANK DUP DUP
        .KEY = IF "0" +DROLL DROP ENDIF
        .KEY )= IF NEWENTRY? RESET ENDIF ;

( M/0A--) )
: M/0A
        MULTIPLIER @ 0A / MULTIPLIER ! ;

( =OFFSET --) )
        ( IF OFFSET? IS SET THEN CURRENTVALUE IS UPDATED.
        ( IF OVERFLOW OCCURS THEN ERROR MESSAGE IS GIVEN
        ( AND ENTRY IS CLEARED.  OTHERWISE THE NEWVALUE
        ( IS DISPLAYED AND MULTIPLIER IS SET SO THAT
        ( NO FURTHER ENTRY CAN BE MADE)
: =OFFSET
        OFFSET? TEST
                IF BASEVALUE @ CURRENTVALUE @ +? TEST
                        IF + ELSE - ENDIF
                    DUP MAXVALUE @ U)
                        IF DROP RANGEERR BASEVALUE @ ENDIF
                    DUP GROUP B@ SWAP NCDISP
                        CURRENTVALUE ! OFFSET? RESET 0 MULTIPLIER !
                ENDIF ;

: +OFFSET
        OFFSET? SET +? SET ;

: -OFFSET
        OFFSET? SET +? RESET ;

( d INRANGE?--) d INRANGE? )
        ( CHECKS IF DIGIT d CAUSES OVERFLOW)
: INRANGE?
        MULTIPLIER @
            IF DUP "0" - MULTIPLIER @ * CURRENTVALUE @
                DECPT? TEST NOT IF DUP 176F U)
                                    IF DROP MAXVALUE @
                                    ELSE 0A *
                                    ENDIF
                                ENDIF
                    + MAXVALUE @ U(
            ELSE 0
            ENDIF ;

( d ADDIGIT--) d)
: ADDIGIT
        DUP "0" - MULTIPLIER @ * CURRENTVALUE @
        DECPT? TEST IF M/0A ELSE 0A * ENDIF
        + CURRENTVALUE ! ;
```

```
: CASE.KEY
      CLEAR? RESET
      DECPT? TEST NOT
      IF DECPT? SET .KEY +DROLL DROP M/OA ENDIF ;

: CASENUMKEY
      CLEAR? RESET
      INRANGE?
         IF DUP +DROLL
            IF ADDDIGIT ENDIF
         ENDIF ;

( d ENTER-- ) )
: ENTER
      NOENTRY? TEST
         IF DROP
         ELSE NEWENTRY? TEST IF NEWENTRY ENDIF
            DUP CASE
               =KEY =: =OFFSET ;;
               +KEY =: +OFFSET ;;
               -KEY =: -OFFSET ;;
               CLEARKEY =: CLEAR ;;
               .KEY =: CASE.KEY ;;
               NOCASE =: CASENUMKEY ;;
            CASEND
            DROP GROUP B@ GOUT
         ENDIF ;

( HAVEENTRY? --> 1 IF ENTRY IS READY IN CURRENTVALUE )
(            --> 0 OTHERWISE )
: HAVEENTRY?
      CLEAR? TEST NEWENTRY? TEST | NOT ;

[END-OF-FILE]

( PROGRAM MODE II)

( HIGH LEVEL ROUTINES)

: CASERR
      HARDERRCODE = DUP
         IF BEGIN PKEYIN CLEARKEY = END ENDIF ;

( n BASEADR --> n a )
      ( CALCULATES MEMORY LOCATION, a OF TAPE BLOCK n )
: BASEADR
      DUP 1- 6 (-L PROGMEMORY ;

( REWIND --> GOOD? )
: REWIND
      REWINDCODE SENDBYTE PKEYIN CASERR NOT ;

( SAVE -- )
: SAVE
      TYPE" SAVE" REWIND
         IF 3 ( tape repeats )
            BEGI - 1
               BEGIN DUP BASEADR BLKSIZE ROT
                  SAVECODE SENDHEADER WRITEBLOCKN
```

```
                    PKEYIN DUP ACK =
                        IF LAST? @ 1-
                            IF DROP 1+ 0 ENDIF
                        ELSE CASERR
                        ENDIF
                    END DROP
                    LAST? @ IF 1- ELSE NOT ENDIF DUP
                NOT END DROP
            ENDIF BLANKADISPLAY ;

( LOAD -- )  )
: LOAD
        TYPE" LOAD"   REWIND
        IF NEWMEMORY INVALID 1
            BEGIN DUP BASEADR BLKSIZE ROT
                LOADCODE SENDBYTE INITRCV RCVBYTE
                DUP ACK =
                    IF DROP READBLOCKN CLOSERCV
                        IF LAST? @
                            IF 1 ELSE 1+ 0 ENDIF
                        ELSE 0
                        ENDIF
                    ELSE CLOSERCV SWAP 2SWAP DROP 2DROP CASERR
                    ENDIF
                END DROP
            ENDIF BLANKADISPLAY LOCATEEND VALID ;

PRINTERSTRING RAM DEPTH"
PRINTERSTRING FULL ANGLE"
PRINTERSTRING MATERIAL"
PRINTERSTRING DIE"
PRINTERSTRING RETRACT"
PRINTERSTRING ANGLE"
PRINTERSTRING REND ALLW."
PRINTERSTRING POSITION"
PRINTERSTRING CYCLES"
PRINTERSTRING STEP"
PRINTERSTRING JOB #"

0 0C 2ROMARRAY OPTEXT
( PAPERFEED -- )  )
        ( PRINT 4 BLANK LINES )
: PAPERFEED
        4 0 DO BLANKLINE LOOP ;

( t PUSHOP -- ) 14 ASCII CHARACTERS )
        ( PUT TOKEN NAME ON STACK )
: PUSHOP
        OPTEXT DUP
        R@ OE SWAP - 0 DO "BLANK" SWAP LOOP
        DUP R@ DUP ROT + SWAP
        0 DO DUP R@ SWAP 1- LOOP DROP ;

( v t PUSHVALUE -- ) 6 ASCII CAHRACTERS )
        ( CONVERTS v TO ASCII AND PUTS IT ON THE STACK. SOME )
        ( v MAY NEED TO BE CONVERTED TO MM. IF t IS RETRACTTOKEN )
        ( THEN SIX BLANKS ARE PUT ON THE STACK )
: PUSHVALUE
        DUP RETRACTTOKEN =
```

```
                    ( 2DROP ; IF BLANK LOOP
              ELSE MMGROUP?
                    PTOP 6 ROLL DECPTPOS .PUT FORMAT
              ENDIF ;
( PRINT --) )
       ( PRINT CURRENT PROGRAM )
: PRINT
       OP=JOB PAPERFEED
       BEGIN THISOP 3 ( IF BLANKLINE ENDIF
          THISVALUE THISOP PUSHVALUE
          THISOP PUSHOP
          PRINTLINE
          NEXTOP THISOP 2 (
       END
       PAPERFEED STEPZERO ;

( PROGRAM MODE CONTROL)

( d PROGDATAENTER --) )
       ( d IS ENTERED. IF ENTRY IS FOR STEP THEN THE
       ( NEW STEP IS DISPLAYED)
: PROGDATAENTER
       ENTER PROGSTATE @ 1 =
                IF CURRENTVALUE @ +FINDSTEP NOT
                       IF CLEAR ENDIF
                   STEPDISPLAY
                ENDIF ;

: REMOVETOKEN
       SWAP SEARCH IF CLOSE ENDIF ;

: PUTTOKEN
       THISSTEP
           IF ROT TWSTORE 0
           ELSE 2DROP
           ENDIF ;

( PROGDATASTORE --) )
       ( ENTERED DATA IS PUT IN MEMORY, OR STEP OR JOB IS FOUND
       ( IF CLEAR? IS SET THEN THE OLD DATA IS ERASED OR
       ( GO TO STEP ZERO OR JOB ZERO )
: PROGDATASTORE
       NOENTRY? TEST NOT
       IF PROGSTATE @ CLEAR? TEST
              IF CASE
                     0 =: JOBZERO ;;
                     2 =: REMOVETOKEN ;;
                 CASEND
              ELSE NEWENTRY? TEST
                 IF 2 = IF SWAP DROP ENDIF
                 ELSE CURRENTVALUE @ GROUP R@ 04
                        IF MMTOINCH ENDIF
                    SWAP
                       CASE
                          0 =: +FINDJOB ;;
                          2 =: PUTTOKEN ;;
                       CASEND
                     DROP
                  ENDIF
              ENDIF
              STEPDISPLAY NOENTRY? SET
       ENDIF ;
```

```
( CLEARSOMETHING --> k )
        ( IF NEXT KEY IS PROGCLEARKEY THEN STEP IS CLEARED. )
        ( IF NEXT TWO KEYS ARE BOTH PROGCLEARKEYS THEN JOB )
        ( IS CLEARED. THE FIRST KEY THAT IS NOT PROGCLEARKEY )
        ( OR THE THIRD KEY IS RETURNED )
: CLEARSOMETHING
        TYPE" CLEAR PROG?"   PKEYIN DUP PROGCLEARKEY =
        IF DROP CLEARJOB STEPDISPLAY
           THISJOB JOBTOKEN ENTRYSETUP
        ELSE NOKEY? RESET
        ENDIF
        RETRACTDISPLAY ;

: NEXTJOB?
        1 NEWLAMP NOKEY? RESET
           BEGIN PKEYIN DIGITKEY?
                IF THISJOB JOBTOKEN ENTRYSETUP 1
                ELSE DUP PROG#KEY =
                   IF DROP +NEXTJOB STEPDISPLAY 0
                   ELSE 1
                   ENDIF
                ENDIF
           END ;

: STATE0
        DELEMPTYSTEP DROP STEPZERO STEPDISPLAY
             CASE
                PROGCLEARKEY =: CLEARSOMETHING ;;
                MEM-TAPEKEY =: SAVE ;;
                TAPE-MEMKEY =: LOAD ;;
                PROGPRINTKEY =: PRINT ;;
                INMMKEY =: NEWDIMENSION ;;
                PROG#KEY =: NEXTJOB? ;;
             CASEND ;

: STATE1
        2 NEWLAMP DROP
        +NEXTSTEP DROP STEPDISPLAY
        NOKEY? RESET PKEYIN
        DIGITKEY?
                IF THISSTEP STEPTOKEN ENTRYSETUP ENDIF
           ;
: STATE2
        DUP RETRACTKEY =
           IF DROP NOKEY? RESET CHANGERETRACT
              BEGIN RETRACTDISPLAY PKEYIN DUP RETRACTKEY =
                   IF DROP CHANGERETRACT 0
                   ELSE 1
                   ENDIF
              END
           ELSE 47 - DUP DUP ANGLETOKEN =
              IF ADEPTHTOKEN SEARCH IF CLOSE ENDIF
              ENDIF
              PENTRYSETUP
           ENDIF ;

: PROGKEY!
        KEYTYPE DUP PROGSTATE !
        CASE
           0 =: STATE0 ;;
           1 =: STATE1 ;;
```

```
                    2 =: STATE2 ;;
            CASEND ;

: PROGRAMMODE
        NOKEY? SET NOENTRY? SET
        0 PROGSTATE ! STEPDISPLAY
            BEGIN
                    NOKEY? TEST IF PKEYIN ENDIF
                    NOKEY? SET
                    DIGITKEY?
                        IF PROGDATAENTER 0
                        ELSE PROGDATASTORE 0 NEWLAMP
                            PROGKEY?
                                IF PROGKEY! 0
                                ELSE NEWMODE =
                                    IF 1
                                    ELSE NOENTRY? SET 0
                                    ENDIF
                                ENDIF
                        ENDIF
            END
            DELEMPTYSTEP DROP STEPZERO STEPDISPLAY ;

( END-OF-FILE )

( RUN MODE )

: REND
        TYPE" REND"    RAMON
        BEGIN RAMTOP? NOT END
        BEGIN RAMTOP? END
        BEGIN FOOTSWITCH? NOT END
        RAMOFF BLANKADISPLAY ;

( SIDETEST -- )    _ IF RAM ON RIGHT SIDE )
        ( -- ) K 0 IF KEY K IS PRESSED )

: SIDETEST
        WRONGSIDE?
            IF TYPE" REVERSE RAM"
                KEYI +
                    IF 0
                    ELSE MOVEVREND REND 1
                    ENDIF
            ELSE 1
            ENDIF ;

: JOBMOVE
        STEPZERO
            BEGIN FIRSTOP R@ 1 =
                IF 1
                ELSE OFPOINTER @ FIRSTVAL @ FIRSTOP R@
                        FIRSTOP OFPOINTER ! CLOSE
                        ROT OFPOINTER ! OPEN DROP
                        TSTORE NSTORE -3 JOBPOINTER +! 0
                ENDIF
            END ;
```

```
: RENUMBER
    HAVEENTRY?
        IF THISSTEP CURRENTVALUE @ +FINDJOB
            IF EMPTYJOB?
                IF JOBMOVE FINDSTEP DROP
                ELSE JOBEXISTSERR JOBZERO
                ENDIF
            ELSE DROP
            ENDIF
        ENDIF ;
: NEWPROGNUMBER
    DROP THISJOB 0=
        IF TYPE" NEW PROGRAM NUMBER?"
            0 JOBTOKEN ENTRYSETUP
            BEGIN KEYIN
                IF DIGITKEY?
                    IF ENTER 0
                    ELSE DROP 1
                    ENDIF
                ELSE 1
                ENDIF
            END
            RENUMBER
        ENDIF
        0 ;
: ANYANGLES?
    OP=JOB
    BEGIN NEXTSTEP STEP=OP
        IF ANGLETOKEN SEARCH
            IF 1 1
            ELSE 0
            ENDIF
        ELSE 0,1
        ENDIF
    END ;
( ANGLEINIT -- )
    ( CHECK FOR ANGLE BENDS )
: ANGLEINIT
    REVBEND? ANYANGLES?
        IF BEGIN SIDETEST
            IF 1
            ELSE NEWMODE =
            ENDIF
        END
        SET
        ELSE RESET
        ENDIF ;
( BENDSETUP -- )
    ( GET PID READY FOR NEXT BEND )
: BENDSETUP
    REVBEND? TEST
        IF THISSTEP
            IF ADEPT !TOKEN SEARCH
                IF THISVALUE 442 FRACTION     ( CONVERT TO COUNTS )
                ELSE 0
                ENDIF
                REVBEND
            ELSE !OCZEROBEND
```

```
            ENDIF
        ELSE NOREVBEND
        ENDIF ;

( RUNRAM --)   1  IF BEND DONE )
       ( --)  0 0 IF NEXT STEP )
       ( --)  1 0 IF NEW MODE )

: RUNRAM
       BEGIN KEYIN
           IF DUP NEWMODE = SWAP
               CASE
                   STEPKEY =: 0,1 ;;
                   PROG#KEY =: NEWPROGNUMBER ;;
                   NEWMODE =: 0,1 ;;
               CASEND
           ELSE BEND 1 1
           ENDIF
       END ;

: RETRACT
       TYPE" IN RETRACT"
       REFERENCEPOS MOVEBACKGAUGE DROP
       BEGIN KEYIN
           IF NEWMODE =
               IF R> 1 ELSE 0 ENDIF
           ELSE RETRACTMESSAGE 1
           ENDIF
       END ;

( RUNSTEP --)  1  IF NEW MODE )
        ( --)  0  OTHERWISE )

: RUNSTEP
       STEPDISPLAY
       DUMBCYCLES CYCLES !
       BEGIN
           CYCLETOKEN CYCLES @ NGDISP
           BENDALLWTOKEN SEARCH
               IF THISVALUE BENDALLW ! ENDIF
           BENDALLWTOKEN BENDALLW @ NGDISP
           POSITIONTOKEN SEARCH
               IF THISVALUE BENDALLW @ - MOVEBACKGAUGE ELSE 1 ENDIF
               IF BENDSETUP
                   BEGIN FOOTSWITCH? NOT END
                   RUNRAM
                   IF RETRACTTOKEN SEARCH
                       IF RETRACT ENDIF
                   CYCLES @ 1- DUP NOT SWAP CYCLES !
                   DUP IF NOT 1 ENDIF
                   ELSE 1
                   ENDIF
               ELSE TYPE" AT LIMIT"
                   BEGIN ?KEYIN NEWMODE = END 1 1
               ENDIF
       END ;

: RUNJOB
       ANGLEINIT
           BEGIN 0 BENDALLW !
```

```
STEPZERO NEXTSTEP DROP STEP=OP
   BEGIN
      RUNSTEP
         IF 1 1
         ELSE 0 NEXTSTEP IF STEP=OP ELSE 1 ENDIF
                       ENDIF
               END
         END ;

: RUNMODE
      EMPTYJOB?
         IF TYPE" EMPTY JOB"  0
            BEGIN PKEYIN NEWMODE = END
         ELSE STEPZERO STEPDISPLAY TYPE" RUN"
               REFERENCE RUNJOB
         ENDIF ;

[END-OF-FILE]

0     VARIABLE     DIE
0     VARIABLE     MATL
0     VARIABLE     FULLBEND
0     VARIABLE     OLDANGLE
0     VARIABLE     DESIRED
0     VARIABLE     OLDDEPTH

7     VARIABLE     AREADY

DECIMAL
: CSETUP
      STEPZERO STEPDISPLAY NOENTRY? SET
      TYPE" CALIBRATE"
      REVBEND? RESET
      BEGIN FOOTSWITCH? NOT END ;

: ADEPTHCALC
      OLDANGLE @ -            ( difference in angles )
      DUP 0) DUP 0= -         ( sign of difference )
      FULLBEND @ DUP 1500 )
         IF DROP 1500 ENDIF   ( maximum of fullbend,1500 )
      DUP 1800 --             ( 1800-fullbend )
      SWAP 833 FRACTION
      1400 --                 ( expected range of counts )
      R0 ! ROT ABS R1 ! DMUL
         R0 ! DDIV R0 @ *     ( change for new angle )
      OLDDEPTH @ + ;          ( new depth )
HEX
( DISPAPPX -- )
      ( DISPLAY APPROXIMATION VALUES )
: DISPAPPY
      ADEPTHTOKEN GETVAL POSITIONTOKEN NMGROUP? NGDISP ;

( a ADJUSTDEPTH -- )
      ( A BEND ANGLE OF a HAS MADE. DEPTH IS ADJUSTED TO TRY )
      ( TO GET AN ANGLE OF THE CONTENTS OF DESIRED. )
: ADJUSTDEPTH
      DUP DUP OLDANGLE @ SWAP OLDANGLE !     ( save new angle )
         - DUP 0=                            ( change in angles )
         +                                   ( make change at least one )
      SWAP DESIRED @ --                      ( change needed )
      OLDDEPTH @ ADEPTHTOKEN GETVAL DUP OLDDEPTH !
         - ABS 1+                            ( change in depth )
      ROT ROT DUP 0) DUP 0= -                ( sign of change )
```

```
( check for large ratio between actual change and needed change )
        SWAP ABS ROT ABS 2DUP / 2 )
( if ratio larger than 2 then only )
( adjust by a factor of 2 )
            IF 2DROP SWAP 2 *
( else adjust by the ratio )
            ELSE SWAP R0 ! ROT R1 ! DMUL
            R0 ! ODIV R0 @
            ENDIF
( maximum adjustment is 256 )
        DUP 100 ) IF DROP 100 ENDIF
( adjust depth )
        * THISVALUE +
( make depth non-negative )
        DUP 0) *
( save new depth )
        NSTORE DISPAPIX ;
( CBEND -- ) )
        ( BEND ROUTINE FOR CALIBRATE MODE )

: CBEND
        BENDSETUP BEND
        REVBEND? TEST
           IF THISSTEP
              IF TYPE" ENTER ANGLE" ELSE FULLTEXT ADISPLAY ENDIF
           ENDIF ;

( AREADY? -- ) )
        ( SEARCHES STEP FOR DIE, MATL, FULLBEND. THESE VARIABLES )
        ( ARE UPDATED IF THE CORRESPONDING TOKENS ARE FOUND. )
        ( AREADY CONTAINS FLAGS OF WHICH ARE FOUND. )
DECIMAL
: AREADY?
        DIETOKEN SEARCH IF 1 THISVALUE DIE ! ELSE 0 ENDIF
        MATLTOKEN SEARCH IF 2 ! THISVALUE MATL ! ENDIF
        FULLBENDTOKEN SEARCH IF 4 ! THISVALUE FULLBEND ! ENDIF
        AREADY ! 200 OLDDEPTH ! FULLBEND @ OLDANGLE ! ;
HEX ( n CFINDJOB -- ) )
        ( HAVE ENTRY FOR NEW JOB NUMBER. SEARCH FOR JOB. IF IT EXIST )
        ( THEN GO TO THAT JOB. ELSE GIVE ALARM AND GO TO JOB ZERO )

: CFINDJOB
        FINDJOB
           IF STEPDISPLAY
           ELSE JOBZERO STEPDISPLAY BADJOBERR
           ENDIF
        AREADY? ;

( n CFINDSTEP -- ) )
        ( HAVE ENTRY FOR NEW STEP. SEARCH FOR STEP. IF IT EXIST )
        ( THEN GO TO THAT STEP. ELSE GIVE ALARM AND GO TO STEP ZERO

: CFINDSTEP
        FINDSTEP
           IF STEP=OF STEPDISPLAY
           ELSE STEPZERO STEPDISPLAY NOSTEPERR
```

```
            ENDIF ;

: CPOSSTORE
        MM? IF MMTOINCH ENDIF
        ADEPTHTOKEN TNSTORE ;

( n CTOKSTORE --) )
        ( HAVE ENTRY FOR TOKEN IN GROUP, PUT ENTRY INTO PROGRAM )
: CTOKSTORE
        GROUP B@ DUP 0A ) IF 7 - SWAP MMTOINCH SWAP ENDIF
        TNSTORE ;

( CSTORE --) )
        ( ENTRY IS COMPLETE, MAKE CHANGES TO PROGRAM AS NEEDED )

: CSTORE
        NOENTRY? TEST NOT
        IF HAVEENTRY?
            IF CURRENTVALUE @ GROUP B@         ( GET VALUE AND GROUP )
                CASE
                    JOBTOKEN =: CFINDJOB ;;
                    STEPTOKEN =: CFINDSTEP ;;
                    POSITIONTOKEN =: CPOSSTORE ;;
                    ANGLETOKEN =: ADJUSTDEPTH ;;
                    NOCASE =: CTOKSTORE ;;
                CASEND
            ENDIF
            NOENTRY? SET
        ENDIF 0 NEWLAMP ;

: CENTRYSETUP
        DUP VALUEDISPLAY PENTRYSETUP 1,0 ;

( CJOB --) NOTE1 )
        ( PROGRAM NUMBER KEY HAS BEEN PRESSED, IF NEXT KEY IS )
        ( PROG#KEY THEN GO TO NEXT JOB, IF NEXT KEY IS A DIGIT )
        ( KEY THEN GET NEW JOB NUMBER  OTHERWISE IGNORE )

: CJOB
        BLANKADISPLAY STEPZERO +NEXTJOB STEPDISPLAY AREADY?
        THISJOB JOBTOKEN ENTRYSETUP 1,0 ;

( ANGSET --) )
        ( IF THERE IS AN ANGLE IN THE CURRENT STEP THEN CHECK IS )
        ( MADE FOR ADEPTH AND HLDOFF. THESE ARE CREATED IF THEY )
        ( ARE MISSING )

: ANGSET
        ANGLETOKEN SEARCH
            IF THISVALUE DUP DESIRED ! ADEPTHTOKEN SEARCH
                IF DROP THISVALUE
                ELSE ADEPTHCALC DUP ADEPTHTOKEN TNSTORE
                ENDIF
            ENDIF ;

( CSTEP --) NOTE1 )
        ( STEP KEY HAS BEEN PRESSED  IF READY TO DO TEST BEND THEN )
        ( GO TO NEXT STEP, OTHERWISE ALARM IS GIVEN )

: CSTEP
```

```
        BLANKADISPLAY THISSTEP NOT IF AREADY? ENDIF
        AREADY @ 7 = REVBEND? TEST &
            IF 2 NE/LAMP
                BEGIN NEXTSTEP
                    IF STEP=UP ANGLETOKEN SEARCH
                    ELSE STEPZERO 1
                    ENDIF
                END
                STEPDISPLAY
                THISSTEP DUP IF TESTANGTEXT ADISPLAY ENDIF
                STE TOKEN ENTRYSETUP 1
            ELSE TYPE" MISSING DATA"    1
            ENDIF
        ANGSET 0 ;
: CPOSITION
        THISSTEP
            IF ANGLETOKEN SEARCH
                IF ADEPTHTOKEN GETVAL POSITIONTOKEN ENTRYSETUP
                    GROUP B@ BASEVALUE @ NGDISP
                ELSE NOANGTEXT ADISPLAY
                ENDIF
            ENDIF
        1,0 ;
( CANGLE -- ) NOTE  )
        ( ANGLE KEY HAS BEEN PRESSED.  IF IN STEP ZERO AND REVBEND? )
        ( IS SET THEN FULL ANGLE IS ENTERED.  IF NOT IN STEP ZERO  )
        ( THEN TEST ANGLE IS ENTERED AND DEPTH IS ADJUSTED  )
: CANGLE
        THISSTEP
            IF ANGLETOKEN SEARCH
                IF TESTANGTEXT ADISPLAY ANGLETOKEN CENTRYSETUP
                ELSE NOANGTEXT ADISPLAY 1,0
                ENDIF
            ELSE REVBEND? TEST
                IF TYPE" PRESS STEP"
                    FULLBENDTOKEN CENTRYSETUP
                ELSE 1,0
                ENDIF
            ENDIF ;
( CDIE -- )
        ( DIE KEY HAS BEEN PRESSED. DIE WIDTH IS ENTERED )
: CDIE
        BLANKADISPLAY STEPZERO DIETOKEN CENTRYSETUP ;
( CMATL -- )
        ( MATL KEY HAS BEEN PRESSED. MATL THICKNESS IS ENTERED )
: CMATL
        BLANKADISPLAY STEPZERO MATLTOKEN CENTRYSETUP ;
: CPOS
        CSETUP REFERENCE CALIBRATEPOS MOVEBACKGAUGE DROP
        CALIBRATEPOS POSITIONTOKEN MMGROUP? NGDISP 1,0 ;
: CFULL
        SIDETEST IF
            STEPZERO STEPDISPLAY FULLBENDTOKEN VALUEDISPLAY
            REVBEND? SET FULLTEXT ADISPLAY 1,0
        ELSE 0,0
        ENDIF ;
```

```
( CRETRACT --> NOTE1 )
      ( MOVE TO 25" )
: CRETRACT
      REFERENCE 1,0 ;

( K ACTONKEY --> NOTE1 )
      ( KEY K HAS BEEN PRESSED, BRANCH TO APPROPIATE ROUTINE )
: ACTONKEY
      DIGITKEY?
        IF ENTER 1,0
        ELSE CSTORE
          CASE
            PROG#KEY =: CJOB ;;
            STEPKEY =: CSTEP ;;
            POSITIONKEY =: CPOSITION ;;
            ANGLEKEY =: CANGLE ;;
            POSCALKEY =: CPOS ;;
            DIEKEY =: CDIE ;;
            MATLKEY =: CMATL ;;
            FULLBENDKEY =: CFULL ;;
            RETRACTKEY =: CRETRACT ;;
            NEWMODE =: 1 ;;
            NOCASE =: 1,0 ;;
          CASEND
        ENDIF ;

: CALIBRATEMODE
      CSETUP AREADY? 1
      BEGIN
        IF KEYIN DUP NOT
           IF CSTORE CBEND ENDIF
        ELSE 1
        ENDIF
        IF ACTONKEY ELSE 1,0 ENDIF
      END ;
[END-OF-FILE]

( TESTDELAY --> )
      ( DELAY TO GIVE OPERATOR A CHANCE TO PRESS A KEY )
: TESTDELAY
      600 0 DO LOOP ;

( BLANKNDISPLAY --> )
      ( BLANK NUMERIC DISPLAY )
: BLANKNDISPLAY
      1A 0 DISPBUF BLANK 7 1 DO I GOUT LOOP ;

( TESTSETUP --> )
      ( SETUP FOR TEST MODE )
: TESTSETUP
      TYPE" TEST"  BLANKNDISPLAY NOREVBEND RAMON ;

( **** NOTE 1 **** )
      ( ALL TEST ROUTINES HAVE THE FOLLOWING EFFECT ON THE STACK )

( XXXXTEST --> )   1  IF NEXT KEY HAS NOT BEEN READ )
      ( --> K 0 IF NEXT KEY IS K )
```

```
( DISPTEST --) NOTE1 )
    ( MAKE DISPLAY BOARD LIGHT UP )
: DISPTEST
    7 1 DO I DUP 457 * NGDISP LOOP
    LAMPCODE SENDHEADER OFF XMTBYTE CLOSEXMT
    TYPE" ABCDEFGHIJKLMNOPQRSTUVWXYZ"
    PKEYIN LAMPDISP BLANKNDISPLAY 0 ;

( BUTTONTEST --) NOTE1 )
    ( READ BUTTON THE DISPLAY WHAT WAS READ, EXIT WITH )
    ( CLEARKEY OR NEWMODE )
: BUTTONTEST
    BEGIN PKEYIN DUP DUP CLEARKEY = SWAP NEWMODE = (
        IF 0,1
        ELSE BITOUT 0
        ENDIF
    END ;
( PIOTEST --) NOTE1 )
    ( DISPLAY PIO BIT PATTERN )
: PIOTEST
    BEGIN
        PIOAD ZIN BITOUT TESTDELAY KEYREADY?
    END 1 ;
( MEMCHECK --) BAD? )
    ( NON-DESTRUCTIVE MEMORY TEST )
CODE MEMCHECK
    4000 HL LD    400 DE LD    0 B LD
    BEGIN;
        HL DEC   (HL) A LD   CPL   A (HL) LD   (HL) CP
        NZ IF,   1 B LD   ENDIF,
        CPL   A (HL) LD   DE DEC   D A LD   E A OR
    Z END;
    B A LD   A OF   'B $ZPUSH JP   ENDC
( MEMTEST --) NOTE1 )
    ( NON-DESTRUCTIVE MEMORY TEST )
: MEMTEST
    BEGIN MEMCHECK
        IF BADMEMTEXT ADISPLAY 1
        ELSE OKTEXT ADISPLAY TESTDELAY KEYREADY?
        ENDIF
    END 1 ;
( POSTEST --) NOTE1 )
    ( REFERENCE BACKGAUGE THEN DISPLAY CURRENT POSITION )
```

Figure 8:
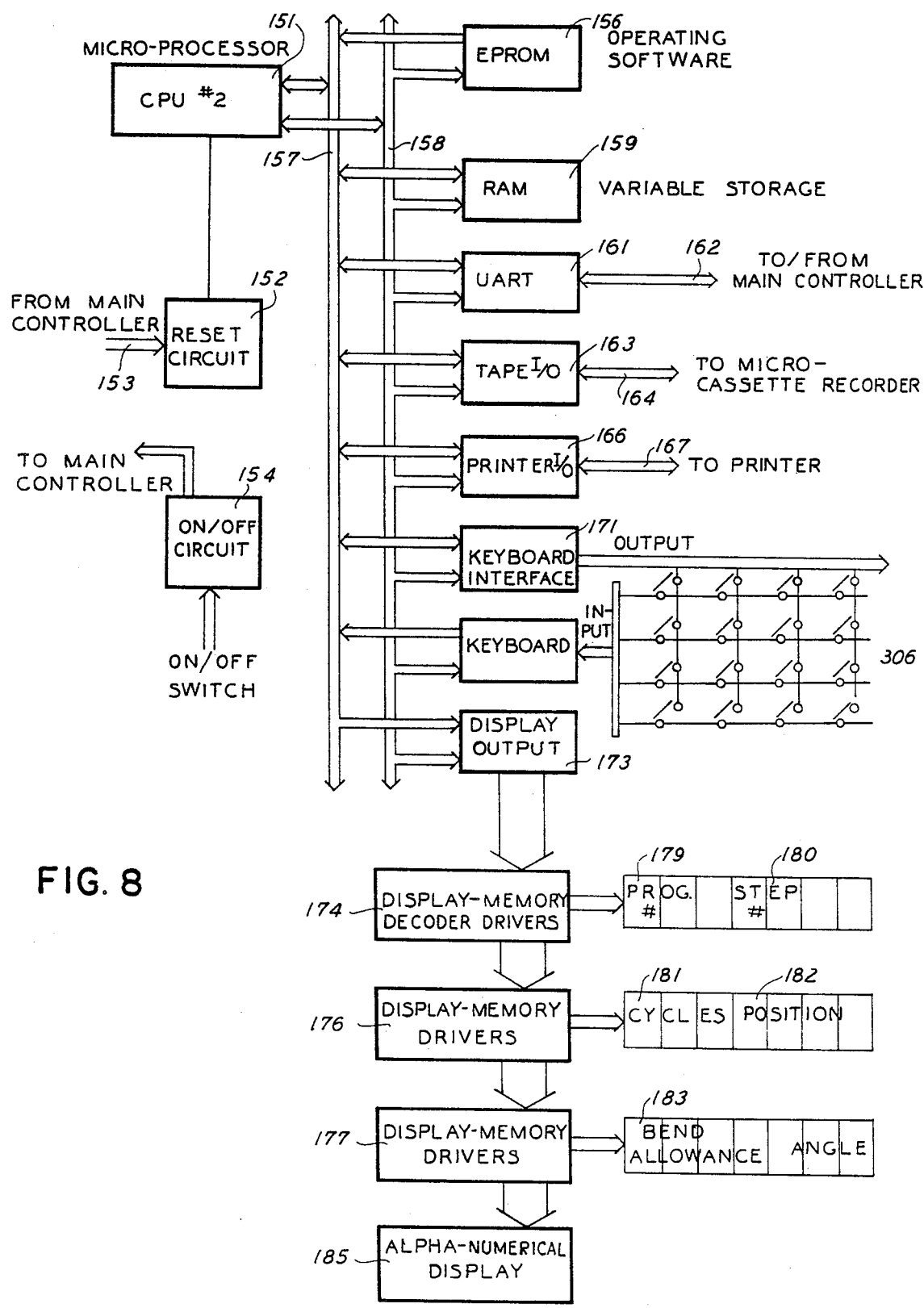
FIG. 8 illustrates the second microprocessor of the invention.

FIG. 8 illustrates a second CPU 151 which might be a Z-80 type which is connected to data busses 157 and address busses 158 and is connected to a reset circuit 152 which receives an input 153 from the main controller 110. On and off circuit 154 is connected to the main controller 110. EPROM 156 is connected to the data and address busses 157 and 158. Random access memory 159 is also connected to these busses as well as a universal asynchronous receiver-transmitter 161 which also is connected by bus 162 to the to and from the main controller. A tape input/output unit 163 is connected by bus 164 to the micro-cassette recorder 300 and is connected to the busses 157 and 158. A printer input/output unit 166 is connected to the busses 157 and 158 and by bus 167 to the printer 301. A keyboard interface 171 is connected to busses 157 and 158 and receives inputs from the keyboard 306. Display output circuit 173 is connected to the busses 157 and 158 and drives display memory decoder drivers 174, 176 and 177 and alpha numerical display 185. The program 179, step 180, cycles 181, position 182, bend allowance 183 and angle indicators are connected to the drivers 174, 176 and 177, respectively.

The software for the second micro-processor 151 is as follows:

```
: POSTEST
       REFERENCE POSIN POSITION +!
       BEGIN POSITION @ POSIN -
           POSITIONTOKEN MMGROUP? NGDISP
           TESTDELAY KEYREADY?
       END 1 ;
( RAMTEST --) NOTE1 )
       ( DISPLAY CURRENT RAM POSITION )
: RAMTEST
       BEGIN RAMPOSITION @ 320 FRACTION ( CONVERT COUNTS TO INCHES )
           POSITIONTOKEN MMGROUP? NGDISP
           TESTDELAY KEYREADY?
       END 1 ;
( SPACETEST --) NOTE1 )
       ( DISPLAY BYTES OF PROGRAM MEMORY THAT ARE NOT BEING USED )
: SPACETEST
       0 MEMSIZE USEDMEMORY @ - NGDISP 1 ;

( ENCODERTEST --) NOTE1 )
       ( GIVE BACKGAUGE A WORKOUT )
: ENCODERTEST
       REFERENCE 1 REFERENCEPOS
       BEGIN PKEYIN DUP 38 =
           IF DROP DUP 1F4 - MOVEBACKGAUGE
               IF PKEYIN DUP 38 =
                   IF DROP DJ? MOVEBACKGAUGE
                       IF 3E8 - 0
                       ELSE 1
                       ENDIF
                   ELSE 0 2SWAP SWAP
                   ENDIF
               ELSE 1
               ENDIF
           ELSE 0 2SWAP SWAP
           ENDIF
       END DROP ;
DECIMAL
( BACKGAUGETEST --) NOTE1 )
       ( MOVEBACKGAUGE ALOT )
: BACKGAUGETEST
       REFERENCE
       BEGIN 10000 MOVEBACKGAUGE DROP DELAY
           KEYREADY? NOT
               IF 20000 MOVEBACKGAUGE DROP DELAY ENDIF
           KEYREADY?
       END 1 ;
HEX
( K SAVETEST --) NOTE1 )
       ( MAKE STANDARD RECORDING )
: SAVETEST
       INVALID DROP 0 PROGMEMORY
       100H 0 DO DUP I SWAP B! 1+ LOOP DROP
       100H USEDMEMORY ! SAVE
       NEWMEMORY 1 ;
( K LOADTEST --) NOTE1 )
       ( READ STANDARD TAPE )
: LOADTEST
       LOAD INVALID DROP 1,0 PROGMEMORY
```

```
            100* 0 DO DUP B@ I = ROT & SWAP 1+ LOOP DROP
               IF OKTEXT ADISPLAY
               ELSE TYPE" DATA ERROR"
               ENDIF
            NEWMEMORY PKEYIN 0 ;
( CASSETTETEST --) NOTE1 )
        ( READ STANDARDIZE CASSETTE AND CHECK )
: CASSETTETEST
        TYPE" LOAD OR SAVE?"  PKEYIN DUP
        CASE
            TAPE-MEMKEY =: LOADTEST ;;
            MEM-TAPEKEY =: SAVETEST ;;
            NOCASE =: 0 ;;
        CASEND ;
( PRINTERTEST --) NOTE1 )
        ( SEND SOME CHARACTERS TO THE PRINTER )
:PRINTERTEST
    PAPERFEED "BLANK"
    3 0 DO 14 +
        14 0 DO DUP 1- LOOP
        PRINTLINE
    LOOP
    DROP PAPERFEED 1 ;

( MEMCHECK2     GOOD?    )
            (DESCTRUCTIVE MEMORY TEST )
CODE MEMCHECK2
        0 DE LD 0 A LD
0 LABEL:   0 PROGMEMORY HL LD   MEMSIZE 100 + 3C LD
1 LABEL:   (HL) CP
           Z IF,  (HL) INC HL INC C DEC
               1 RELJUMP NZ JR
               1 RELJUMP DJNZ
               A INC  0 RELJUMP NZ JR
               E INC
           ENDIF,
        HL DE EX   $PUSH JP    EDOC ( MEMTEST2 - -> NOTE1   )
    (DESTRUCTIVE MEMORY TEST  )
: MEMTEST2
      INVALID MEMSIZE 0 PROGMEMORY 0 FILL
      MEMCHECK
      IF OKTEXT
      ELSE BADMEMTEST
      ENDIF
      ADISPLAY
      NEWMEMORY 1 VALID ;
 ( TESTMODE -  )
 : TESTMODE
       TESTSETUP  :
       BEGIN
          IF PKEYIN ENDIF
          BLANKNDISPLAY NEWLAMP
            IF DROP
            BL506
                 30 =: DISPTEST ;;
```

```
                31 =: BUTTONTEST ;;
                33 =: PIOTEST ;;
                34 =: POSTEST ;;
                35 =: MEMTEST ;;
                36 =: RAMTEST ;;
                37 =: SPACETEST ;;
                38 =: ENCODERTEST ;;
                39 =: BACKGAUGETEST ;;
                HKEY1 = CASSETTETEST ;;
                HKEY2 = PRINTERTEST ;;
                HKEY3 = MEMTEST2 ;;
                NOCASE =: ;;
            CASEND
          0
        ENDIF
     END RAMOFF :

[END-OF-FILE]

( MAIN OPERATION LOOP )

:MAINPROGRAM
        BEGIN MODESETTING 0 NEWLAMP BLANKNDISPLAY
            CASE
                MROGRAMKEY = PROGRAMMODE ;;
                RUNKEY = RUNMODE ;;
                TESTKEY = TESTMODE ;;
                CALIBRATEKEY =:  CALIBRATEMODE ;;
            CASEND
        0 END :   ( LOOP FOREVER )

: INITIALIZE
       IOINIT TESTLOC @ TESTVAL = NOT
            IF NEWMEMORY ENDIF
       MM?  INCHCODE + SENDBYTE
       MAINPROGRAM  :

[ EMD-OF-FILE]
```

NUMERICAL CONTROLS    xitzn asm 2.21
DIADIS -

```
                .IDENT  BIADIS

.PHEX
                .PABS

;           MICON SX
                ;           ********

;           Developed for DI-ACRO

;Memory Map
                            ;==========

3800                        MEM     = 3800H
3BFF                        MEMTOP  = 3BFFH
3C00                        STACK   = MEMTOP+1
3BE0                        BUFSPC  = STACK-20H
3BDC                        N6BUF   = BUFSPC-4
3BD8                        N5BUF   = N6BUF-4
3BD5                        N4BUF   = N5BUF-3
3BD0                        N3BUF   = N4BUF-5
3BCC                        N2BUF   = N3BUF-4
3BC8                        N1BUF   = N2BUF-4
3B8C                        ABUF    = N1BUF-60
3B83                        BABUF   = ABUF-9
3B83                        WRKSPC  = BABUF

3B83            .LOC        WRKSPC
    F                       BYTE    FLAGS,FLGS
    D                       WORD    TEXTPOINTER,TXTPNTR
    B                       WORD    CTEXTPOINTER,CTXTPNTR
    9                       WORD    TEXTEND,TXTEND
    7                       WORD    ROLLTIME,RLTIME
    5                       WORD    BYTECOUNT,BCOUNT
    3                       WORD    POINTER,PNTR
    1                       WORD    BOTTOMPOINTER,BPNTR
    0                       BYTE    COUNT1,CNT1
    F                       BYTE    SSWITCH,SSWTCH
    E                       BYTE    WRKSTACK,WSTK
                            ;IO map
                            ;======

0050                        NDIS1   = 50H
0058                        NDIS2   = 58H
0060                        NDIS3   = 60H
0028                        ADIS    = 28H
0020                        INDIC   = 20H
0070                        InchMM  = 70H
0018                        WRTSW   = 18H
0010                        RDSW    = 10H
0008                        CASCON  = 08H
0000                        CASTAT  = 00H
0040                        RDDATA  = 40H
00C0                        WRDATA  = 0C0H
0041                        STATUS  = 41H
0042                        RDMODE  = 42H
00C2                        WRMODE  = 0C2H
```

```
0043                    RDCOM   = 43H
00C3                    WRCOM   = 0C3H
0049.                   PRINTER = 48H
0010                    PRSTATUS= 10H
0000                    MODESW  = 00H

;Constants
                        ;=========

0045                    LNABUF  = N1BUF - BABUF
0001                    CYRDY   = 1
0000                    TYRDY   = 0
0007                    DPOINT  = 7
0001                    PREADY  = 1
0000                    PAPER   = 0
008A                    LF      = 8AH
0006                    ACK     = 6
0015                    NACK    = 15H
005A                    KEYD1   = "Z"
0060                    KEYD2   = 60H
0062                    KEYD3   = "b"
0083                    RECSIZE = 83H
0010                    CODER   = 10H
FFFF                    TIMEOUT = 0FFFFH
                        ;Flags
                        ;=====

07F8                    FLW     = (FLGS*8)&7FFH

9                  FLAG OLDKEY
     A                  FLAG DECIMALPOINT
     B                  FLAG ROLLTEXT
     C                  FLAG ABORT
     D                  FLAG NEWMODE
     E                  FLAG ENDINFO
     F                  FLAG GAP
07FE                    NOTAPE  = GAP
07FE                    BADREAD = GAP
07FE                    DONE    = GAP
                        ;CASSETTE MODES

0004                    FASTREWIND  = 04H
000A                    WRITEMODE   = 0AH
0008                    READMODE    = 08H
0010                    STOPTAPE    = 10H
                        ;MASKS
0040                    CLMASK      = 40H
0080                    DATAMASK    = 80H
                        ;TIMING CONSTANTS
0030                    ICOUNT1     = 48
000C                    COUNT2      = 12
0030                    DLW1        = 48
002F                    DLW2        = 47
002D                    DLW3        = 45
002D                    DLW4        = 45
002F                    DLW5        = 47
```

```
000B            DLR2        = 11
0004            DLR4        = 4
000E            DLR5        = 14
0014            DLR6        = 20
0013            DLR7        = 19
0013            DLR8        = 19
00FF            LWAIT       = 255
000A            RWAIT       = 10
00FF            CAPLEN      = 255
FFFF            ENDTIME     = 0FFFFH
0005            PRDEL1      = 5
000B            PRDEL2      = 11
                ;                   MAIN PROGRAM
                ;                   ============

0000                        .LOC    00H
0000            PROGRAM:            ;INITIALIZE
                                    ;==========

;SET UART 0000    3ECE                MVI     A,0CEH  ;MODE1: 2 STOP BITS
0002    D3C2                OUT     WRMODE  ;       ODD PARITY
                                    ;       PARITY DISABLED
                                    ;       8 BITS
                                    ;       CLOCK DIVIDED BY 16

0004    3E3F                MVI     A,3FH   ;MODE2: INTERNAL CLOCKS (2 MHZ)
0006    D3C2                OUT     WRMODE  ;       19200 BAUD (ACTUALLY
                                    ;       7576 BAUD)

0008    3E05                MVI     A,5     ;COMMAND: NORMAL OPERATION
000A    D3C3                OUT     WRCOM   ;        ENABLE TRANSMITTER
                                    ;        AND RECEIVER

;SET POINTERS
000C    31003C              LXI     SP,STACK
000F    DD21833B            LXI     X,WRKSPC
0013    21713B              LXI     H,WRKSTACK
0016    22763B              SHLD    POINTER
0019    3E10                CASSETTE        STOPTAPE    ;Stop cassette
001B    D308
001D    DB00                IN      MODESWITCH
001F    2F                  CMA
0020    E607                ANI     7
0022    DD77EF              MOV     SSWTCH(X),A
0025    CD8E01              CALL    GETDATA
0028            MAINLOOP:                               ;LEV 0
                ;========

0028    DB41                IN      STATUS  ;TEST RECEIVER
002A    CB4F                BIT     RXRDY,A
002C    C48E01              CNZ     GETDATA

002F    CDF200              CALL    TSTMOD
0032    CDDE00              CALL    NOTIFY
```

```
0035  DDCBFF5E          TEST    ABORT
0039  C48E01            CNZ     GETDATA
003C  CD7203            CALL    TESTKEYS
003F  F5                PUSH    PSW
0040  C49D00            CNZ     KEYCLOSED
0043  F1                POP     PSW
0044  CC8A00            CZ      KEYOPEN
0047  DDCBFF56          TEST    ROLLTEXT
004B  C4DB02            CNZ     ROLLINGDISPLAY
004E  18D8              JMPR    MAINLOOP
```

;Non maskable interrupt, turn displays off
;      and wait for reset.

```
0066                    .LOC    66H
```

;Number display off

```
0066  3E80              MVI     A,80H
0068  D351              OUT     NDIS1 + 1
006A  D359              OUT     NDIS2 + 1
006C  D361              OUT     NDIS3 + 1
```

;Alpha display off

```
006E  0E40              MVI     C,ADIS+18H
0070  1603              MVI     D,3
0072  0604     RPT1:    MVI     B,4
0074  0D       RPT2:    DCR     C
0075  ED79              OUTP    A
0077  20FB              if      .nZero,RPT2
0079  0D                DCR     C
007A  0D                DCR     C
007B  0D                DCR     C
007C  0D                DCR     C
007D  15                DCR     D
007E  20F2              JRNZ    RPT1
```

;Indicators off

```
0080  AF                XRA     A
0081  D320              OUT     INDIC
0083  D370              OUT     INDMM
```

;Cassette off

```
0085  3E10              CASSETTE STOPTAPE
0087  D308

0089  76                HLT
008A            KEYOPEN:                            ;LEV 1
;-------
008A  DDCBFF46          TEST    OLDKEY
008E  C8                RZ
```

;DEBOUNCE OPENING KEY

```
008F            SETLOOP:
008F  06FF              MVI     B,255

1            LOOP OPENKEY
0091  CD7203            CALL    TESTKEYS
0094  20F9              IF      .ONE,SETLOOP       ;KEY CLOSED?
0096  10F9     ENDLOOP OPENKEY
```

```
0098   DDCBFF86            FRES    OLDKEY
009C   C9                  RET
009D           KEYCLOSED:                          ;LEV 1
               ;---------
009D   DDCBFF46            TEST    OLDKEY
00A1   C0                  RNZ             ;KEY HAS BEEN RECOGNIZED?
               ;READ KEY
00A2   CDB100              CALL    ..DEBOUNCE
00A5   C8                  RZ              ;KEY OPEN?
00A6   CD3701              CALL    GETKEY
00A9   CD5501              CALL    TRANSLATE
00AC   C8                  RZ              ;KEY OPEN?
00AD   CDC700              CALL    ..XMITKEY
00B0   C9                  RET
00B1           ..DEBOUNCE:                         ;LEV 2
               ;---------
00B1   C5                  LOOP    ..BNCEWAIT,4   ;APPROX 18 MSEC
00B2   0604
00B4   C5                  LOOP    ..BOUNCE,250
00B5   06FA
00B7   CD7203              CALL    TESTKEYS
00BA   C2C000              IF      ONE,..NEXT     ;KEY CLOSED?
00BD   C1                  POP     B
00BE   C1                  POP     B
00BF   C9                  RET
00C0           ..NEXT:
00C0   10F5                ENDLOOP ..BOUNCE
00C2   C1
00C3   10EF                ENDLOOP ..BNCEWAIT
00C5   C1
00C6   C9                  RET
00C7           ..XMITKEY:                          ;LEV 2
               ;---------
00C7   CDCF00              CALL    XMITA
00CA   DDCBFFC6            FSET    OLDKEY
00CE   C9                  RET
00CF           XMITA:
               ;-----
00CF   2A763B              LHLD    POINTER
00D2   2B                  DCX     H
00D3   360A                MVI     M,LF
00D5   2B                  DCX     H
00D6   77                  MOV     M,A            ;KEY CHARACTER
00D7   22763B              SHLD    POINTER
00DA   CDB203              CALL    XMIT
00DD   C9                  RET
00DE           NOTIFY:
               ;------
00DE   DDCBFF66            TEST    NEWMODE
00E2   C8                  RZ
00E3   3E6F                MVI     A,"o"
00E5   CDCF00              CALL    XMITA
00E8   DDCBFF5E            TEST    ABORT
00EC   C0                  RNZ             ;Message has not gotten thru?
00ED   DDCBFFA6            FRES    NEWMODE
00F1   C9                  RET
```

```
00F2                    TSTMOD:
                        ;------
00F2    DDCBFF66         TEST   NEWMODE
00F6    C0               RNZ
00F7    DB00             IN     MODESWITCH
00F9    2F               CMA
00FA    E607             ANI    7
00FC    DDBEEF           CMP    SSWTCH(X)
00FF    C8               RZ            ;No change?
0100    47               MOV    B,A
0101    210040           LXI    H,4000H
0104    2B      ..LOOP:  DCX    H
0105    7C               MOV    A,H
0106    B5               ORA    L
0107    20FB             if     .nZero,..LOOP
0109    DB00             IN     MODESWITCH
010B    2F               CMA
010C    E607             ANI    7
010E    B8               CMP    B
010F    C0               RNZ           ;Not the same?
0110    DD77EF           MOV    SSWTCH(X),A
0113    DDCBFFE6         FSET   NEWMODE
0117    C9               RET 0118                    SENDMODE:
                        ;--------
0118    DD7EEF           MOV    A,SSWTCH(X)
011B    213301           LXI    H,..TABL
011E    0F               RRC
011F    3809             JRC    ..NEXT ;Mode 0?
0121    23               INX    H
0122    0F               RRC
0123    3805             JRC    ..NEXT ;Mode 1?
0125    23               INX    H
0126    0F               RRC
0127    3801             JRC    ..NEXT ;Mode 2?
0129    23               INX    H
012A    7E      ..NEXT:  MOV    A,M
012B    CDCF00           CALL   XMITA
012E    DDCBFFA6         FRES   NEWMODE
0132    C9               RET
0133    68696A6B ..TABL:.BYTE   "h","i","j","k"

0137                    GETKEY:                   ;LEV 2
                        ;--------
                        ;Find closed key
0137    017F08           LXI    B,87FH
013A    11FFFF           LXI    D,-1     ;Key count loop ..KEYSCAN
013D    79               MOV    A,C
013E    07               RLC
013F    D318             OUT    WRTSW
0141    4F               MOV    C,A
0142    DB10             IN     RDSW
0144    2F               CMA
```

```
0145   C5                  loop ..KEYBIT,6
0146   0606
0148   13                      INX     D
0149   07                      RLC
014A   DA5301                  if Carry,..CLOSEDKEY
014D   10F9                endloop ..KEYBIT
014F   C1
0150   10EE                endloop ..KEYSCAN
0152   C9                      RET 0153                   ..CLOSEDKEY:
0153   C1                      POP     B
0154   C9                      RET 0155                   TRANSLATE:                                  ;LEV 2
                       ;----------
0155   215D01                  LXI     H,..TABL
0158   19                      DAD     D
0159   7E                      MOV     A,M         ;GET KEY WORD
015A   FE65                    CPI     65H         ;TEST IF KEY WAS OPEN
015C   C9                      RET
                       ;                TABLE OF KEY WORDS
015D   323331444859 ..TABL: .BYTE   "2","3","1","D","H","Y"
0163   2C2D5C2B4E42         .BYTE   ",","-","\","+","N","B"
0169   3536342B495A         .BYTE   "5","6","4","+","I","Z"
016F   51395B365041         .BYTE   "Q","9","[","6","P","A"
0175   383937204A5B         .BYTE   "8","9","7","-","J","["
017B   50385A354D40         .BYTE   "P","8","Z","5","M","@"
0181   302F2E2C4B52         .BYTE   "0","/",".",",","K","R"
0187   4F3759604C43         .BYTE   "O","7","Y",60H,"L","C"
018D   65                   .BYTE   65H
                       ;                 RECEIVE DATA FROM CONTROLLER
                       ;                 ============================

018E                   GETDATA:                                    ;LEV1
018E   CD7B03                  CALL    GETMESSAGE 0191   21F701                  LXI     H,..RETURN   ;SET RETURN ADDRESS
0194   E5                      PUSH    H 0195   2A763B                  LHLD    POINTER

0198   FE41                    IFA     EQUAL,"A",ALPHADISPLAY
019A   CA8002
019D   FE42                    IFA     EQUAL,"B",PRINT
019F   CA2A03
01A2   FE43                    IFA     EQUAL,"C",INCH
01A4   CA2003
01A7   FE44                    IFA     EQUAL,"D",MM
01A9   CA2503
01AC   FE45                    IFA     EQUAL,"E",INDICATORS
01AE   CA1B03
01B1   FE48                    IFA     EQUAL,"H",ND6
01B3   CA2D02
01B6   FE49                    IFA     EQUAL,"I",ND5
01B8   CA2302
01BB   FE4A                    IFA     EQUAL,"J",ND4
```

```
01BD   CA1502
01C0   FE4B              IFA    EQUAL,"K",ND3
01C2   CA0F02
01C5   FE4C              IFA    EQUAL,"L",ND2
01C7   CA0502
01CA   FE4D              IFA    EQUAL,"M",ND1
01CC   CAFB01
01CF   FE4E              IFA    EQUAL,"N",ND1
01D1   CAFB01
01D4   FE4F              IFA    EQUAL,"O",ND1
01D6   CAFB01
01D9   FE50              IFA    EQUAL,"P",ND1
01DB   CAFB01
01DE   FE62              IFA    EQUAL,"b",DISPBITS
01E0   CAF403
01E3   FE6C              IFA    EQUAL,"l",LOADPROGRAM
01E5   CA0E04
01E8   FE6F              IFA    EQUAL,"o",SENDMODE
01EA   CA_801
01ED   FE73              IFA    EQUAL,"s",SAVEPROGRAM
01EF   CAFC04
01F2   FE77              IFA    EQUAL,"w",REWIND
01F4   CA1904

01F7              ..RETURN:
01F7   22763B             SHLD   POINTER
01FA   C9                 RET
01FB              ND1:
01FB   0604               MVI    B,4
01FD   11C83B             LXI    D,N1BUF
0200   CD3702             CALL   CNVRT
0203   1856               JMPR   NAD

0205              ND2:
0205   0604               MVI    B,4
0207   11CC3B             LXI    D,N2BUF
020A   CD3702             CALL   CNVRT
020D   184C               JMPR   NAD

020F              ND3:
020F   0605               MVI    B,5
0211   11DC3B             LXI    D,N3BUF
0214   CD3702             CALL   CNVRT
0217   1849               JMPR   NBD

0219              ND4:
0219   0603               MVI    B,3
021B   11D53B             LXI    D,N4BUF
021E   CD3702             CALL   CNVRT
0221   183F               JMPR   NBD

0223              ND5:
0223   0604               MVI    B,4
0225   11D83B             LXI    D,N5BUF
0228   CD3702             CALL   CNVRT
022B   183C               JMPR   NCD

022D              ND6:
022D   0604               MVI    B,4
022F   11DC3B             LXI    D,N6BUF
0232   CD3702             CALL   CNVRT
0235   1832               JMPR   NCD
```

```
0237             CNVRT:
   7             LOOP ..CNV
0237  0E00              MVI    C,0
0239  7E                MOV    A,M
023A  23                INX    H
023B  FE2E              IFA    .NEQUAL,".",..NEXT
023D  2004
023F  0E80              MVI    C,80H
0241  7E                MOV    A,M
0242  23                INX    H
0243  FE2D       ..NEXT: IFA   .NEQUAL,"-",..NXT1
0245  2004
0247  3E0A              MVI    A,0AH
0249  180A              JMPR   ..NXT3
024B  FE20       ..NXT1: IFA   .NEQUAL," ",..NXT2
024D  2004
024F  3E0F              MVI    A,0FH
0251  1802              JMPR   ..NXT3
0253  D630       ..NXT2: SUI   30H
0255  B1         ..NXT3: ORA   C
0256  12                STAX   D
0257  13                INX    D
0258  10DD       ENDLOOP ..CNV
025A  C9                RET

025B             NAD:
025B  0E51              MVI    C,NDIS1+1
025D  21C83B            LXI    H,N1BUF
0260  180C              JMPR   NUMDIS

0262             NBD:
0262  0E59              MVI    C,NDIS2+1
0264  21D03B            LXI    H,N3BUF
0267  1805              JMPR   NUMDIS

0269             NCD:
0269  0E61              MVI    C,NDIS3+1
026B  21D83B            LXI    H,N5BUF

026E             NUMDIS:
026E  3E10              MVI    A,CODEB
0270  ED79              OUTP   A
0272  0608              MVI    B,8
0274  0D                DCR    C
0275  EDB3              OUTIR                  ;Write data 0277  2A763B            LHLD   POINTER
027A  ED5B783B          LDED   BYTECOUNT
027E  19                DAD    D
027F  C9                RET 0280             ALPHADISPLAY:                 ;LEV 2
                 ;------------
                                              ;Clear alpha buffer
0280  E5                PUSH   H
0281  21833B            LXI    H,BARUF
0284  0645              MVI    B,LNABUF
   6             loop   ..FILL
0286  3620              MVI    M," "
0288  23                INX    H
```

```
0289   10FB        endloop ..FILL
028B   E1                  POP    H        ;Transfer new message to ABUF
028C   2A763B              LHLD   POINTER
028F   118C3B              LXI    D,ABUF
0292   ED4E783B            LBCD   BYTECOUNT
0296   EDB0                LDIR
0298   E5                  PUSH   H
0299   DDCBFF96            FRES   ROLLTEXT
029D   3A783B              LDA    BYTECOUNT
02A0   D60D                SUI    13
02A2   F5                  PUSH   PSW
02A3   21973B              LXI    H,ABUF+11
02A6   FCAF02              CM     STRAIGHTTEXT
02A9   F1                  POP    PSW
02AA   F4C702              CP     SETROLLINGTEXT
02AD   E1                  POP    H
02AE   C9                  RET 02AF               STRAIGHTTEXT:                        ;LEV2,3
                   ;------------
02AF   0E40                MVI    C,ADIS+18H
02B1   1603                MVI    D,3

02B3   0604        ..LP:   MVI    B,4

02B5   0D          ..loop: DCR    C
02B6   EDA3                OUTD
02B8   20FB                if     ,nZero,..loop
02BA   0D                  DCR    C
02BB   0D                  DCR    C
02BC   0D                  DCR    C
02BD   0D                  DCR    C
02BE   15                  DCR    D
02BF   20F2                JRNZ   ..LP

02C1   C9                  RET

02C2               SETROLLINGTEXT:                      ;LEV 2
                   ;------------
02C2   2A783B              LHLD   BYTECOUNT
02C5   11963B              LXI    D,ABUF+10
02C8   19                  DAD    D
02C9   22803B              SHLD   TEXTPOINTER
02CC   227E3B              SHLD   CTEXTPOINTER
02CF   110100              LXI    D,1
02D2   ED537A3B            SDED   ROLLTIME
02D6   DDCBFFD6            FSET   ROLLTEXT
02DA   C9                  RET
```

```
02DB                    ROLLINGDISPLAY:                         ;LEV 1
                        ;------------
02DB    2A7A3B          LHLD    ROLLTIME
02DE    2B              DCX     H
02DF    227A3B          SHLD    ROLLTIME
02E2    7C              MOV     A,H
02E3    B5              ORA     L
02E4    C0              RNZ             ;NOT TIME FOR NEXT ROLL?

02E5    212003          LXI     H,800
02E8    227A3B          SHLD    ROLLTIME
02EB    2A7E3B          LHLD    CTEXTPOINTER
02EE    2B              DCX     H
02EF    227E3B          SHLD    CTEXTPOINTER
02F2    CDAF02          CALL    STRAIGHTTEXT

02F5    11833B          LXI     D,BARUF
02F8    B7              ORA     A
02F9    ED52            DSBC    D
02FB    F0              RP
                                        ;BEGIN AGAIN
02FC    2A803B          LHLD    TEXTPOINTER
02FF    227E3B          SHLD    CTEXTPOINTER
0302    C9              RET

0303                    ERRMSG:
                        ;------
0303    E5              PUSH    H
0304    1A              LDAX    D       ;Get byte count
0305    32783B          STA     BYTECOUNT
0308    47              MOV     B,A
0309    AF              XRA     A
030A    32793B          STA     BYTECOUNT+1
        D               loop    .MOVE
030D    13              INX     D
030E    2B              DCX     H
030F    1A              LDAX    D
0310    77              MOV     M,A
0311    10FA            endloop .MOVE
0313    22763B          SHLD    POINTER
0316    CDB002          CALL    ALPHADISPLAY
0319    E1              POP     H
031A    C9              RET
031B                    INDICATORS:                             ;LEV 2
                        ;----------
031B    7E              MOV     A,M
031C    D320            OUT     INDIC
031E    23              INX     H
031F    C9              RET 0320                    INCH:
0320    3E01            MVI     A,1
0322    D370            OUT     INCHM
0324    C9              RET 0325                    MM:
0325    3E02            MVI     A,2
0327    D370            OUT     INCHM
0329    C9              RET
```

```
032A            PRINT:                                  ;LEV 2
                ;-----
032A    2B              DCX     H
032B    360A            MVI     M,LF
032D    ED5B7B3B         LDED    BYTECOUNT
0331    03              INX     B
0332    43              MOV     B,E
0333    1B              DCX     D
0334    19              DAD     D
0335    110010  ..LOOP: LXI     D,1000H
0338    1B      ..WAIT: DCX     D
0339    7A              MOV     A,D
033A    B3              ORA     E
033B    282C            JRZ     ..PERR  ;No printer?
033D    DB10            IN      PRSTATUS
033F    CB47            BIT     PAPER,A
0341    2826            JRZ     ..PERR  ;No paper?
0343    CB4F            BIT     PREADY,A
0345    28F1            JRZ     ..WAIT 0347    7E              MOV     A,M     ;Get character
0348    FE0A            CPI     LF
034A    2805            JRZ     ..PRINT
034C    D348            OUT     PRINTER
034E    2B              DCX     H
034F    10E4            DJNZ    ..LOOP 0351            ..PRINT:
0351    3E90            MVI     A,80H+STOPTAPE ;USING CASSETTE PORT FOR PRINT SIGNAL
0353    D308            OUT     CASCON
0355    0623            MVI     B,35
0357    10FE    ..LP2:  DJNZ    ..LP2
0359    3E10            MVI     A,STOPTAPE
035B    D308            OUT     CASCON
035D    0602            MVI     B,2
035F    11B888  ..LP:   LXI     D,35000
0362    1B      ..LP1:  DCX     D
0363    7A              MOV     A,D
0364    B3              ORA     E
0365    20FB            JRNZ    ..LP1
0367    10F6            DJNZ    ..LP 0369    2A763B  ..PERR: LHLD    POINTER
036C    ED5B783B         LDED    BYTECOUNT
0370    19              DAD     D
0371    C9              RET
0372            TESTKEYS:                               ;LEV 1,2,3
                ;--------
0372    AF              XRA     A
0373    D318            OUT     WRTSW
0375    DB10            IN      RDSW
0377    2F              CMA
0378    E6FC            ANI     0FCH
037A    C9              RET
```

```
;                           GET MESSAGE
;                           ===========
;MESSAGE MUST BEGIN WITH ":" AND COMMAND BYTE AND END
;WITH LF. ":",COMMAND BYTE AND LF ARE STRIPPED.
;REMAINDER IS PUSHED ON WRSTACK.
;COMMAND BYTE IS RETURNED IN A, POINTER POINTS TO
;FIRST DATA BYTE.
;LENGTH OF MESSAGE IS GIVEN IN BYTECOUNT.

037B              GETMESSAGE:                              ;LEV 2
037B  DDCBFF9E         FRES    ABORT
037F  CDEE03           CALL    RCVBYTE
0382  FE3A             IFA     .NEQUAL,":",..ABORT
0384  2026

0386  3E06             MVI     A,ACK
0388  CDE003           CALL    XMTBYTE
                  ;READ MESSAGE
038B  CDEE03           CALL    RCVBYTE
038E  F5               PUSH    PSW          ;SAVE COMMAND BYTE
038F  2A763B           LHLD    POINTER
0392  22743B           SHLD    BOTTOMPOINTER
0395  01FFFF           LXI     B,-1    ;SET BYTE COUNT

0398  CDEE03    ..LOOP: CALL   RCVBYTE
039B  0B               DCX     B
039C  77               MOV     M,A
039D  03               INX     B
039E  FE8A             IFA     .NEQUAL,LF,..LOOP
03A0  20F6

03A2  23               INX     H
03A3  ED43783B         SPCD    BYTECOUNT
03A7  22763B           SHLD    POINTER
03AA  F1               POP     PSW
03AB  C9               RET

03AC  3E15      ..ABORT: MVI   A,NACK
03AE  CDE003           CALL    XMTBYTE
03B1  C9               RET
;                           TRANSMIT MESSAGE         ;LEV 3,2
;                           ================

;MESSAGE IS INITIATED BY A HEAR ME (:) CHARACTER.
;":" WILL BE REPEATED UNTIL THE CONTROLLER SENDS
;AN ACK. THEN THE MESSAGE IS TRANSMITTED.
;A LINE FEED (LF) TERMINATES THE MESSAGE.

03B2  3E3A      XMIT:   MVI     A,":"
03B4  CDE003            CALL    XMTBYTE
03B7  CDEE03            CALL    RCVBYTE
03BA  2A763B            LHLD    POINTER
03BD  FE06              IFA     .NEQUAL,ACK,..ABORT
03BF  2011

03C1  7E        ..LOOP: MOV     A,M
03C2  CDE003            CALL    XMTBYTE
03C5  23                INX     H
03C6  FE8A              IFA     .NEQUAL,LF,..LOOP
03C8  20F7
```

```
03CA   DDCRFFSE            FRES    ABORT
03CE   22763B              SHLD    POINTER
03D1   C9                  RET

03D2               ..ABORT:
03D2   7E                  MOV     A,M
03D3   23                  INX     H
03D4   FE8A                IFA     .NEQUAL,LF,..ABORT
03D6   20FA
03D8   DDCRFFDE            FSET    ABORT
03DC   22763B              SHLD    POINTER ;CLEAR STACK
03DF   C9                  RET

;                          TRANSMIT ONE BYTE
;                          =================

03E0               XMTBYTE:                   ;LEV 3,4
03E0   F5                  PUSH    PSW

03E1   DB41       ..LOOP:  IN      STATUS
03E3   CB47                BIT     TXRDY,A
03E5   28FA                IF      .ZERO,..LOOP  ;NOT READY FOR NEXT BYTE?

03E7   F1                  POP     PSW
03E8   D3C0                OUT     WRDATA
03EA   C9                  RET

;                          RECEIVE ONE BYTE
;                          ================

03EB               RCVBYTE:                   ;LEV 3,4
03EB   DB41                IN      STATUS
03ED   CB4F                BIT     RXRDY,A
03EF   28FA                IF      .ZERO,RCVBYTE  ;NO DATA?

03F1   DB40                IN      RDDATA
03F3   C9                  RET

03F4               DISPBITS:
03F4   010800              LXI     B,8
03F7   ED43783B            SBCD    BYTECOUNT
03FB   41                  MOV     B,C
03FC   7E                  MOV     A,M
03FD   23                  INX     H
03FE               ..LOOP:
03FE   2B                  DCX     H
03FF   0F                  RRC
0400   3804                JRC     ..ONE
0402   3630                MVI     M,"0"
0404   1802                JMPR    ..CONT
0406               ..ONE:
0406   3631                MVI     M,"1"
0408               ..CONT:
0408   10F4                DJNZ    ..LOOP
040A   22763B              SHLD    POINTER
040D   CDA002              CALL    ALPHADISPLAY
0410   C9                  RET

;INSERT DIACAS
```

.IDENT DIACAS

INITIALIZE
=========

;Stack is initialized. A LF is put on stack
;and POINTER is set. BOTTOMPOINTER is saved, i. may
;be needed if there is an error in read.

```
0411                INITSTACK:                          ;Lev 3
0411    2B                  DCX     H
0412    368A                MVI     M,LF
0414    2B                  DCX     H
0415    2274B8              SHLD    BOTTOMPOINTER
0418    C9                  RET
```

;
REWIND
======
;

;Tape is rewound for 1/2 second to move off
;end leader. If clear leader is detected rewinding
;continues for .02 seconds to insure the beginning
;leader has been found (not a stop hole).
;Then tape is moved forward in readmode until start
;hole is found. CPU waits for .02 seconds after
;each stop command.

```
0419                REWIND:                             ;lev 2
0419    CD1104              CALL    INITSTACK
041C    DB00                CASCHECK
041E    E638
0420    C24806              JNZ     NOCASSETTE
0423    3E04                CASSETTE        FASTREWIND
0425    D308
0427    06FF                LDELAY  LWAIT
0429    3E00
042B    3D
042C    20FD
042E    10F9
0430                ..START:
0430    DB00                LEADER
0432    E640
0434    28FA
0436    060A                LDELAY  RWAIT
0438    3E00
043A    3D
043B    20FD
043D    10F9
043F    DB00                CLEAR
0441    E640
0443    28EB                JRZ     ..START
0445    3E10                CASSETTE        STOPTAPE
0447    D308
0449    060A                LDELAY  RWAIT
044B    3E00
044D    3D
```

```
044E   20FD
0450   10F9
0452   3E08            CASSETTE     READMODE
0454   D308
0456   DB00            TAPE
0458   E640
045A   C25604
045D   DB00            LEADER
045F   E640
0461   28FA
0463   3E10            CASSETTE     STOPTAPE
0465   D308
0467   060A            LDELAY   RWAIT
0469   3E0C
046B   3D
046C   20FD
046E   10F9
0470   DDCBFFAE        FRES     ENDINFO
0474   C38806          JMP      OPOK
                ;                             ERASE
                ;                             =====

;A six second blank spot is put on tape.

0477                   ERASE:
0477   CD1104          CALL     INITSTACK
047A   DB00            CASCHECK
047C   EA38
047E   C24806          JNZ      NOCASSETTE
0481   CDA504          CALL     SENDBIT
0484   C5       LOOP   ..WAIT,8
0485   0608
0487   C5              PUSH     B
0488   06FF            LDELAY   LWAIT
048A   3E00
048C   3D
048D   20FD
048F   10F9
0491   C1              POP      B
0492   10F3     ENDLOOP ..WAIT
0494   C1
0495   3E10            CASSETTE     STOPTAPE
0497   D308
0499   060A            LDELAY   RWAIT
049B   3E00
049D   3D
049E   20FD
04A0   10F9
04A2   C38806          JMP      OPOK
                ;                             SENDBIT
                ;                             ======

;One bit of data is written on the tape. The bit
                ;is bit 0 of register A.

04A5                   SENDBIT:                        ;lev 3,5
04A5   E601            ANI      01H
```

```
04A7   F60A              ORI     WRITEMODE
04A9   D308              OUT     CASCON
04AB   C9                RET
                    ;                              SENDBYTE
                    ;                              ========

;Byte stored in register D is sent to the tape.
       ;High order bit is sent first.
       ;Complement of bit is sent,
       ;then 833 T-states later bit is sent.
       ;833 T-states after that the complement
       ;of the next bit is sent. Entry should be timed
       ;so that the 833 T-state intervals are maintained
       ;between bits of two different bytes.

04AC              SENDBYTE:                                   ;lev 4
04AC   1E08              MVI     E,8
04AE   CB02      ..LOOP: RLCR    D
04B0   7A                MOV     A,D
04B1   2F                CMA
04B2   CDA504            CALL    SENDBIT
04B5   3E30              DELAY   DLW1
04B7   30
04B8   20FD
04BA   7A                MOV     A,D
04BB   CDA504            CALL    SENDBIT
04BE   1D                DCR     E
04BF   C8                RZ
04C0   3E2F              DELAY   DLW2
04C2   30
04C3   20FD
04C5   18E7              JMPR    ..LOOP
                    ;                              WRITE PREAMBLE
                    ;                              ==============
04C7              AMBLE:                                      ;lev 3
04C7   16AA              MVI     D,0AAH
04C9   CDAC04            CALL    SENDBYTE
04CC   3E2F              DELAY   DLW5
04CE   30
04CF   20FD
04D1   16AA              MVI     D,0AAH
04D3   CDAC04            CALL    SENDBYTE
04D6   3E2F              DELAY   DLW5
04D8   30
04D9   20FD
04DB   16F0              MVI     D,0F0H
04DD   CDAC04            CALL    SENDBYTE
04E0   3E2D              DELAY   DLW3
04E2   30
04E3   20FD
04E5   C9                RET
                    ;                              SENDRECORD
                    ;                              ==========

;A number of bytes, equal to RECSIZE and starting at
       ;location pointed to by HL.

04E6              SENDRECORD:                                 ;lev 3
04E6   018300            LXI     B,RECSIZE
```

```
04E9  56        ..LOOP: MOV     D,M
04EA  CDAC04            CALL    SENDBYTE
04ED  0D                DCR     C
04EE  C8                RZ
04EF  23                INX     H
04F0  DB00              CLEAR
04F2  E640
04F4  C0                RNZ
04F5  3E2D              DELAY   DLH4
04F7  30
04F8  20FD
04FA  18ED              JMPR    ..LOOP
```

;                                       WRITE
;                                       =====

;A gap of length GAPLEN is written on tape.
;Then the preamble is written, followed by the
;record and then the postamble.

```
04FC            SAVEPROGRAM:                            ;lev 2
04FC  DB00              CASCHECK
04FE  EA38
0500  C24006            JNZ     WNOCASSETTE
0503  3E00              MVI     A,0
0505  CDA504            CALL    SENDBIT
0508  06FF              LDELAY  GAPLEN
050A  3E00
050C  30
050D  20FD
050F  10F9
0511  CDC704            CALL    AMBLE
0514  CDE604            CALL    SENDRECORD
0517  3E10              CASSETTE        STOPTAPE
0519  B308
051B  060A              LDELAY  RWAIT
051D  3E00
051F  30
0520  20FD
0522  10F9
0524  2A743B            LHLD    BOTTOMPOINTER
0527  2B                DCX     H
0528  368A              MVI     M,LF
052A  2B                DCX     H
052B  DB00              CLEAR
052D  E640
052F  C27006            JNZ     OUTOFTAPE
0532  C38806            JMP     OPOK
```

;                                       STATE
;                                       =====

;Current state of input line is returned in bit 7
;of register A.
;Zero flag is reset if a transition has occured.

```
0535            STATE:                                  ;LEV 5,6,7,(8,9)
0535  DB00              IN      CASTAT
0537  E680              ANI     DATAMASK
```

```
0539   BF                      CMP    E
053A   C9                      RET
```

;                                                        READ BIT
;                                                        ========

;Next bit is returned in bit 7 of register A.
;All other bits are reset.
;Timing window is adjusted, unless a long gap
;was detected, in which case GAP flag is set.
;LEV 6,(8)

```
053B           READBIT:                    ;Entry is 416 T-states after
053B   3A733B          LDA    COUNT1       ;transition.
053E   3D      ..LP1:  DCR    A
053F   20FD            IF     .NZERO,..LP1
0541   CD3505          CALL   STATE
0544   5F              MOV    E,A
0545   0E0C            MVI    C,COUNT2
0547   CD3505  ..LOOP: CALL   STATE        ;Enter loop 833 T-states later.
054A   2008            IF     .NZERO,ADJUSTTIMER ;Next transition expected 416
054C   0D              DCR    C            ;T-states later
054D   20F8            IF     .NZERO,..LOOP
054F   DDCBFFF6        FSET   GAP
0553   C9              RET
```

;                                                     ADJUST TIMER
;                                                     ============

;A window of length COUNT2 is maintained with data transition
;in the middle. Adjustment is 1/4 the current error

```
0554           ADJUSTTIMER:
0554   3E06            MVI    A,COUNT2/2
0556   91              SUB    C
0557   DD86F0          ADD    CNT1(X)
055A   32733B          STA    COUNT1
055D   C9              RET
```

;                                                      READ A BYTE
;                                                      ===========

;One byte is read from the tape.
;It is returned in register D.
;First bit read is assumed to be high order bit.

```
055E           READBYTE:                   ;lev 5,(7)
055E   0608            MVI    B,8
0560   1600            MVI    D,0
0562           ALTREADBYTE:                ;ALTERNATE ENTRY, FROM LOCATE RECORD.
0562   CD3B05  ..LOOP: CALL   READBIT
0565   DDCBFF76        IFF    GAP,return
0569   C0
056A   CD3505          CALL   STATE
056D   B2              ORA    D
056E   07              RLC
056F   57              MOV    D,A
0570   05              DCR    B
0571   C8              RZ
0572   3E0B            DELAY  DLR2
0574   3D
0575   20FD
0577   18E9            JMPR   ..LOOP
```

; READ RECORD
; ==========

;A record is read in from cassette. RECSIZE bytes are
;stored starting at location pointed to by HL.

| 0579 |          | READRECORD: |       |              | ;lev 4 |
|------|----------|-------------|-------|--------------|--------|
| 0579 | 018300   |             | LXI   | B,RECSIZE    |        |
| 057C | C5       | ..LOOP:     | PUSH  | B            |        |
| 057D | E5       |             | PUSH  | H            |        |
| 057E | CD5E05   |             | CALL  | READBYTE     |        |
| 0581 | E1       |             | POP   | H            |        |
| 0582 | C1       |             | POP   | B            |        |
| 0583 | DDCBFF76 |             | IFF   | GAP,return   |        |
| 0587 | C0       |             |       |              |        |
| 0588 | 72       |             | MOV   | M,D          |        |
| 0589 | 2B       |             | DCX   | H            |        |
| 058A | 0D       |             | DCR   | C            |        |
| 058B | C8       |             | RZ    |              |        |
| 058C | 3E04     |             | DELAY | DLR4         |        |
| 058E | 3D       |             |       |              |        |
| 058F | 20FD     |             |       |              |        |
| 0591 | 18E9     |             | JMPR  | ..LOOP       |        |

; SEARCH FOR B
; ============

;Tape is searched for a sequence of bits matching
;the B register.

| 0593 |          | SEARCHB: |       |              |
|------|----------|----------|-------|--------------|
| 0593 | 0E00     |          | MVI   | C,0          |
| 0595 | CD3E05   |          | CALL  | READBIT      |
| 0598 | DDCBFF76 |          | IFF   | GAP,return   |
| 059C | C9       |          |       |              |
| 059D | CD3505   |          | CALL  | STATE        |
| 05A0 | B2       |          | ORA   | D            |
| 05A1 | 07       |          | RLC   |              |
| 05A2 | B8       |          | CMP   | B            |
| 05A3 | C8       |          | RZ    |              |
| 05A4 | E67F     |          | ANI   | 7FH          |
| 05A6 | 57       |          | MOV   | D,A          |
| 05A7 | 3E14     |          | DELAY | DLR6         |
| 05A9 | 3D       |          |       |              |
| 05AA | 20FD     |          |       |              |
| 05AC | 0D       |          | DCR   | C            |
| 05AD | 20E4     |          | IF    | .NZERO,SEARCHB |
| 05AF | F1       |          | POP   | PSW          |

;Too long without finding byte. POP adjusts stack then
;program flows into LOCATE START and search continues.

; LOCATE START
; ============

;The start of the next record is found. Record begins
;with two bytes of 0AAH, followed by 0F0H.

| 05B0 |          | LOCATESTART: |      |         |
|------|----------|--------------|------|---------|
| 05B0 |          | ..STARTOVER: |      |         |
| 05B0 | 01FFFF   |              | LXI  | B,ENDTIME |
| 05B3 | DDCBFFB6 |              | PRES | NOTAPE  |
| 05B7 | CD3505   |              | CALL | STATE   |

```
05BA    5F                      MOV     E,A
05BB            ..LOOP:
05BB    CD3505                  CALL    STATE
05BE    2008                    IF      .NZERO,..TRANSITION
05C0    0D                      DCR     C
05C1    20F8                    IF      .NZERO,..LOOP
05C3    10F6                    DJNZ    ..LOOP
05C5    DDCEFFF6                FSET    BADREAD
05C9    DDCBFFEE                FSET    ENDINFO
05CD    C9                      RET
05CE            ..TRANSITION:
05CE    3E30                    MVI     A,ICOUNT1
05D0    32733B                  STA     COUNT1
05D3    1600                    MVI     D,0
05D5    064A                    MVI     B,0AAH
05D7    3E13            DELAY   DLR7
05D9    3D
05DA    20FD
05DC    CD9305                  CALL    SEARCHB
05DF    DDCBFF76                IFF     GAP,..STARTOVER
05E3    20CB
05E5    06F0                    MVI     B,0F0H
05E7    3E13            DELAY   DLR8
05E9    3D
05EA    20FD
05EC    CD9305                  CALL    SEARCHB
05EF    DDCBFF76                IFF     GAP,..STARTOVER
05F3    20BB
05F5    C9                      RET
```

;                                           READ
;                                           ====
;Next record is found and read.

```
05F6            READ:                                   ;lev 3
05F6    3E08                    CASSETTE        READMODE
05F8    D308
05FA    CDB005                  CALL    LOCATESTART
05FD    DDCBFF76                IFF     GAP,return
0601    C0
0602    3E0E            DELAY   DLR5
0604    3D
0605    20FD
0607    CD7905                  CALL    READRECORD
060A    C9                      RET
```

;                                           LOAD PROGRAM
;                                           ============
;Program is read into memory from cassette.
;Note: flags GAP, NOTAPE, BADREAD are synonyms.
                                            ;lev 2

```
060B            LOADPROGRAM:
060B    CD1104                  CALL    INITSTACK
060E    DB00                    CASCHECK
0610    E638
0612    C24804                  JNZ     NOCASSETTE
0615    CDF605                  CALL    READ
```

```
0618  3E10              CASSETTE      STOPTAPE
061A  D308
061C  060A              LDELAY        RWAIT
061E  3E00
0620  3D
0621  20FD
0623  10F9
0625  DDCBFF76          TEST          RADREAD
0629  CA8806            JZ            OFOK
062C  2A743B            LHLD          BOTTOMPOINTER
062F  DDCBFF6E          TEST          ENDINFO
0633  C27A06            JNZ           ENDPROGRAM
0636  DB00              CLEAR
0638  E640
063A  C27006            JNZ           OUTOFTAPE
                ;                                   EXITS
                ;                                   =====

;All cassette operations exit here. A ACK is sent if
                ;the operation was sucessful.The data follows
                ;ACK if READ. If something went wrong a error
                ;code is sent.
                                                            ;lev 2
064C              WRCASSETTE:           ;From write routine
0640  2A7433          LHLD          BOTTOMPOINTER
0643  368A            MVI           M,LF
0645  2B              DCX           H
0646  DB0C            IN            CASTAT
0648              RDCASSETTE:           ;From read and rewind
0648  E610            ANI           10H
064A  2804            JRZ           ..SIDE
064C  3668            MVI           M,"h"
064E  119006          LXI           D,ERNOCAS
0651  CD0303          CALL          ERRMSG
0654  1834            JMPR          CASERR
0656              ..SIDE:
0656  DB00            IN            CASTAT
0658  E620            ANI           20H
065A  280A            JRZ           ..WRTP
065C  3668            MVI           M,"h"
065E  11B306          LXI           D,ERSIDE
0661  CD0303          CALL          ERRMSG
0664  1824            JMPR          CASERR
0666              ..WRTP:
0666  3668            MVI           M,"h"
0668  11ED06          LXI           D,ERPROT
066B  CD0303          CALL          ERRMSG
066E  181A            JMPR          CASERR
0670              OUTOFTAPE:
0670  3668            MVI           M,"h"
0672  112807          LXI           D,ERNOTPE
0675  CD0303          CALL          ERRMSG
0678  1810            JMPR          CASERR
067A              ENDPROGRAM:
067A  3668            MVI           M,"h"
067C  115807          LXI           D,ERENDTPE
067F  CD0303          CALL          ERRMSG
```

```
0682  1806            JMPR    CASERR
0684          BADBITCOUNT:
0684  3673            MVI     M,"s"
0686  1802            JMPR    CASERR
0688          OPOK:
0688  3606            MVI     M,ACK
068A          CASERR:
068A  22763B          SHLD    POINTER
068D  C3B203          JMP     XMIT
              ;ERROR MESSAGES
              ;--------------
0690          ERNOCAS:
0690  22              .BYTE   ..END-,-1
0691  4E4F20434153    .ASCII  "NO CASS\
0697  534554544520    \ETTE I\
069D  494E20445249    \N DRIV\
06A3  56452E205052    \E. PRE\
06A9  455320434C      \SS CLE\
06AF  4541522E        \AR."
06B3                  ..END:

06B3          ERSIDE:
06B3  39              .BYTE   ..END-,-1
06B4  504C45415345    .ASCII  "PLEASE \
06BA  205455524E20    \TURN T\
06C0  544845204341    \HE CAS\
06C6  535345545445    \SETTE \
06CC  204F5645522C    \OVER, "\
06D2  20                      \
06D3  505245535320    .ASCII  "PRESS C\
06D9  4C45415220      \LEAR A\
06DF  414E44205452    \ND TRY\
06E5  5920414741494E  \ AGAIN\
06EB  4E2E            \."
06ED                  ..END:

06ED          ERSPROT:
06ED  3D              .BYTE   ..END-,-1
06EE  43414E275420    .ASCII  "CAN'T S\
06F4  534156452050    \AVE PR\
06FA  524F4752414D    \OGRAM,\
0700  2E204341535345  \ CASSE\
0706  455454452049    \TTE IS\
070C  5320            \ "
070E  575249544520    .ASCII  "WRITE P\
0714  50524F54454343  \ROTECT\
071A  4544522E2050    \ED. PR\
0720  5245535320 43   \ESS CL\
0726  4C4541522E      \EAR."
072B                  ..END:

072B          ERNOTPE:
072B  2C              .BYTE   ..END-,-1
072C  544150452049    .ASCII  "TAPE IS\
0732  5320544F2053    \ TO SH\
0738  484F52542046    \ORT FO\
073E  4F522046554C    \R FULL\
0744  4C2053415645    \ SAVE.\
```

```
074A  2E20           \ -
074C  5052455335320           ,ASCII  "PRESS C\
0752  434C4541522E  \LEAR."
0758                ..END:

0758                ERENDTPE:
0758  39             ,BYTE  ..END-,-1
0759  4F5554204F46           ,ASCII  "OUT OF \
075F  205441504520  \TAPE, \
0765  20434F554C44  \COULDN\
076B  4E2754205245  \'T REA\
0771  4144205448455  \D THE "\
0777  20             \
0778  46554C4C2050           ,ASCII  "FULL PR\
077E  524F4752414D  \OGRAM,\
0784  2E2050524553  \ PRESS\
078A  5320434C4541  \ CLEAR\
0790  522E           \."
0792                ..END:
                    .END
```

Figure 9:
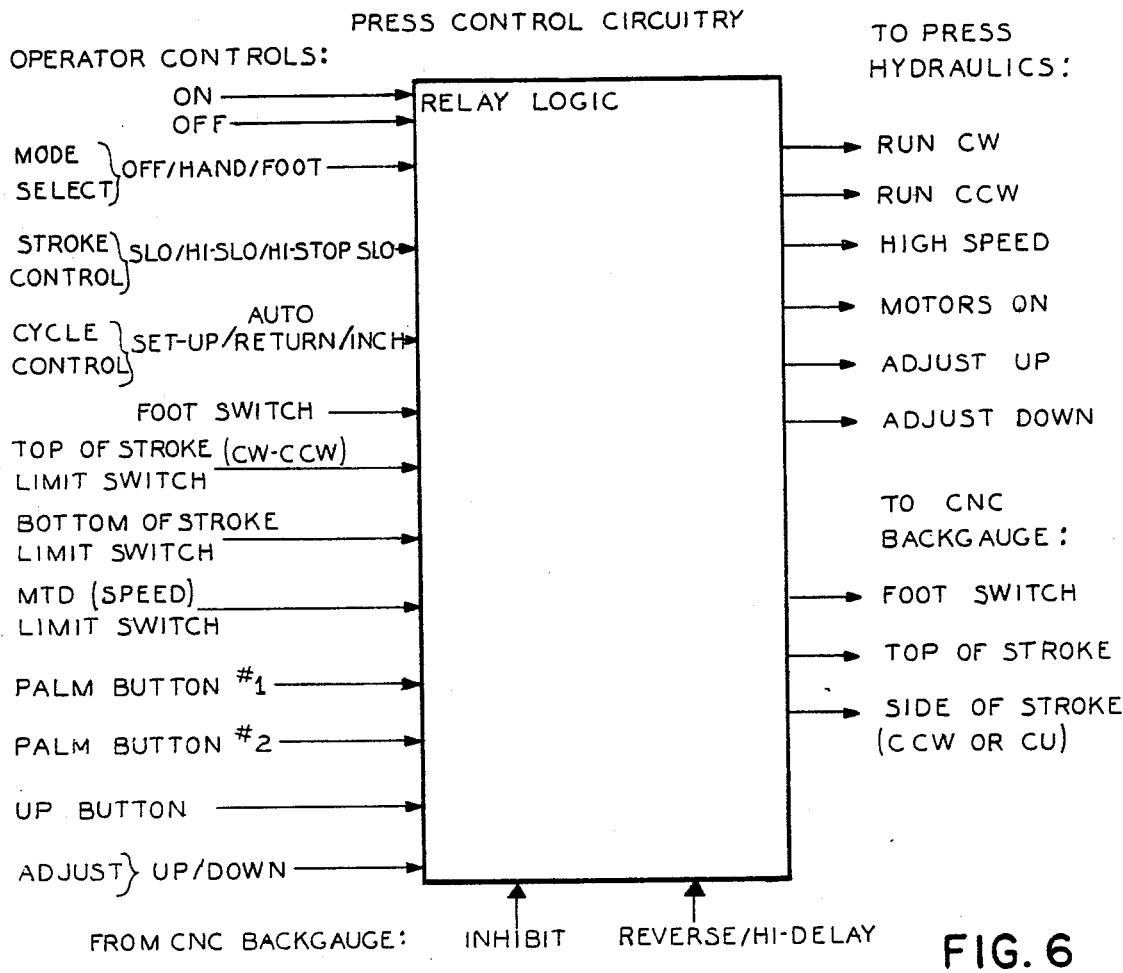
FIG. 9 illustrates the press control of the invention.

FIG. 9 illustrates the operator controls and the operator turns the machine on and makes mode selection either off hand or feed stroke control can be set to slow, high-slow, high-stop-slow. Cycle control can be set to set up, auto return, and inch. The foot switch as well as the top of stroke limit switch the bottom of stroke limit switch, the speed limit switch and palm buttons 1 and 2 as well as the up button and the adjust up/down also supply inputs to the press control circuitry. The press control circuitry provides run clockwise, run counter-clockwise, high speed, motor zone, adjust up and adjust down to the press hydraulics and to the backgauge. Connection is made to the foor switch, top of stroke and adjustment of the side of stroke to position the upper ram and this signal can be either clockwise or counter-clockwise.

FIGS. 10A, 10B, 11A and 11B illustrate the microprocessor 110 in greater detail than in FIG. 7. The microprocessor 110 has data busses 113 and 114 which are connected to ROMS 400, 401, 402, 403 and 404 and RAMS 405 and 406. A universal asynchronous receiver/transmitter 117 is also connected to the data and address busses and is connected to an interface unit 407. A pair of latches 408 and 409 are also connected to the data busses. A VO decoder 410 is connected to the interface 407, the latches 408, 409, the UART 117 and to the RAM 406. The UART 117 is connected to console through terminal 411 and from console contact 412 supplies an input to the computer 110. Output terminals 413 and 414 are connected to terminals 413, 414 illustrated in FIG. 11A. Input from the backgauge encoder is supplied to terminals 416 which feeds signals to the detection circuit 417. Terminals 420 receive inputs from the ram encoder 82 and supply inputs to a detector circuit 421. An interface circuit 422 is connected to receive inputs and supplies outputs to the backgauge and the ram press to control their positions. The output of the detection circuit 417 is fed through a plurality of circuits 431 through 435 which might be type LS 193 circuits to error counters 436 and 437 and to latch circuits 438 and 439. The latch circuits are connected through circuits 441 and 442 which might be type LS 585 to analog switches 443 and 444. A circuit 445 which might be a type DAC80 is connected to the error counters 436, 437.

Figure 12A:
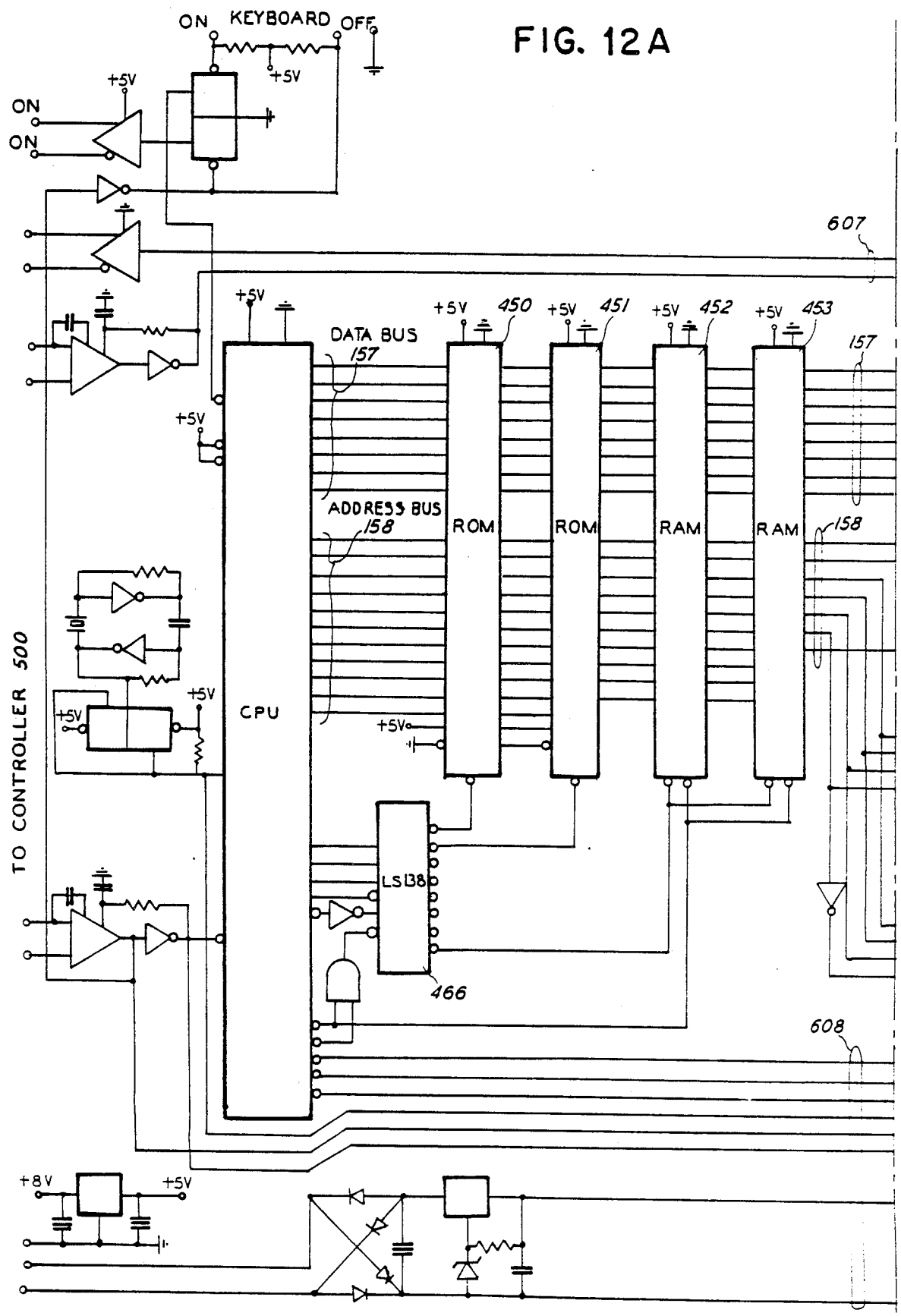
FIGS. 12A-12D comprise electrical schematics of the invention.
Figure 12B:
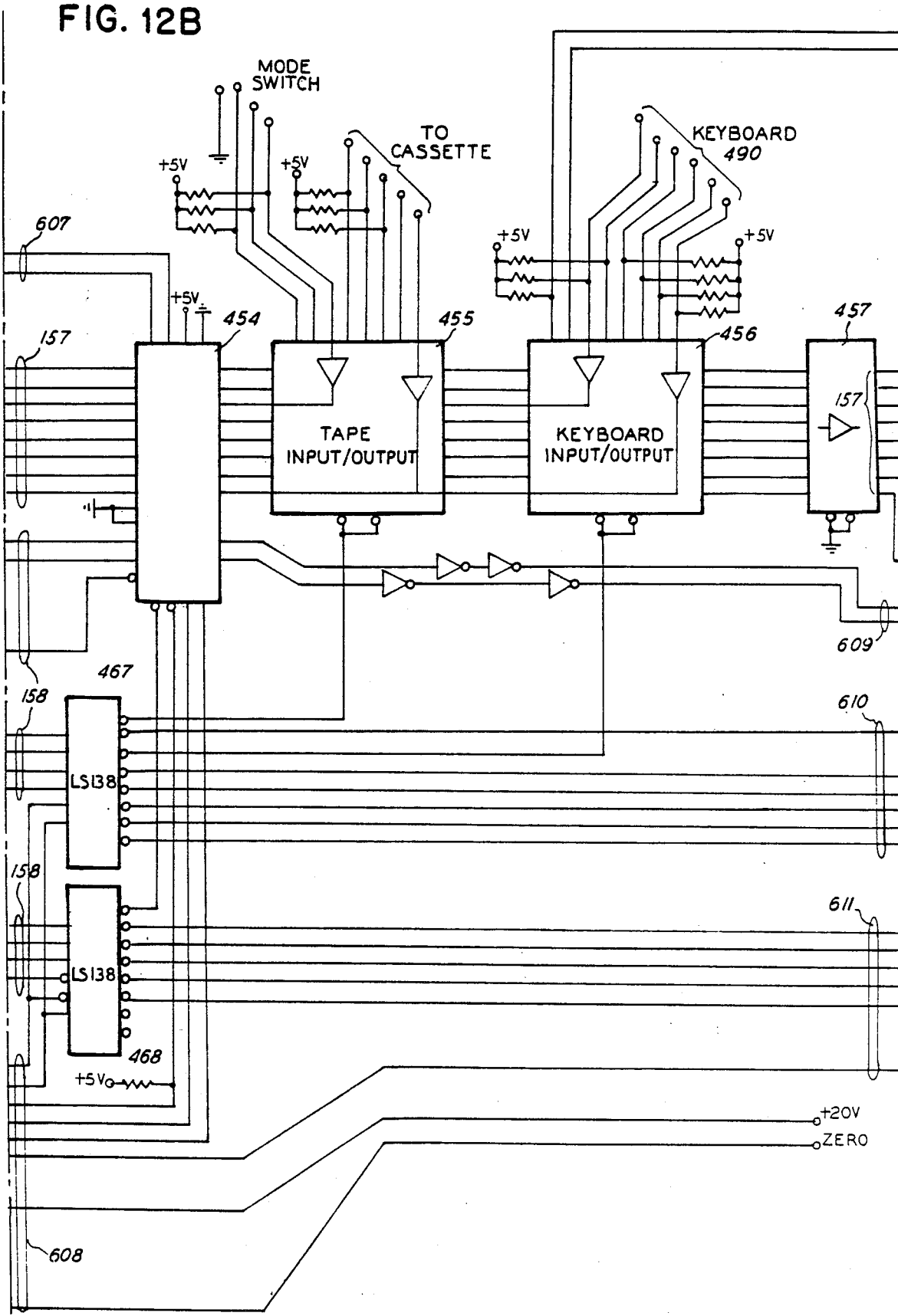
Figure 12C:
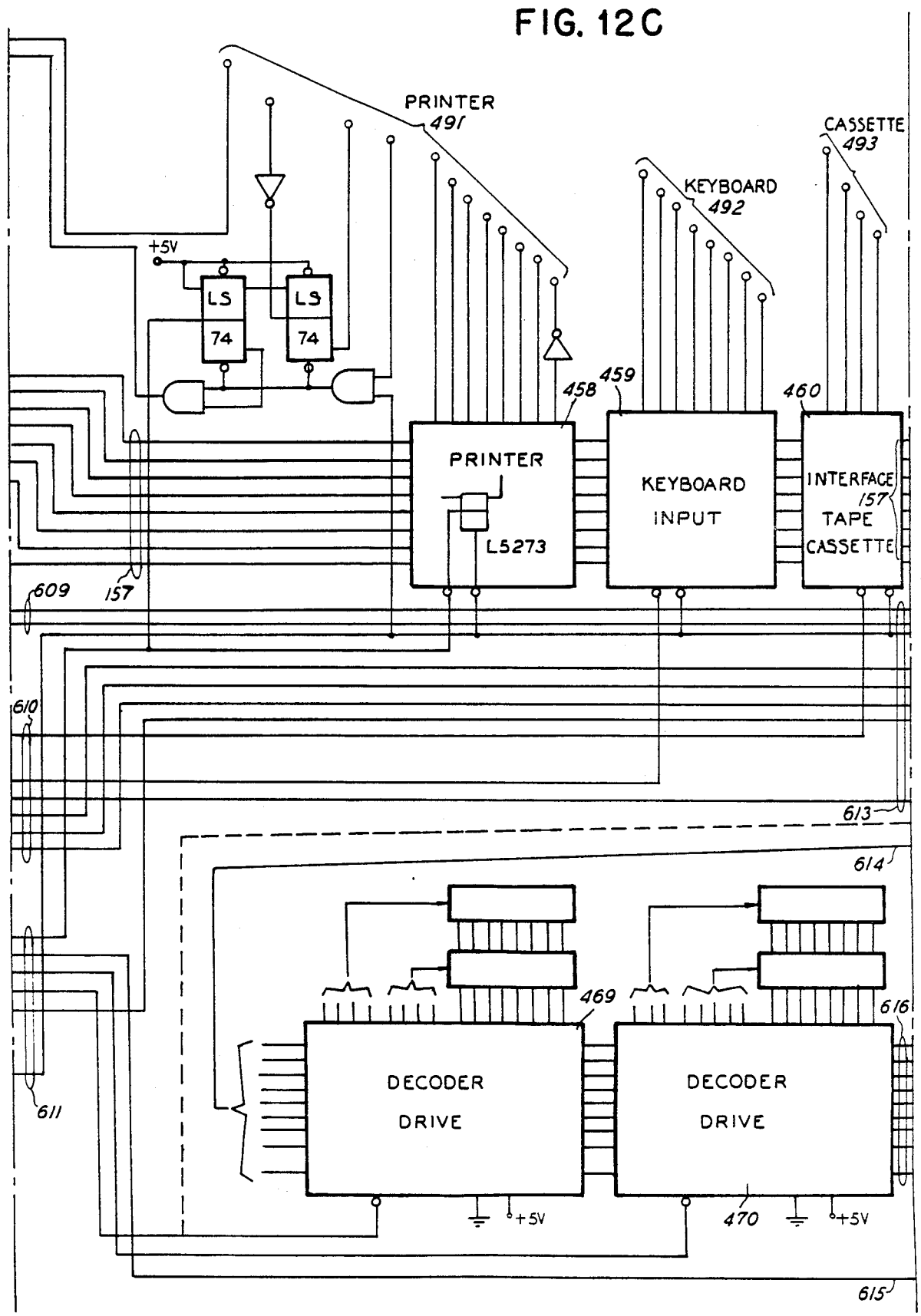
Figure 12D:
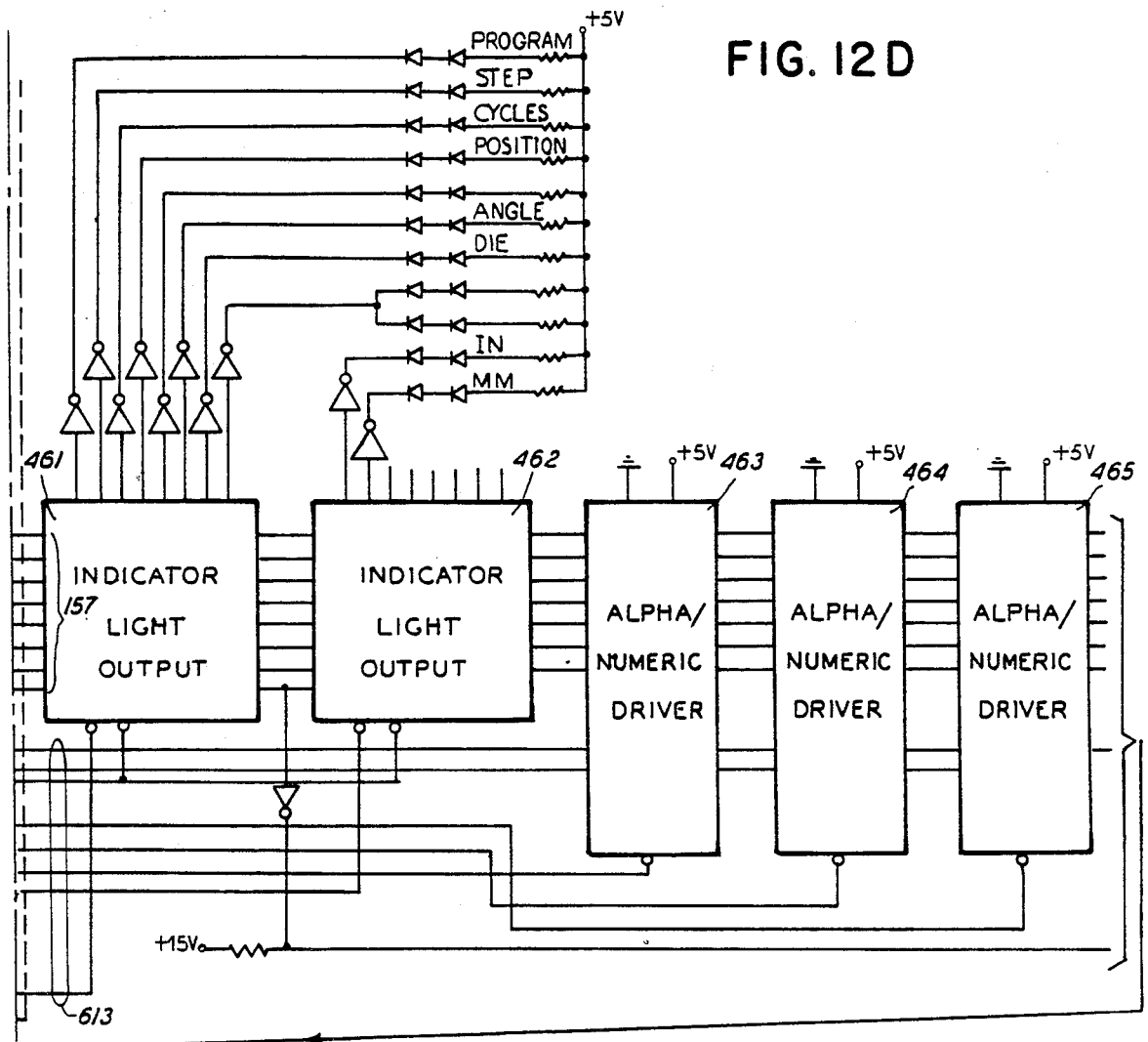
Figure 12E:
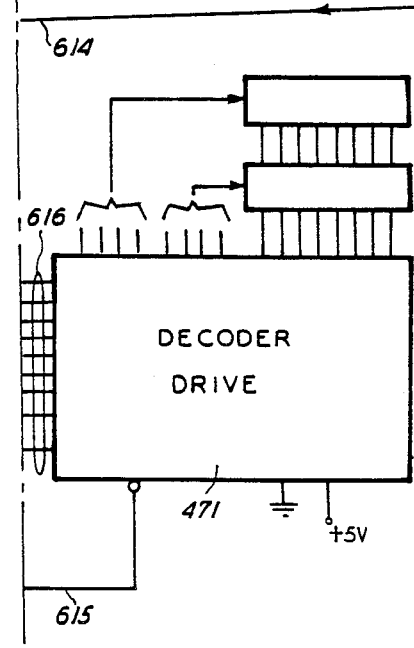
FIG. 12E illustrates how FIGS. 12A through 12D fit together.

FIGS. 12A through 12D are put together as illustrated in FIG. 12E. The microprocessor 151 is connected to the controller with terminals 500 and has data busses 157 which are connected to the ROMS 450 and 451 as well as the RAMS 452 and 453. Circuit 454 which might be a type 2651 is connected to the data and certain of the address busses and is connected to the tape input/output 455 and the keyboard input/output 456. A circuit 457 which might be a type L5244 is connected to the printer driver 458 which has terminals 491 which are connected to various functions of the printer 301. Keyboard input 459 is connected by terminals 491 to the keyboard 306. An interface for the tape cassette 460 is connected to cassette terminals 493. Indicator light driver 461 and an indicator light driver 462 are connected to drive the indicator lights for program steps, cycle, position, bend allowance, angle die material inches and millimeters. Alpha numeric drivers 463, 464 and 465 are connected to the data and address busses and decoder drivers 469, 470 and 471 are also connected to the data and address busses. Circuits 466, 467 and 468 which might be type LS138 are connected as shown. In operation, the ON button 308 would be depressed which turns on the gauging system. The stop button 309 turns off the gauging system and stops the backgauge movement. The program number button to the right of the indicia 179 is pushed once and then numbers can be entered with the keyboard 309 to give a program a number up to three blocks long.

To search through the memory repeat pushing the program button. Program numbers will be displayed in numerical order in window 179. The count up will continue until the last number is reached. It will then loop back to zero.

A program number may be entered for clearing purposes.

Example: Inner program number then press program clear button, indicator will read program clear. Push the program clear again to clear the program.

If you enter a wrong program number and desire to clear the display but not the program push the clear button of the keyboard.

CLEAR—This will clear any LED window that is active to activate a window push the window push button.

STEP—This button is used to advance the gauge through bend positions. Step in program mode and advances and displays information in each window is entered. Step and run mode idles the backgauge through each position. Step can call up a specific step when that number is entered.

CYCLES—Used to enter any number of cycles, up to 99 required before the gauge will move to the next position. 1 cycle is standard, entry not required.

POSITION—Used to position gauge bar at specified dimension.

BEND ALLOWANCE—Used to enter bend allowance as required per material thickness, die opening and degree of bend. Bend allowance will carry over from station to station or separate value can be entered in each step.

ANGLE—Used for inside angle data entry. Each step may have a differen value. If a value is not entered, the press will full depth bend.

RETRACT—Used to retract gauge bar in any step.

0 thru 9—Push buttons used to show values or numbers.

°—Placement of decimal point as required to show numberical value.

PROGRAM CLEAR—Used to erase program from memory. Push button once. reads: Program Clear? Push button second time and program will be erased.

+ —These push buttons are used to add or subtract value to the Position Display and Bend Allowance Display Example: To change 1.000 to 1.500 in position window:
Press POSITION Button
Press + Button, Display blacks out
Press ° Button, Decimal point appears
Press 5 Button, 5 appears
Press = Button, 1.500 appears
Display now reads 1.500
Also can be used when angle calibrating.
Example: Looking for 90° bend, test bend and receive 95° bend Angle Window and Push Button are already active.
Press − Button, Angle Window blacks out,—appears
Press 5 Button, −5 appears
Begin test bend, window will switch back to 90° display when press comes off top of stroke
= —Used to total + or − data entry.
CLEAR—Used to clear active display window.
IN/MM—Used to allow data entry in either inch or metric. Used to convert entered data from inch to metric or metric to inch.
MEMORY TO TAPE—Used with cassette option. Loading of information from memory to tape.
TAPE TO MEMORY—Used with cassette option: Loading of information from cassette to memory.
PROGRAM PRINT—Used with printer option: Prints out information contained in program displayed in program number window.

PROGRAM MODE

ON—Power on Press Brake—Key Sw. in Program Position
Prog. No.: LED reads 0
STEP: LED reads 0
CYCLES: LED reads 1
POSITION: LED blacked out IN or MM will be lit
BEND ALLOWANCE: LED blacked out
ANGLE: LED blacked out
(2 Options at this point)
 (A) Leave 0 as the program number and proceed with program entry data. Data will go into memory under program number 0.
 (B) Press PROGRAM NO. button, light behind "Program" window will light. Enter number. All information will now go into memory. Will read program.
STEP—Push STEP button,
Light in Step Window Lights.
1 will appear in LED window
Option (A) If you have completed programming and wish to jump back to the front or Step 1 push STEP button three times (next step would be blank, then 0, then 1
Option (B) Step can be used to dry run program through, checking each step using LED windows. KEY SW IN PROGRAM.
OPTION (C) Step can idle back gauge through program. KEY SW IN RUN.
CYCLE—Push CYCLE button.
Light in window lights
If more than (1) cycle is required enter the amount. If only (1) cycle is required CYCLE press brake may be skipped.
POSITION—Push POSITION button
Light in window lights—cycle light goes out. Enter required numbers (12.5 example)
BEND ALLOW—Push BEND ALLOW button
Light in window lights—position light goes out. Enter required numbers (0.050 example)
NOTE: This bend allowance will be carried through each step until we enter a new number.
ANGLE—Push ANGLE button.
Light in window lights.
Bend Allowance light goes out.
Enter required angle numbers.
Always enter inside angle value.
RETRACT—Push RETRACT button.
Light in window lights—angle light goes out. Display reads Retract.
NOTE:
(A) During the run mode, the retract will retract the gauge bar back to 25" position. It will stay in that position until the operator signals the gauge to come forward to the next position.
(1) click of the ft. switch will signal the gauge to the next position.
(B) Retract will print out in the Ω display only in each step it is entered in.
(C) When single stepping through a program in run mode, using the STEP button, the retract will display in the but will be bypassed.

To continue programming repeat, starting at STEP enter date as required.

CALIBRATE MODE

Position Calibrate

Key sw. in calibrate position
Press POSITION CAL button.
Gauge bar will travel to 4.000 position.
Adjust back gauge fingers using calibration blocks.
Angle Calibrate
DIE—Press DIE button. Die button: die illuminates in angle display window. Enter die opening (0.5 example) Ω Displays: die opening
MATL—Press MATL button. Material illuminates in angle display window. Enter material thickness (0.62 example) Ω Displays: material thickness
FULL BEND—Press Full Bend Button. Ω Displays: full depth bend, enter angle, Cycle press for full depth bend, check and enter angle. Press ANGLE push button and enter inside angle.
STEP—Press Step push button. The first programmed step with an angle will be displayed. Ω Display will read: test bend, enter angle. Test bend with material of same width as part. Check bend and enter results.
ANGLE—Press angle push button and enter test bend results. Repeat this step until correct angle of bend is obtained. When correct angle is obtained push STEP button to continue on to the next step containing a bend angle.

RUN MODE

PROGRAM WINDOW: Program number displayed
STEP WINDOW: 1
CYCLE WINDOW: 1 or other if entered
POSITION WINDOW: Position displayed Also light behind IN or MM is lit
BEND ALLOWANCE: If entered it will be displayed
ANGLE: Angle if entered will be displayed. If no angle entered window will be black.
DISPLAY: If retract is entered in this step retract will read out in display.
As press is cycled reads: Bend. Step window will display the next step when the operator removes his foot from the foot switch. The gauge will go to the next position. When the program is completed it will go back to the first step.
DIAGNOSTIC SOFTWARE SUMMARY:
To access the diagnostic tests the operator turns the keyswitch to "TEST". Diagnostic programs are then accessed by pressing the desired test key (0-9 plus four hidden keys). In most cases depressing any key will terminate the test. The exceptions are the keyboard test, printer test, and the destructive memory test.

| Test Number | Description | Notes |
| --- | --- | --- |
| 0 | Display Test | Fills all displays |
| 1 | Keyboard Test | Displays binary key code Press "CLEAR" to exit |
| 3 | I/O Test | Displays I/O status |
| 4 | Position Test | Moves B.G. to 25" position If servo amp is defective gauge can be manually positioned using the control as a precision readout. |
| 5 | Memory Test 1 | Non-destructive R-A-M test. |
| 6 | Ram Encoder Test | Displays position of press brake ram. Bottom of stroke should be zero if calibration has been done |
| 7 | Available Program Space | Displays amount of remaining memory |
| 8 | Leadscrew Test | Gauge moves in a "zig zag" pattern in one inch increments each time the key is pressed. Also tests position encoder. |
| 9 | Gackgauge Test | Moves to 10" waits, to 20" waits, repeats. Useful for run-in, also servo amp set-up. |
| H1* | Cassette Test | Allows comparison and test of unit with a known standard and with itself |
| H2* | Printer Test | Prints full alpha-numeric character set. |
| H3* | Memory test 2 | Destructive memory test |

*Hidden Key

Although the invention has been described with respect to preferred embodiments, it is not to be so limited as changes and modifications can be made which are within the full intended scope of the invention as defined by the appended claims.

We claim as our invention:

1. A computer numeric control for a hydra-mechanical press brake having a moveable ram and frame with a backgauge comprising, hydra-mechanical drive means for driving a forming ram of said press brake, a settable upper limit switch for setting the upper limit of said ram, a lower limit switch for setting the lower limit of said ram, a ram position encoder connected to said frame, a pulley attached to said position encoder, a flexible member passing around said pulley and with its opposite ends attached to said ram so as to drive said encoder as said ram moves relative to said frame, a control station with a display, a keyboard and magnetic program receiving means, a computer connected to said control station to receive inputs from said ram position encoder, said keyboard and said magnetic program receiving means and supplying outputs to said display and to said hydra-mechanical drive means for driving said forming ram, including operator switch means connected to said computer for controlling said forming ram, including a first detector circuit connected to said ram encoder and supplying an input to said computer, and wherein said ram encoder produces two out-of-phase A.C. signals when said ram moves, including a moveable backgauge mounted on said frame for establishing positions of bends in a workpiece, a backgauge driving means connected to said backgauge, and to said computer, a backgauge encoder connected to said frame and to said backgauge and connected to supply inputs to said computer and said computer connected to said backgauge driving means, wherein said backgauge encoder produces two out-of-phase A.C. signals and an indexing signal, wherein said computer comprises first and second computer processing units which are interconnected together, including a first plurality of read only memories and a first plurality of random access memories connected to said first computer processing unit, including a second plurality of read only memories and a second plurality of random access memories connected to said second computer processing unit, wherein said ram encoder and said backgauge encoder are connected to said first computer processing unit, and wherein said magnetic program means comprises a magnetic tape playback connected to said second computer processing unit and said keyboard is connected to said second computer processing unit.

2. A computer numeric control for a hydra-mechanical press brake according to claim 1 including a printer connected to said second computer processing unit.

3. A computer numeric control for a hydra-mechanical press brake according to claim 2 wherein said display includes alpha numeric display means connected to said second computer processing unit.

4. A computer numeric control for a hydra-mechanical press brake according to claim 3 including a plurality of function command switches connected to said second computer processing unit.

5. A computer control numeric control for a hydra-mechanical press brake according to claim 4 wherein said display means includes a plurality of indicator lights.

* * * * *